(12) United States Patent
Ott et al.

(10) Patent No.: US 9,470,850 B2
(45) Date of Patent: Oct. 18, 2016

(54) FIBER OPTIC CONNECTOR, FIBER OPTIC CONNECTOR AND CABLE ASSEMBLY, AND METHODS FOR MANUFACTURING

(71) Applicant: ADC Telecommunications, Inc., Berwyn, PA (US)

(72) Inventors: Michael James Ott, Hudson, WI (US); Thomas P. Huegerich, Fuquay Varina, NC (US); Steven C. Zimmel, Minneapolis, MN (US); Ponharith Nhep, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/684,911

(22) Filed: Apr. 13, 2015

(65) Prior Publication Data
US 2015/0293313 A1    Oct. 15, 2015

Related U.S. Application Data

(63) Continuation of application No. 13/772,059, filed on Feb. 20, 2013, now Pat. No. 9,016,953.

(60) Provisional application No. 61/691,921, filed on Aug. 21, 2012, provisional application No. 61/666,683, filed on Jun. 29, 2012, provisional application No. 61/661,667, filed on Jun. 19, 2012, provisional application No. 61/600,915, filed on Feb. 20, 2012.

(51) Int. Cl.
*G02B 6/38* (2006.01)
*G02B 6/255* (2006.01)
*B29D 11/00* (2006.01)

(52) U.S. Cl.
CPC ........... *G02B 6/3846* (2013.01); *G02B 6/2551* (2013.01); *G02B 6/381* (2013.01);
(Continued)

(58) Field of Classification Search
CPC G02B 6/2551; G02B 6/3821; G02B 6/3824; G02B 6/3851; G02B 6/387; G02B 6/3871; G02B 6/3885; G02B 6/3846; G02B 6/381; G02B 6/3865; G02B 6/3887; G02B 6/3825; G02B 6/3971; B29D 11/0075; Y10T 29/49194
See application file for complete search history.

(56) References Cited

U.S. PATENT DOCUMENTS 2,027,962 A    1/1936  Currie
3,086,242 A    4/1963  Cook et al.
(Continued)

FOREIGN PATENT DOCUMENTS

CA    2 354 718 A1    3/2002
DE    43 07 272 C1    4/1994
(Continued)

OTHER PUBLICATIONS

"Considerations for Optical Fiber Termination," AEN 89, Revision 3, Corning Cable Systems LLC, pp. 1-7 (Copyright 2008).
(Continued)

*Primary Examiner* — Peter Radkowski
(74) *Attorney, Agent, or Firm* — Merchant & Gould P.C.

(57) ABSTRACT

A fiber optic cable and connector assembly including a fiber optic connector mounted at the end of a fiber optic cable. The fiber optic connector includes a ferrule assembly including a stub fiber supported within a ferrule. The stub fiber is fusion spliced to an optical fiber of the fiber optic cable at a location within the fiber optic connector.

20 Claims, 72 Drawing Sheets

(52) U.S. Cl.
CPC ........... *G02B 6/387* (2013.01); *G02B 6/3821* (2013.01); *G02B 6/3825* (2013.01); *G02B 6/3851* (2013.01); *G02B 6/3871* (2013.01); *G02B 6/3885* (2013.01); *B29D 11/0075* (2013.01); *G02B 6/3865* (2013.01); *G02B 6/3887* (2013.01); *Y10T 29/49194* (2015.01)

(56) References Cited

U.S. PATENT DOCUMENTS

| | | | |
|---|---|---|---|
| 3,597,372 | A | 8/1971 | Cook |
| 3,777,048 | A | 12/1973 | Traut |
| 4,220,394 | A | 9/1980 | Tardy |
| 4,389,428 | A | 6/1983 | McDuffee et al. |
| 4,410,469 | A | 10/1983 | Katagiri et al. |
| 4,410,561 | A | 10/1983 | Hart, Jr. |
| 4,598,974 | A * | 7/1986 | Munn ............... G02B 6/2553 385/78 |
| 4,662,307 | A | 5/1987 | Amos et al. |
| 4,711,752 | A | 12/1987 | Deacon et al. |
| 4,798,431 | A | 1/1989 | Clark et al. |
| 4,877,303 | A | 10/1989 | Caldwell et al. |
| 4,877,306 | A | 10/1989 | Kar |
| 4,902,095 | A | 2/1990 | Baker et al. |
| 4,920,366 | A | 4/1990 | Bowen et al. |
| 4,964,688 | A | 10/1990 | Caldwell et al. |
| 5,022,735 | A | 6/1991 | Dahlgren |
| 5,034,170 | A | 7/1991 | Briggs, Jr. et al. |
| 5,040,867 | A | 8/1991 | de Jong et al. |
| 5,042,901 | A | 8/1991 | Merriken et al. |
| 5,046,813 | A | 9/1991 | Itoh et al. |
| 5,093,048 | A | 3/1992 | Kagan |
| 5,127,820 | A | 7/1992 | Briggs, Jr. et al. |
| 5,212,752 | A * | 5/1993 | Stephenson ........ G02B 6/3831 385/139 |
| 5,222,171 | A | 6/1993 | Straus |
| 5,241,613 | A | 8/1993 | Li et al. |
| 5,263,105 | A | 11/1993 | Johnson et al. |
| 5,309,536 | A | 5/1994 | Suganuma et al. |
| 5,317,663 | A | 5/1994 | Beard et al. |
| 5,367,594 | A | 11/1994 | Essert et al. |
| 5,375,183 | A | 12/1994 | Edwards et al. |
| 5,465,313 | A | 11/1995 | Belenkiy et al. |
| 5,495,545 | A | 2/1996 | Cina et al. |
| 5,582,671 | A | 12/1996 | Harman et al. |
| 5,677,976 | A | 10/1997 | Takahashi |
| 5,748,819 | A * | 5/1998 | Szentesi ............. G02B 6/2551 385/60 |
| 5,815,619 | A | 9/1998 | Bloom |
| 5,832,162 | A | 11/1998 | Sarbell |
| 5,852,694 | A * | 12/1998 | Kimura ............... G02B 6/4296 385/78 |
| 5,909,528 | A | 6/1999 | Tamekuni et al. |
| 5,963,692 | A | 10/1999 | Marazzi et al. |
| 5,963,698 | A | 10/1999 | Brugger et al. |
| 6,068,410 | A * | 5/2000 | Giebel ............... G02B 6/2551 385/60 |
| 6,120,193 | A | 9/2000 | Luther et al. |
| 6,152,609 | A | 11/2000 | Dzyck et al. |
| 6,173,097 | B1 | 1/2001 | Throckmorton et al. |
| 6,179,482 | B1 | 1/2001 | Takizawa et al. |
| 6,186,672 | B1 | 2/2001 | Takizawa et al. |
| 6,247,850 | B1 | 6/2001 | Edwards et al. |
| 6,340,249 | B1 | 1/2002 | Hayes et al. |
| 6,419,810 | B1 | 7/2002 | Tanaka et al. |
| 6,439,780 | B1 | 8/2002 | Mudd et al. |
| 6,498,888 | B1 | 12/2002 | Chenard et al. |
| 6,503,422 | B2 | 1/2003 | Chuboda et al. |
| 6,520,689 | B2 | 2/2003 | DeMartino et al. |
| 6,532,327 | B1 | 3/2003 | Gatica et al. |
| 6,550,279 | B1 | 4/2003 | Anderson et al. |
| 6,648,520 | B2 | 11/2003 | McDonald et al. |
| 6,715,933 | B1 | 4/2004 | Zimmer et al. |
| 6,719,927 | B2 | 4/2004 | Sakurai et al. |
| 6,726,370 | B2 | 4/2004 | Shimotsu |
| 6,728,452 | B2 | 4/2004 | Nishimura |
| 6,738,552 | B2 | 5/2004 | Hirsch |
| 6,742,936 | B1 * | 6/2004 | Knecht ............... G02B 6/3833 385/52 |
| 6,811,323 | B2 | 11/2004 | Murray et al. |
| 6,827,508 | B2 | 12/2004 | Stowe |
| 6,840,687 | B2 | 1/2005 | Riis et al. |
| 6,856,748 | B1 | 2/2005 | Elkins, II et al. |
| 6,908,236 | B2 | 6/2005 | Oishi et al. |
| 6,918,703 | B2 | 7/2005 | Chen et al. |
| 6,962,446 | B2 | 11/2005 | Greub et al. |
| 6,964,578 | B2 | 11/2005 | Clark et al. |
| 6,979,133 | B2 | 12/2005 | Montena |
| 7,016,592 | B2 | 3/2006 | Elkins, II et al. |
| 7,088,893 | B2 | 8/2006 | Cooke et al. |
| 7,090,406 | B2 | 8/2006 | Melton et al. |
| 7,104,702 | B2 | 9/2006 | Barnes et al. |
| 7,140,786 | B2 | 11/2006 | Takayanagi et al. |
| 7,216,512 | B2 | 5/2007 | Danley et al. |
| 7,220,061 | B2 | 5/2007 | De Marchi |
| 7,241,056 | B1 * | 7/2007 | Kuffel ............... G02B 6/3806 385/60 |
| 7,264,402 | B2 | 9/2007 | Theuerkorn et al. |
| 7,264,410 | B1 | 9/2007 | Doss et al. |
| 7,280,733 | B2 * | 10/2007 | Larson ............... G02B 6/3801 385/134 |
| 7,298,941 | B2 | 11/2007 | Palen et al. |
| 7,329,049 | B2 | 2/2008 | Meek et al. |
| 7,507,031 | B2 | 3/2009 | Kawasaki |
| 7,572,065 | B2 | 8/2009 | Lu et al. |
| 7,594,764 | B2 | 9/2009 | Palmer et al. |
| 7,628,549 | B2 | 12/2009 | Takahashi et al. |
| 7,665,901 | B2 * | 2/2010 | Kewitsch ............ G02B 6/3825 385/55 |
| 7,708,476 | B2 | 5/2010 | Liu |
| 7,744,286 | B2 | 6/2010 | Lu |
| 7,744,288 | B2 | 6/2010 | Lu et al. |
| 7,756,370 | B2 | 7/2010 | Hayasaka |
| 7,762,726 | B2 | 7/2010 | Lu et al. |
| 7,764,402 | B2 | 7/2010 | Kakutani et al. |
| 7,860,363 | B2 | 12/2010 | Kawasaki |
| 7,891,882 | B2 * | 2/2011 | Kuffel ............... G02B 6/3806 385/56 |
| 7,942,590 | B2 | 5/2011 | Lu et al. |
| 8,041,166 | B2 | 10/2011 | Kachmar |
| 8,043,013 | B2 | 10/2011 | Lichoulas et al. |
| 8,052,333 | B2 * | 11/2011 | Kuffel ............... G02B 6/3806 385/147 |
| 8,231,282 | B2 * | 7/2012 | Kuffel ............... G02B 6/3806 385/147 |
| 8,348,519 | B2 * | 1/2013 | Kuffel ............... G02B 6/3806 385/147 |
| 8,388,242 | B2 * | 3/2013 | Kachmar ............ G02B 6/4433 385/100 |
| 8,408,811 | B2 * | 4/2013 | de Jong .............. G02B 6/3846 385/69 |
| 8,496,384 | B2 * | 7/2013 | Kuffel ............... G02B 6/3806 385/147 |
| 8,714,835 | B2 * | 5/2014 | Kuffel ............... G02B 6/3806 385/56 |
| 8,939,654 | B2 | 1/2015 | Lu et al. |
| 9,016,953 | B2 | 4/2015 | Ott et al. |
| 2001/0017963 | A1 | 8/2001 | Shimotsu |
| 2002/0044749 | A1 | 4/2002 | Koike et al. |
| 2002/0131720 | A1 | 9/2002 | Chudoba et al. |
| 2002/0146214 | A1 | 10/2002 | Tanaka et al. |
| 2003/0044143 | A1 | 3/2003 | Trentelman et al. |
| 2004/0047566 | A1 | 3/2004 | McDonald et al. |
| 2004/0062480 | A1 | 4/2004 | Cronk et al. |
| 2004/0151437 | A1 | 8/2004 | Marrs et al. |
| 2005/0042387 | A1 | 2/2005 | Dower |
| 2005/0175308 | A1 | 8/2005 | Elkins et al. |
| 2005/0213891 | A1 | 9/2005 | Hardcastle et al. |
| 2005/0238292 | A1 | 10/2005 | Barnes et al. |
| 2005/0276549 | A1 | 12/2005 | Tabata et al. |
| 2006/0002662 | A1 | 1/2006 | Manning et al. |
| 2006/0103039 | A1 | 5/2006 | Shields et al. |
| 2006/0233506 | A1 | 10/2006 | Noonan et al. |
| 2007/0104425 | A1 * | 5/2007 | Larson ............... G02B 6/3801 385/86 |

(56) References Cited

U.S. PATENT DOCUMENTS

| | | | |
|---|---|---|---|
| 2007/0104445 A1* | 5/2007 | Larson | G02B 6/3801 385/134 |
| 2007/0110371 A1 | 5/2007 | Zimmel et al. | |
| 2007/0274657 A1 | 11/2007 | Billman et al. | |
| 2008/0019642 A1* | 1/2008 | Kewitsch | G02B 6/3825 385/72 |
| 2008/0069500 A1 | 3/2008 | Harness et al. | |
| 2008/0095504 A1 | 4/2008 | Kawasaki | |
| 2008/0131056 A1 | 6/2008 | Isenhour et al. | |
| 2008/0193089 A1 | 8/2008 | Miyamoto et al. | |
| 2008/0219624 A1 | 9/2008 | Pimpinella et al. | |
| 2009/0022457 A1* | 1/2009 | de Jong | G02B 6/3846 385/96 |
| 2009/0162019 A1 | 6/2009 | Lichoulas et al. | |
| 2010/0104243 A1* | 4/2010 | Kewitsch | G02B 6/3825 385/60 |
| 2010/0124394 A1 | 5/2010 | Meek et al. | |
| 2010/0129031 A1 | 5/2010 | Danley et al. | |
| 2010/0266242 A1 | 10/2010 | Lu et al. | |
| 2010/0266244 A1 | 10/2010 | Lu et al. | |
| 2010/0272397 A1 | 10/2010 | Komaki et al. | |
| 2010/0284653 A1 | 11/2010 | Tamekuni et al. | |
| 2010/0290741 A1 | 11/2010 | Lu et al. | |
| 2010/0303425 A1 | 12/2010 | Liu | |
| 2010/0322568 A1 | 12/2010 | Zimmel et al. | |
| 2011/0002586 A1 | 1/2011 | Nhep | |
| 2011/0097432 A1 | 4/2011 | Yu et al. | |
| 2011/0103753 A1 | 5/2011 | Wouters | |
| 2011/0173817 A1 | 7/2011 | Barnes et al. | |
| 2011/0176774 A1 | 7/2011 | Barnes et al. | |
| 2011/0176780 A1* | 7/2011 | Barnes | G02B 6/245 385/78 |
| 2011/0188813 A1 | 8/2011 | Marcouiller et al. | |
| 2011/0226019 A1 | 9/2011 | Huang et al. | |
| 2011/0280525 A1 | 11/2011 | Marcouiller et al. | |
| 2011/0311185 A1* | 12/2011 | Kachmar | G02B 6/4433 385/78 |
| 2012/0177328 A1 | 7/2012 | Marcouiller et al. | |
| 2012/0219258 A1 | 8/2012 | Grandidge et al. | |
| 2012/0243832 A1 | 9/2012 | Tamekuni et al. | |
| 2012/0288238 A1 | 11/2012 | Park et al. | |
| 2013/0008594 A1 | 1/2013 | Takeuchi et al. | |
| 2013/0136857 A1 | 5/2013 | Blanchetiere et al. | |
| 2014/0086534 A1 | 3/2014 | Lu et al. | |
| 2014/0321813 A1 | 10/2014 | Lu | |

FOREIGN PATENT DOCUMENTS

| | | |
|---|---|---|
| DE | 195 17 750 A1 | 11/1996 |
| EP | 0 125 398 A1 | 11/1984 |
| EP | 1 122 564 A2 | 8/2001 |
| EP | 1 197 311 A1 | 4/2002 |
| EP | 1 336 882 A2 | 8/2003 |
| GB | 2 148 537 A | 5/1985 |
| JP | 61-9612 | 1/1986 |
| JP | 7-234344 | 9/1995 |
| JP | 8-234042 | 9/1996 |
| JP | 8-262271 | 10/1996 |
| JP | 11-287929 | 10/1999 |
| JP | 2002-40290 | 2/2002 |
| JP | 2002-82257 | 3/2002 |
| JP | 2008-116840 | 5/2008 |
| JP | 2011-95410 | 5/2011 |
| JP | 2011107590 A * | 6/2011 |
| TW | 571134 | 1/2004 |
| TW | 592934 | 6/2004 |
| WO | WO 01/27673 | 4/2001 |
| WO | WO 2004/028993 A1 | 4/2004 |
| WO | WO 2006/032153 A1 | 3/2006 |
| WO | WO 2009/011799 A1 | 1/2009 |
| WO | WO 2010/090211 A1 | 8/2010 |
| WO | WO 2011/087941 A1 | 7/2011 |
| WO | WO 2011/087942 A1 | 7/2011 |
| WO | WO 2011/087944 A1 | 7/2011 |
| WO | WO 2012/005407 A1 | 1/2012 |

OTHER PUBLICATIONS

FuseConnect™ Fusion Spliced Field-terminated SC Connector, AFL Telecommunications, 6 pages (Copyright 2007).

Abe, K. et al., "Modal interference in a short fiber section: fiber length, splice loss, cutoff, and wavelength dependences," *Optical Fiber Communication Conference*, p. 139, No. ThA3 (Feb. 1991).

De Jong, M., "Cleave and crimp fiber optic connector for field installation," *Optical Fiber Communication Conference, 1990 Technical Digest Series*, vol. 1, Conference Edition, 3 pages (Jan. 1990).

Duff, D.G. et al., "Measurements of modal noise in single-mode lightwave systems," *Conference on Optical Fiber Communication*, Paper No. TU01, 5 pages (Feb. 1985).

Extended European Search Report for Application No. 13751305.7 mailed Aug. 28, 2015.

FuseConnect™ ST Installation & Assembly Instructions, 14 pages (Mar. 2, 2011).

Goodwin, J.C. et al., "Modal Noise in Short Fiber Sections," *Journal of Lightwave Technology*, vol. 9, No. 8, pp. 954-958 (Aug. 1991).

Harris, D. et al., "Azimuthal Dependence of Modal Interference in Closely Spaced Single-Mode Fiber Joints," *IEEE Photonics Technology Letters*, vol. 6, No. 10, pp. 1235-1237 (Oct. 1994).

Harris, D.O. et al., "Characterizing Modal Interference in Field Installable Single-Mode Fiber Connectors Incorporating Short Fiber Stubs," *Technical Digest—Symposium on Optical Fiber Measurements*, NIST Special Publication 864, pp. 35-38 (Sep. 1994).

Heckmann, S., "Modal noise in single-mode fibres operated slightly above cutoff," *Electronics Letters*, vol. 17, No. 14, pp. 499-500 (Jul. 1981).

International Search Report and Written Opinion for PCT/US2013/026904 mailed Aug. 14, 2013.

Li, M-J. et al., "Optical Fiber Design for Field Mountable Connectors," *Journal of Lightwave Technology*, vol. 18, No. 3, pp. 314-319 (Mar. 2000).

Lynx2 CustomFit® MPO Splice-On Connector, http://www.sumitoelectric.com/products/fusionsplicers/lynx_mpo/, 2 pages (Copyright 2011).

Ohzawa, K. et al., "Development of new optical fiber fusion splicer for factory use," *International Wire & Cable Symposium Proceedings*, pp. 644-649 (1999).

Olson, G. et al., "Modal Noise in Single-Mode Fiber-Optic Systems with Closely Spaced Splices," *Fiber and Integrated Optics*, vol. 9, pp. 237-244 (1990).

Partial International Search for PCT/US2013/026904 mailed May 31, 2013.

Throckmorton, R. et al., "Modal Interference in Field Installable Single-Mode Fiber-Optic Connectors," *Proc. 10th National Fiber Optic Engineers Conference*, vol. 3, pp. 399-406 (1994).

Yablon, Andrew D., "Optical Fusion Splicing" Section 6.6.1; 5 pp.

* cited by examiner

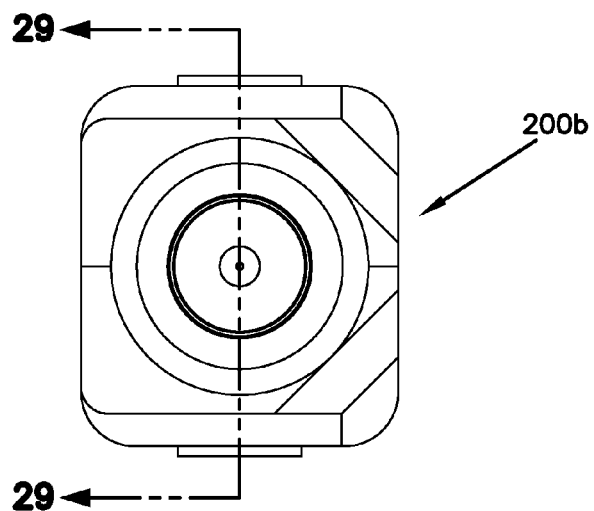
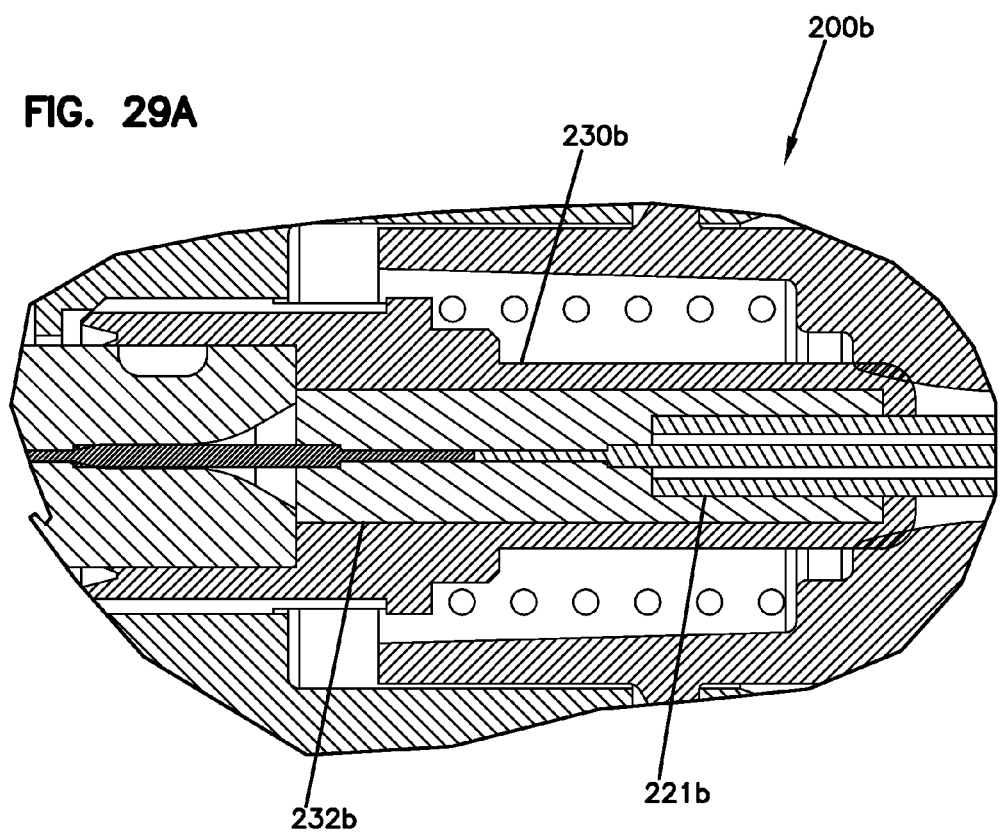

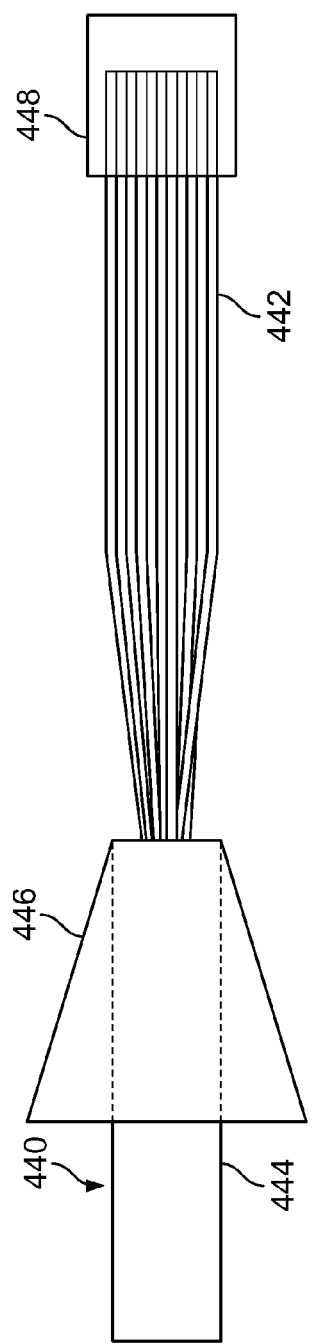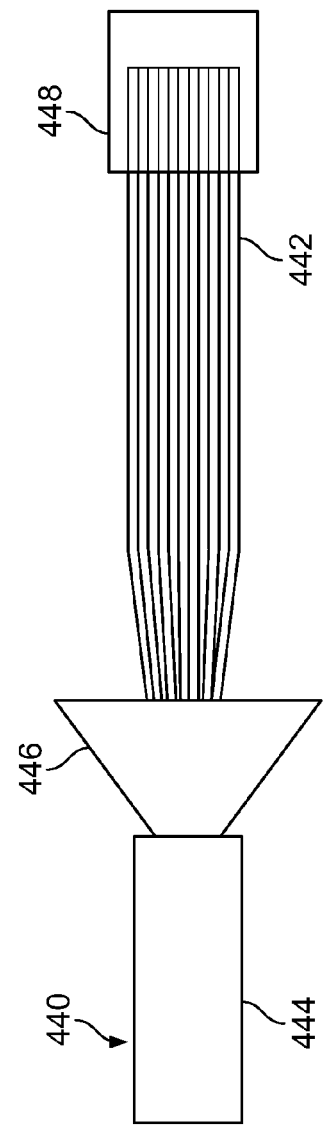

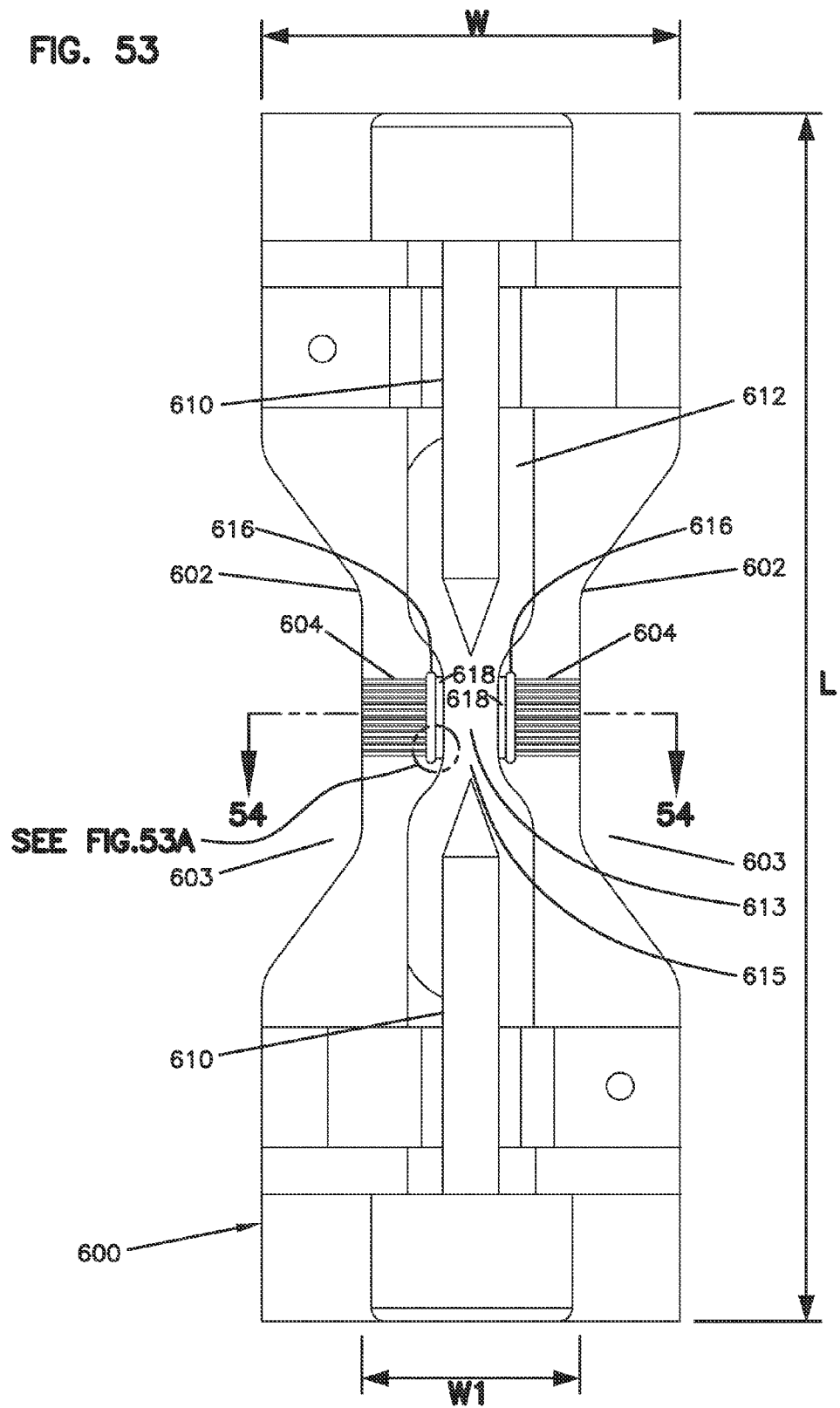

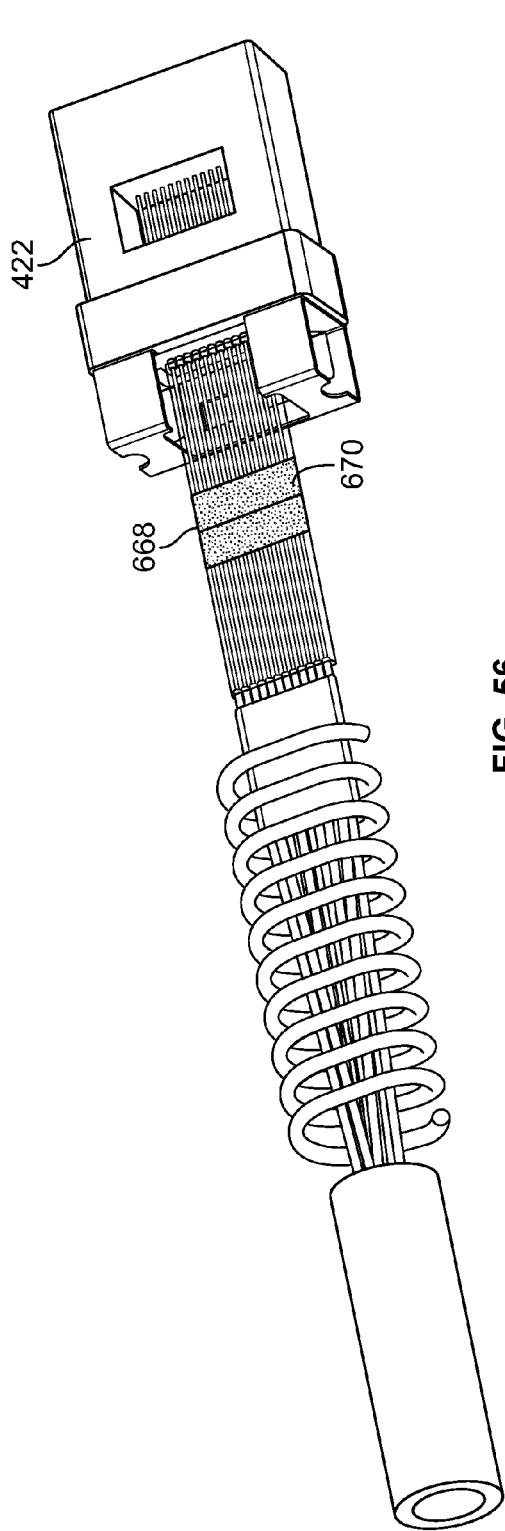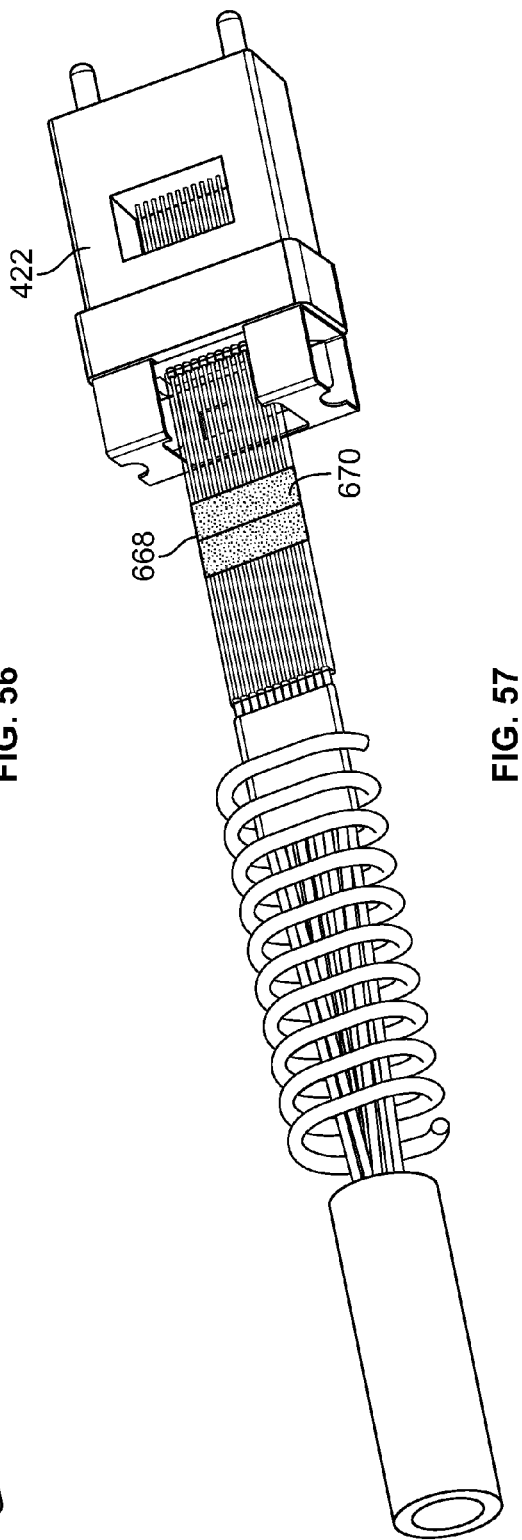

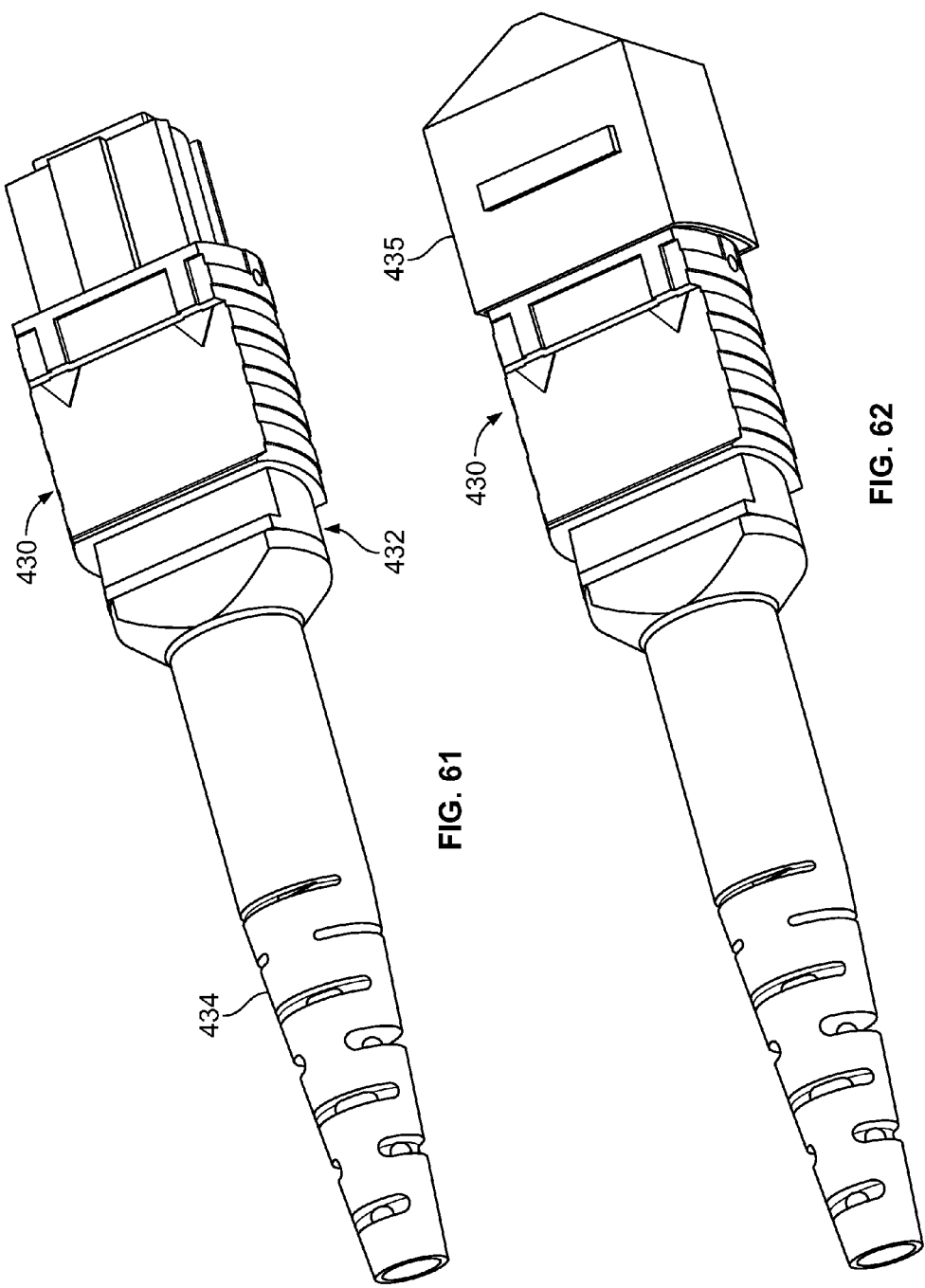

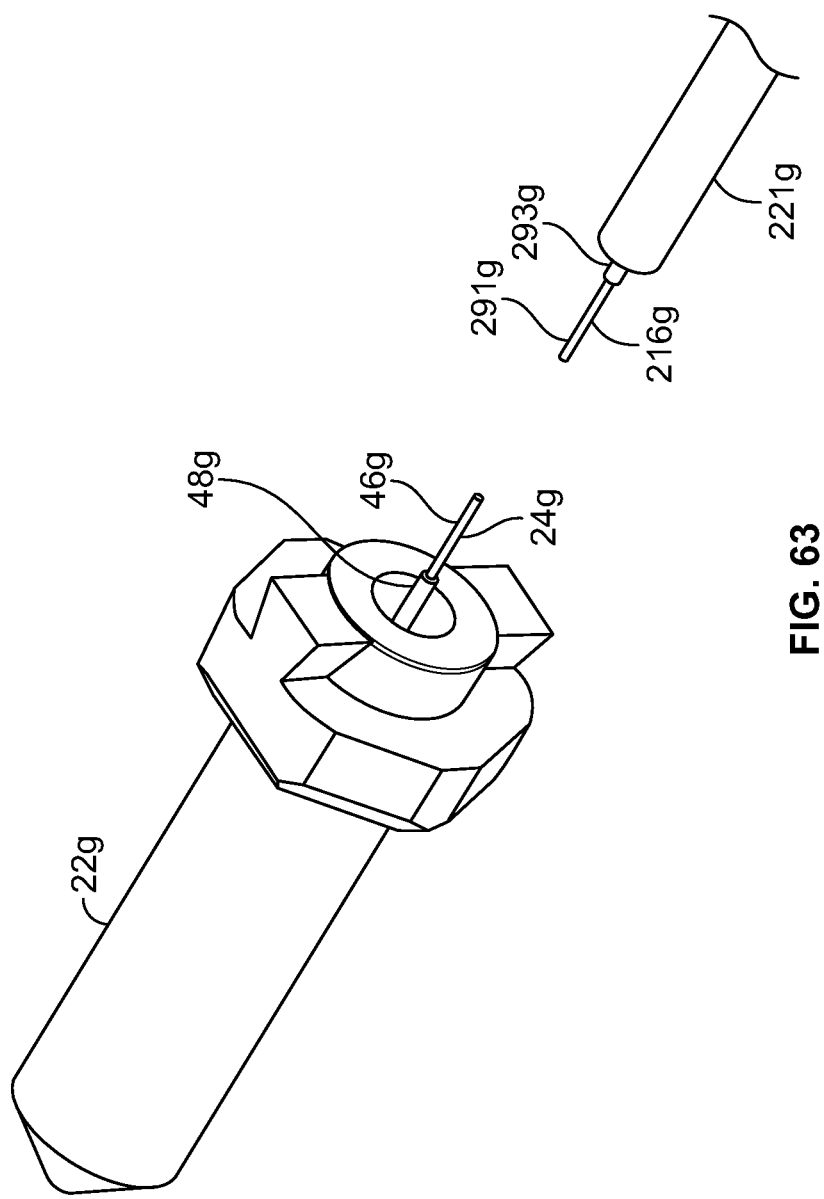

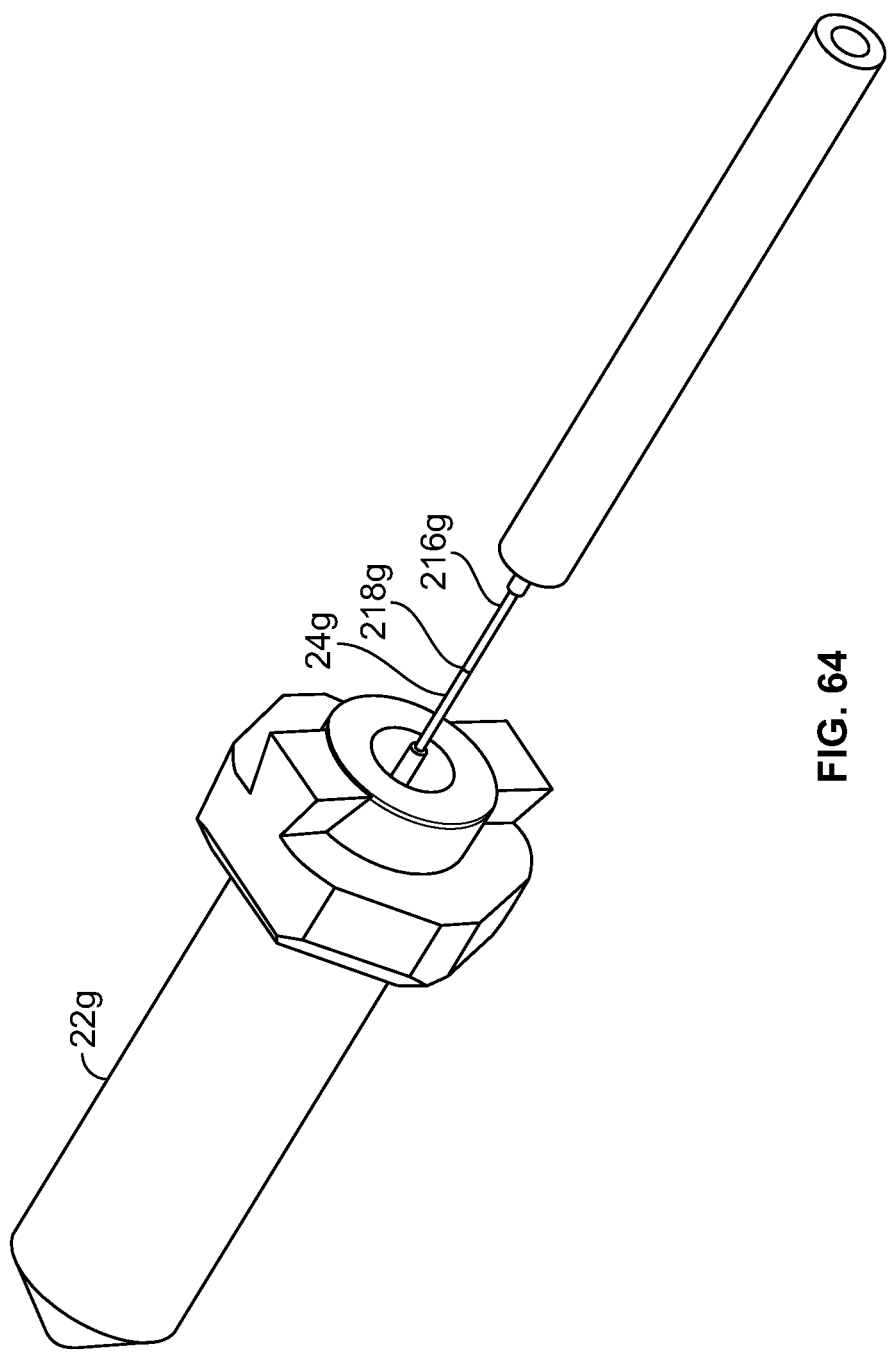

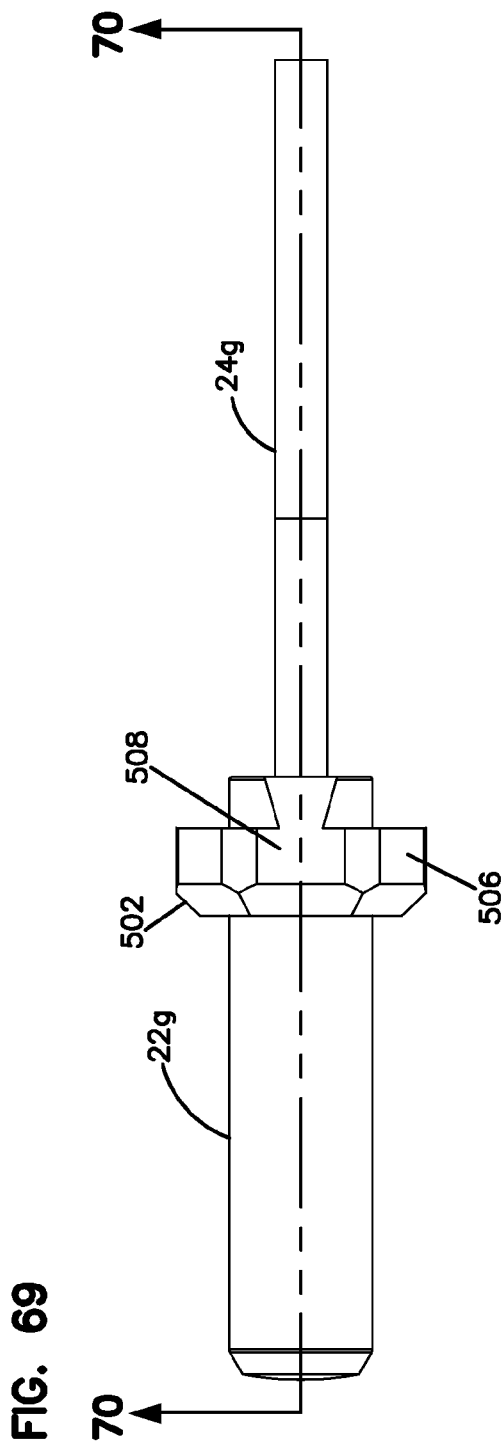
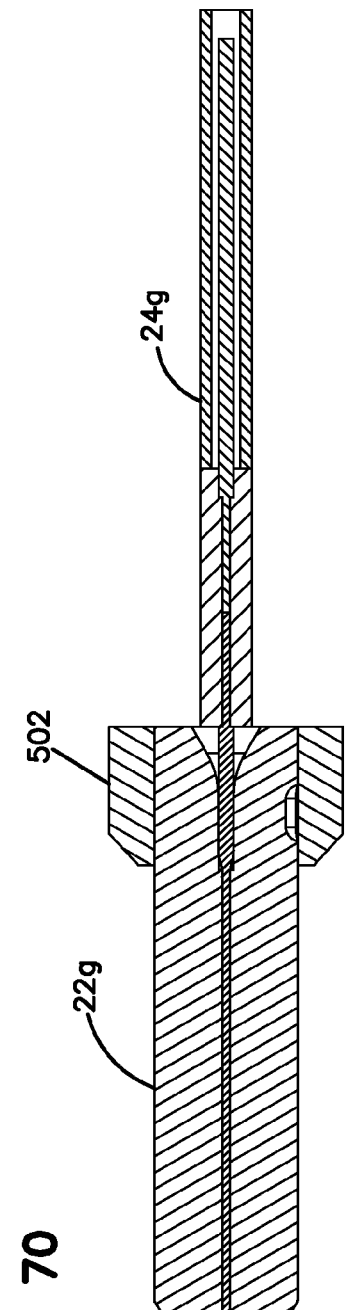
FIG. 69
FIG. 70

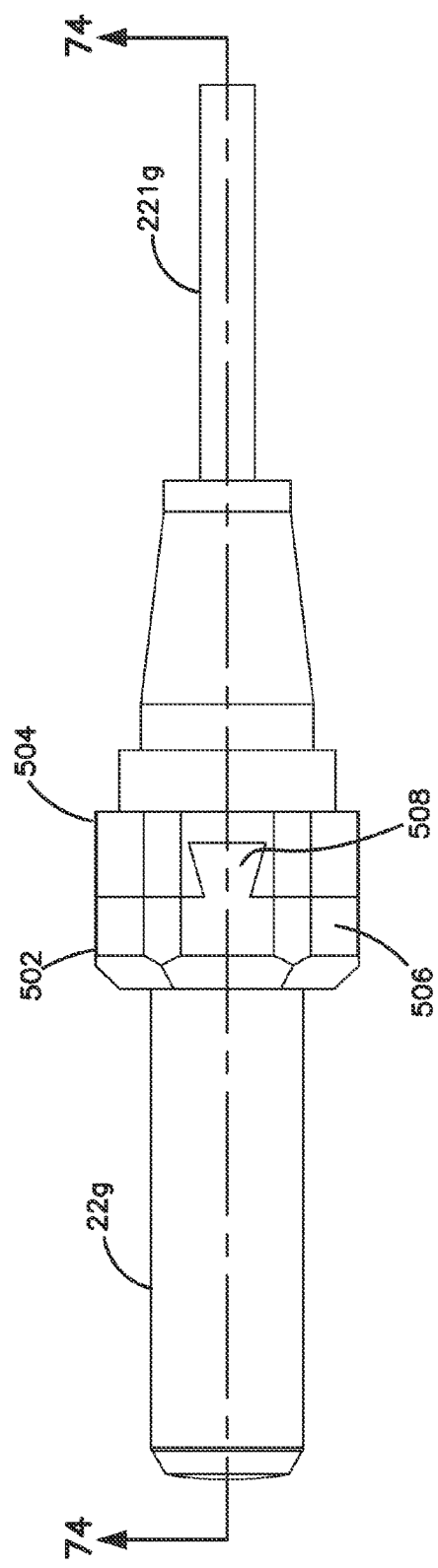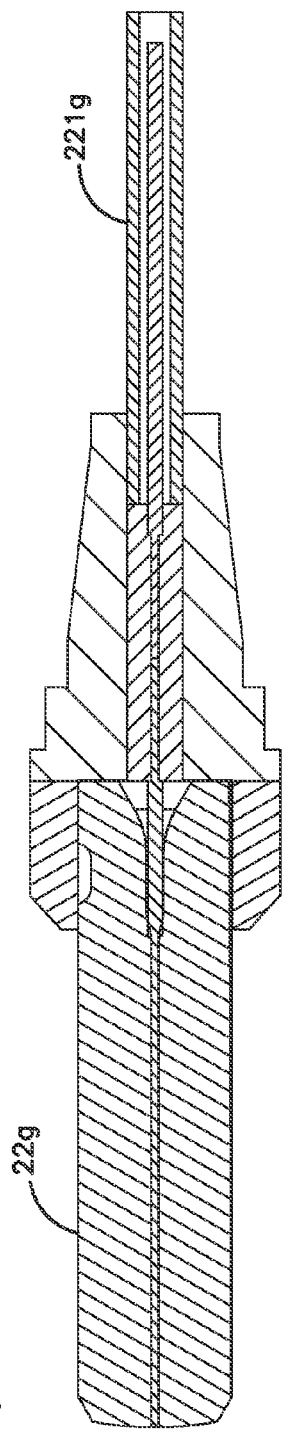

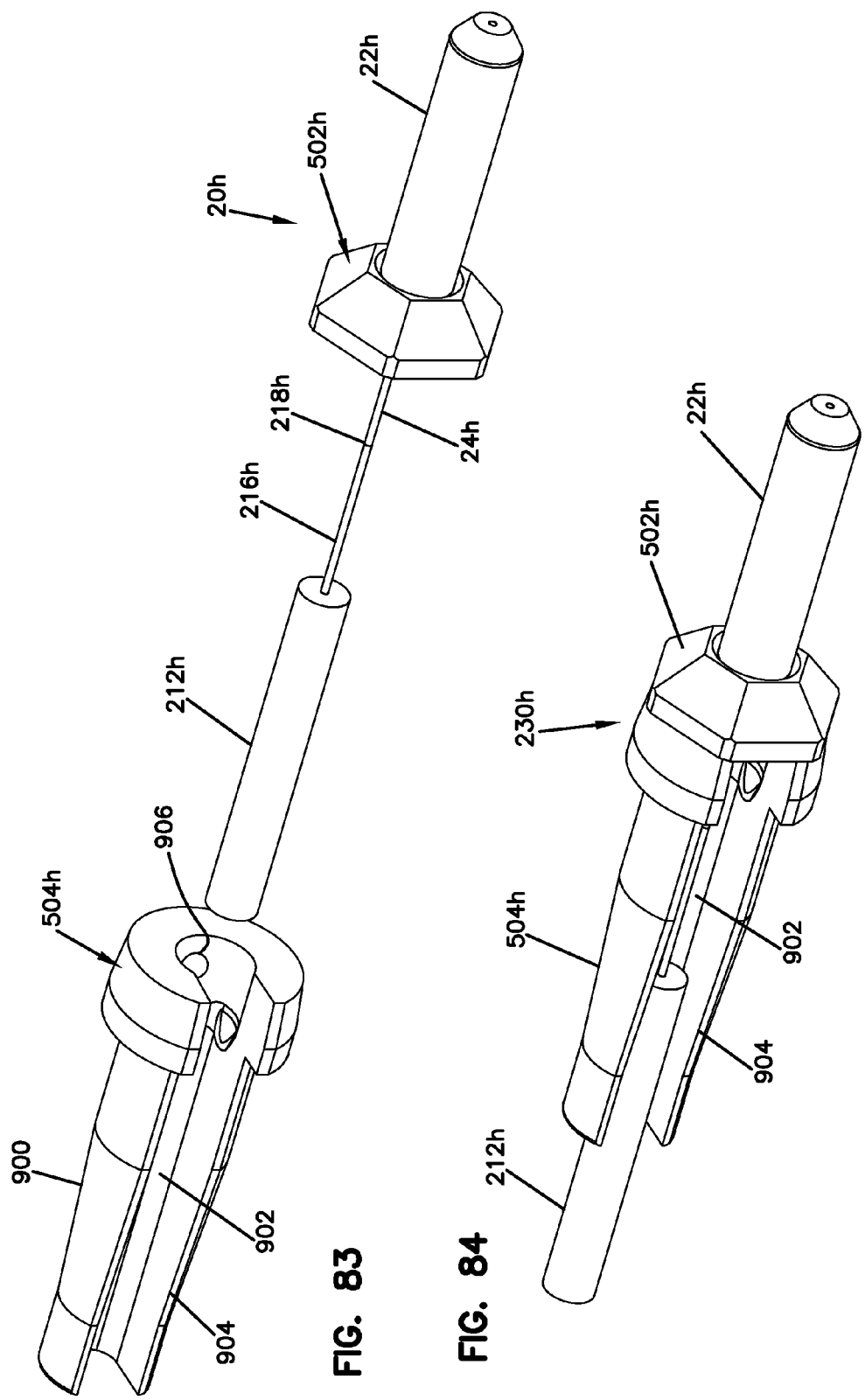

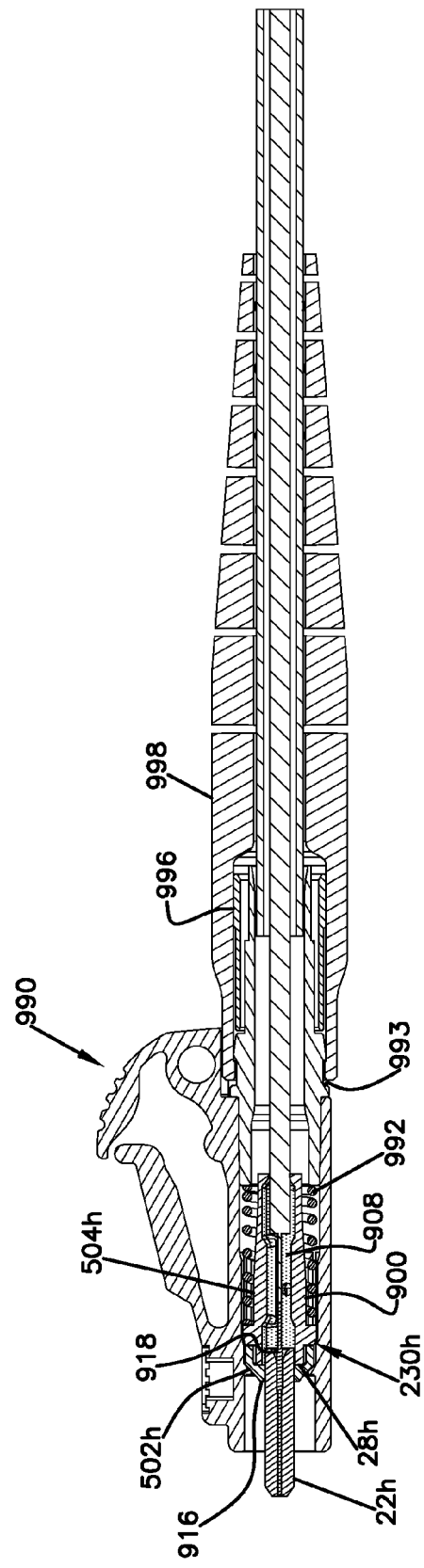

FIBER OPTIC CONNECTOR, FIBER OPTIC CONNECTOR AND CABLE ASSEMBLY, AND METHODS FOR MANUFACTURING

CROSS-REFERENCE TO RELATED APPLICATIONS

This application is a continuation of application Ser. No. 13/772,059, filed Feb. 20, 2013, now issued as U.S. Pat. No. 9,016,953, which application claims the benefit of U.S. Provisional Patent Application Ser. No. 61/691,621, filed Aug. 21, 2012, U.S. Provisional Patent Application Ser. No. 61/666,683, filed Jun. 29, 2012, U.S. Provisional Patent Application Ser. No. 61/661,667, filed Jun. 19, 2012 and U.S. Provisional Patent Application Ser. No. 61/600,915, filed Feb. 20, 2012, which applications are hereby incorporated herein by reference in their entireties.

TECHNICAL FIELD

The present disclosure relates generally to optical fiber communication systems. More particularly, the present disclosure relates to fiber optic connectors, fiber optic connector and cable assemblies and methods for manufacturing.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected and disconnected.

A typical fiber optic connector includes a ferrule assembly supported at a front end of a connector housing. The ferrule assembly includes a ferrule and a hub mounted to a rear end of the ferrule. A spring is used to bias the ferrule assembly in a forward direction relative to the connector housing. The ferrule functions to support an end portion of at least one optical fiber (in the case of a multi-fiber ferrule, the ends of multiple fibers are supported). The ferrule has a front end face at which a polished end of the optical fiber is located. When two fiber optic connectors are interconnected, the front end faces of their respective ferrules abut one another and the ferrules are forced together by the spring loads of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of a fiber optic adapter that receives the connectors, aligns the ferrules and mechanically holds the connectors in a connected orientation relative to one another.

A fiber optic connector is often secured to the end of a corresponding fiber optic cable by anchoring a tensile strength structure (e.g., strength members such as aramid yarns, fiberglass reinforced rods, etc.) of the cable to the connector housing of the connector. Anchoring is typically accomplished through the use of conventional techniques such as crimps or adhesive. Anchoring the tensile strength structure of the cable to the connector housing is advantageous because it allows tensile load applied to the cable to be transferred from the strength members of the cable directly to the connector housing. In this way, the tensile load is not transferred to the ferrule assembly of the fiber optic connector. If the tensile load were to be applied to the ferrule assembly, such tensile load could cause the ferrule assembly to be pulled in a proximal direction against the bias of the connector spring thereby possibly causing an optical disconnection between the connector and its corresponding mated connector. Fiber optic connectors of the type described above can be referred to as pull-proof connectors. In other connector styles, the tensile strength layer of the fiber optic cable can be anchored to the hub of the ferrule assembly.

Connectors are typically installed on fiber optic cables in the factory through a direct termination process. In a direct termination process, the connector is installed on the fiber optic cable by securing an end portion of an optical fiber of the fiber optic cable within a ferrule of the connector. After the end portion of the optical fiber has been secured within the ferrule, the end face of the ferrule and the end face of the optical fiber are polished and otherwise processed to provide an acceptable optical interface at the end of the optical fiber. A direct termination is preferred because it is fairly simple and does not have losses of the type associated with a spliced connection.

A number of factors are important with respect to the design of a fiber optic connector. One aspect relates to ease of manufacturing and assembly. Another aspect relates to connector size and compatibility with legacy equipment. Still another aspect relates to the ability to provide high signal quality connections with minimal signal degradation.

SUMMARY

The present disclosure relates to fiber optic connectors having in-body fusion splices. In certain embodiments, the connectors are configured to be fully compatible with legacy equipment such as standard patch panels and standard fiber optic adapters. In other embodiments, such connectors can include factory fusion splices. In certain embodiments, the connectors are in full compliance with Telcordia GR-326 or similar stringent industry or customer specifications (e.g., TIA-EIA 568-C.3; IEC 61753-X; and IEC 61755-X). In certain embodiments, the connectors are in compliance with Telcordia GR-326 or similar stringent industry or customer specifications with respect to length and side load testing. In certain embodiments, such connectors are less than or equal to the GR-326 requirement of 57 millimeters in length.

Various methods of manufacture are disclosed for making the disclosed connectors and other components. In one method, an injection molding process is used in which ultraviolet (UV) light curable material is introduced into a mold cavity formed by a pair of molding blocks wherein the material is cured by a UV light while still within the mold cavity. In one embodiment, the process is used to form an overmolded part onto a component. In one embodiment, the component is a ferrule in a fiber optic connector.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 28 is a front end view of a further fiber optic connector in accordance with the principles of the present disclosure;

FIG. 29A is an enlarged view of a portion of FIG. 29;

FIGS. 43-48 illustrate a sequence of steps for preparing a multi-fiber optical cable for splicing to the optical fiber stub of the multi-fiber ferrule of FIG. 41;

FIG. 53 is a top view of the fusion splicing tray of FIG. 52;

FIGS. 55-62 show a sequence of steps for assembling the multi-fiber connector of FIG. 42 after the fiber stub of the multi-fiber ferrule of FIG. 41 has been spliced to the multi-fiber cable of FIGS. 43-48;

FIGS. 63-67 show an alternative embodiment showing a manufacturing sequence for splicing a fiber stub of a ferrule to a fiber of a cable and for enclosing the splice and a portion of the ferrule within a composite hub suitable for use in any of the fiber optic connectors disclosed herein according to the principles of the present invention;

FIG. 69 is a side view of FIG. 68;

FIG. 70 is a cross-sectional view taken along section line 70-70 of FIG. 69;

FIG. 73 is a side view of FIG. 72; and

FIG. 74 is a cross-sectional view taken along section line 74-74 of FIG. 73;

FIG. 83 is an exploded view of another ferrule and hub assembly in accordance with the principles of the present disclosure;

FIG. 84 is a partially assembled view of the ferrule and hub assembly of FIG. 83;

FIG. 93 is a cross-sectional view of the connector of FIG. 92.

DETAILED DESCRIPTION

Figure 1:
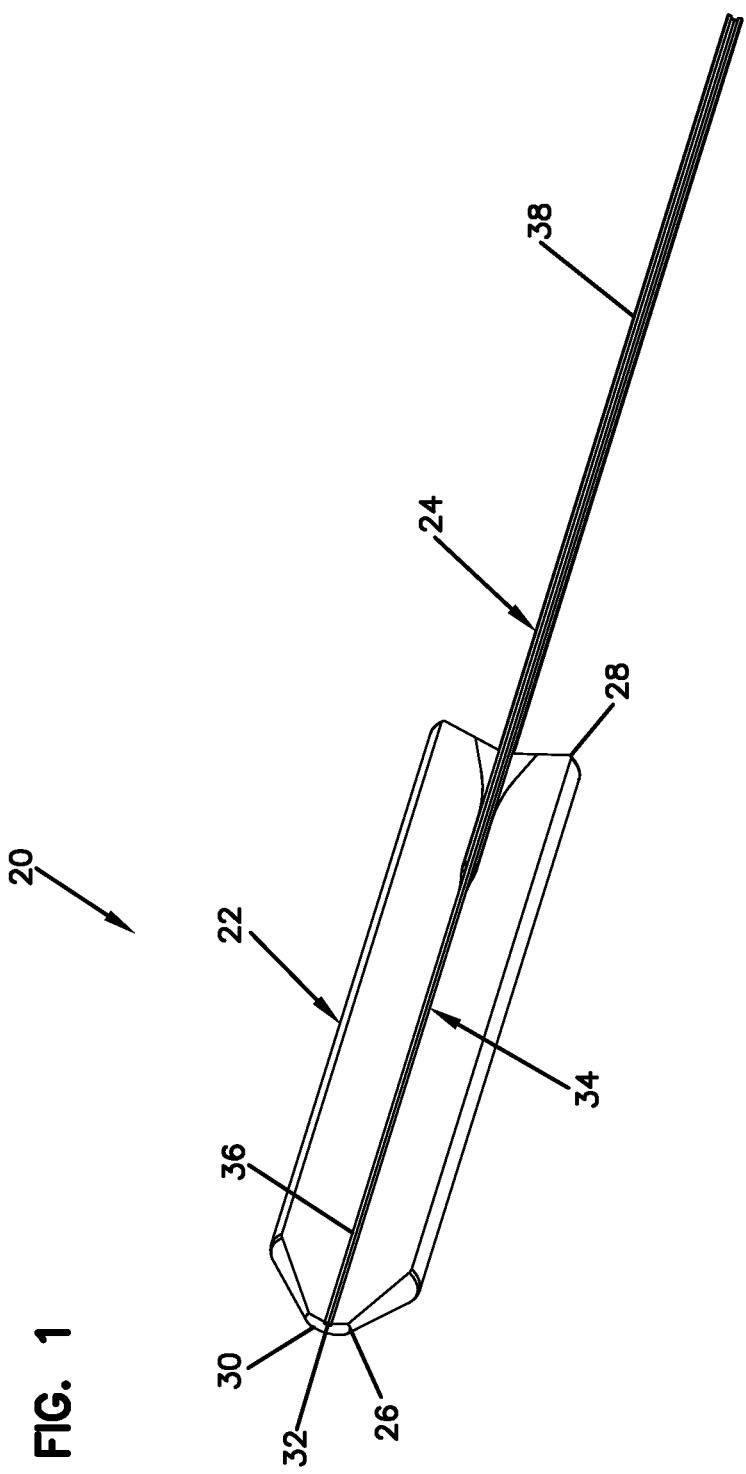
FIG. 1 is a front, perspective, cross-sectional view of a ferrule assembly in accordance with the principles of the present disclosure.
Figure 2:
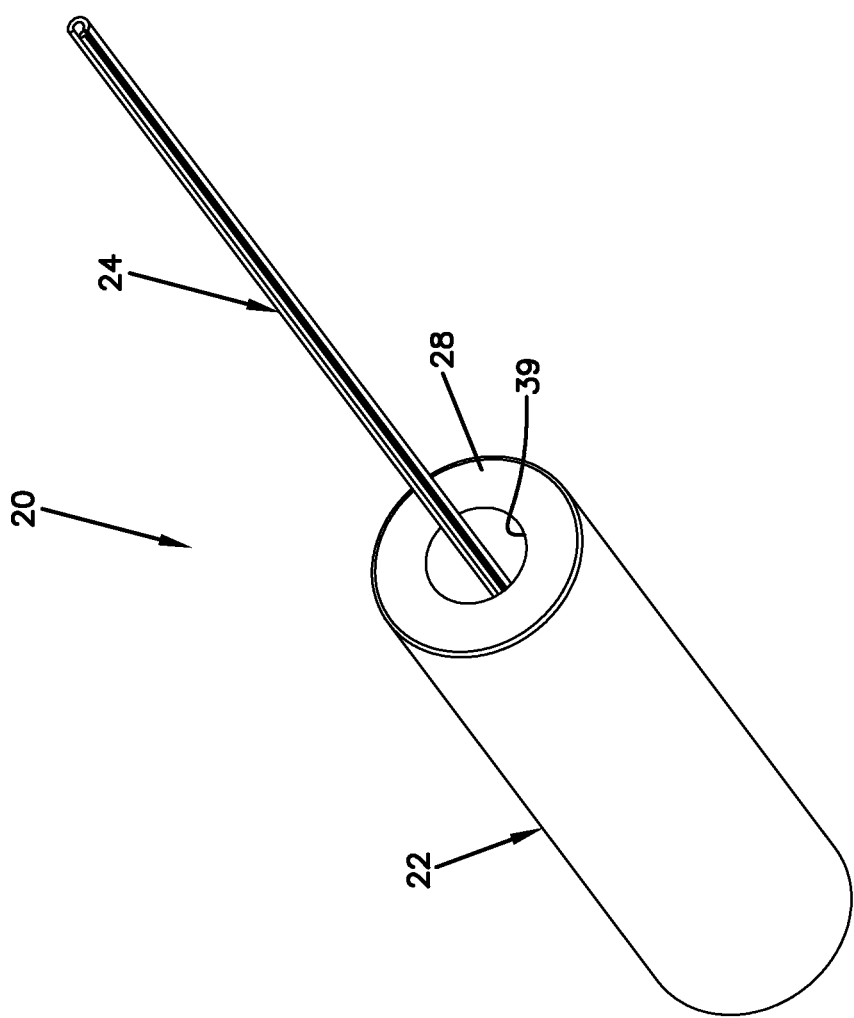
FIG. 2 is a rear, perspective view of the ferrule assembly of FIG. 1.

FIGS. 1 and 2 illustrate a ferrule assembly 20 in accordance with the principles of the present disclosure. The ferrule assembly 20 includes a ferrule 22 and an optical fiber stub 24 secured to the ferrule 22. The optical fiber stub 24 can be referred to as a "first optical fiber." The ferrule 22 includes a front end 26 positioned opposite from a rear end 28. The front end 26 preferably includes an end face 30 at which an interface end 32 of the optical fiber stub 24 is located. The ferrule 22 defines a ferrule bore 34 that extends through the ferrule 22 from the front end 26 to the rear end 28. The optical fiber stub 24 includes a first portion 36 secured within the ferrule bore 34 and a second portion 38 that extends rearwardly from the rear end 28 of the ferrule 22. The second portion 38 can be referred to as a "pigtail" or as a "free end portion."

The ferrule 22 is preferably constructed of a relatively hard material capable of protecting and supporting the first portion 36 of the optical fiber stub 24. In one embodiment, the ferrule 22 has a ceramic construction. In other embodiments, the ferrule 22 can be made of alternative materials such as Ultem, thermoplastic materials such as Polyphenylene sulfide (PPS), other engineering plastics or various metals. In example embodiments, the ferrule 22 has a length L1 in the range of 5-15 millimeters (mm), or in the range of 8-12 mm.

The first portion 36 of the optical fiber stub 24 is preferably secured by an adhesive (e.g., epoxy) within the ferrule bore 34 of the ferrule 22. The interface end 32 preferably includes a polished end face accessible at the front end 32 of the ferrule 22.

Figure 3:
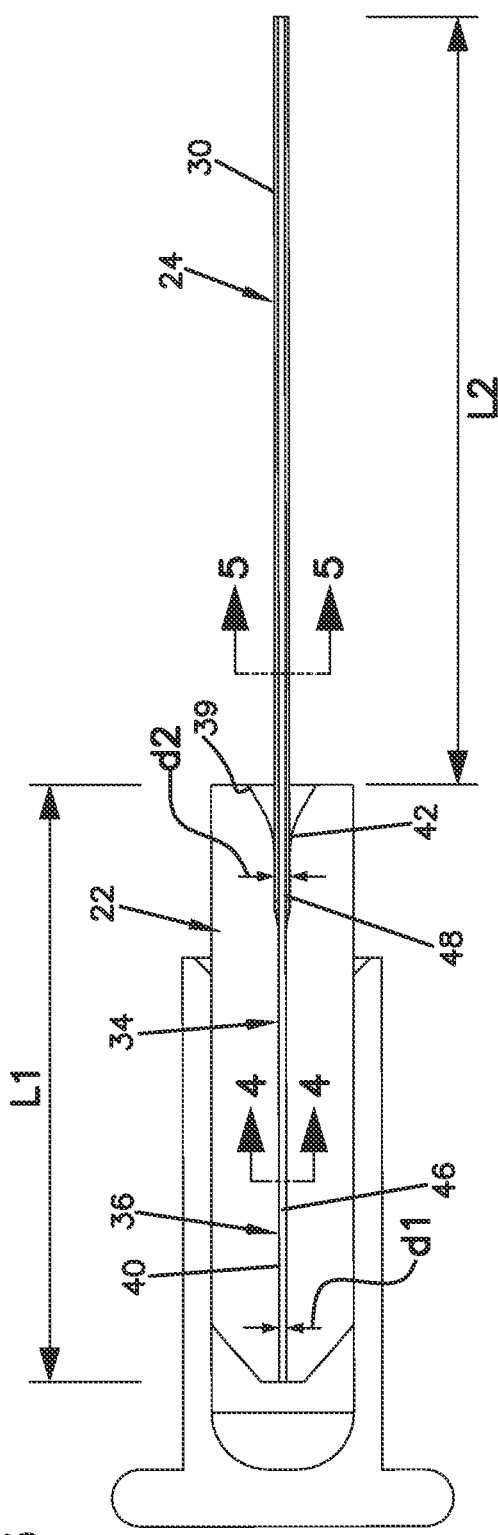
FIG. 3 is a longitudinal cross-sectional view of the ferrule assembly of FIG. 1 with a dust cap installed on the ferrule.

Referring to FIG. 3, the ferrule bore 34 has a stepped-configuration with a first bore segment 40 having a first diameter d1 and a second bore segment 42 having a second diameter d2. The second diameter d2 is larger than the first diameter d1. A diameter step 44 provides a transition from the first diameter d1 to the second diameter d2. The first bore segment 40 extends from the front end 26 of the ferrule 22 to the diameter step 44. The second bore segment 42 extends from the diameter step 44 toward the rear end 28 of the ferrule 22. The ferrule bore 34 also includes a conical transition 39 that extends from the second bore segment 42 to the rear end 28 of the ferrule 22. In certain embodiments, the first diameter d1 is about 125.5 microns with a tolerance of +1 micron. In certain embodiments, the second diameter d2 can be about 250 microns so as to accommodate a coated optical fiber, or about 900 microns so as to accommodate a coated and buffered optical fiber. In one example, d1 is in the range of 230-260 microns and d2 is in the range of 500-1100 microns.

Figure 6:
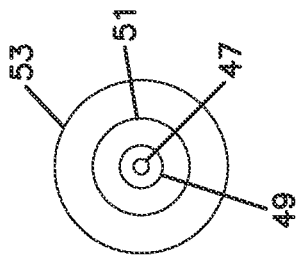
FIG. 6 is a cross-sectional view showing an alternative configuration for the coated fiber portion of FIG. 5.
Figure 5:
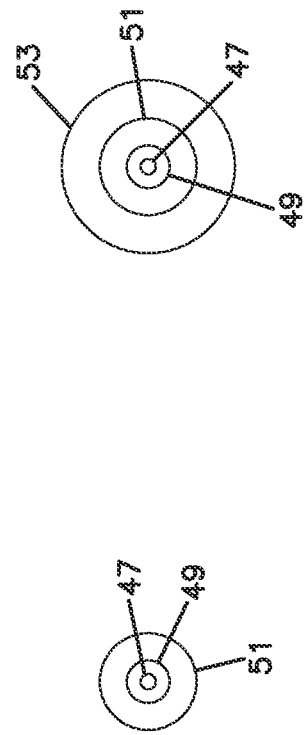
FIG. 5 is a cross-sectional view taken along section line 5-5 of FIG. 3, the cross-section shows a coated fiber portion of the ferrule assembly.
Figure 4:
FIG. 4 is a cross-sectional view taken along section line 4-4 of FIG. 3, the cross-sectional view shows a bare fiber portion of an optical fiber of the ferrule assembly.

The first portion 36 of the optical fiber stub 24 includes a bare fiber segment 46 that fits within the first bore segment 40 of the ferrule 22 and a coated fiber segment 48 that fits within the second bore segment 42 of the ferrule 22. The bare fiber segment 46 is preferably bare glass and, as shown at FIG. 4, includes a core 47 surrounded by a cladding layer 49. In a preferred embodiment, the bare fiber segment 46 has an outer diameter that is no more than 0.4 microns smaller than the first diameter d1. In certain embodiments, the coated fiber segment 48 includes one or more coating layers 51 surrounding the cladding layer 49 (see FIG. 5). In certain embodiments, the coating layer or layers 51 can include a polymeric material such as acrylate having an outer diameter in the range of about 230-260 microns. In still other embodiments, the coating layer/layers 51 can be surrounded by a buffer layer 53 (e.g., a tight or loose buffer layer) (see FIG. 6) having an outer diameter in the range of about 500-1100 microns.

The second portion 38 of the optical fiber stub 24 preferably has a length L2 that is relatively short. For example, in one embodiment, the length L2 of the second portion 38 is less than the length L1 of the ferrule 22. In still other embodiments, the length L2 is no more than 20 mm, or is no more than 15 mm, or is no more than 10 mm. In still other embodiments, the length L2 of the second portion 38 is in the range of 1-20 mm, or in the range of 1-15 mm, or in the range of 1-10 mm, or in the range of 2-10 mm, or in the range of 1-5 mm, or in the range of 2-5 mm, or less than 5 mm, or less than 3 mm, or in the range of 1-3 mm.

Figure 7:
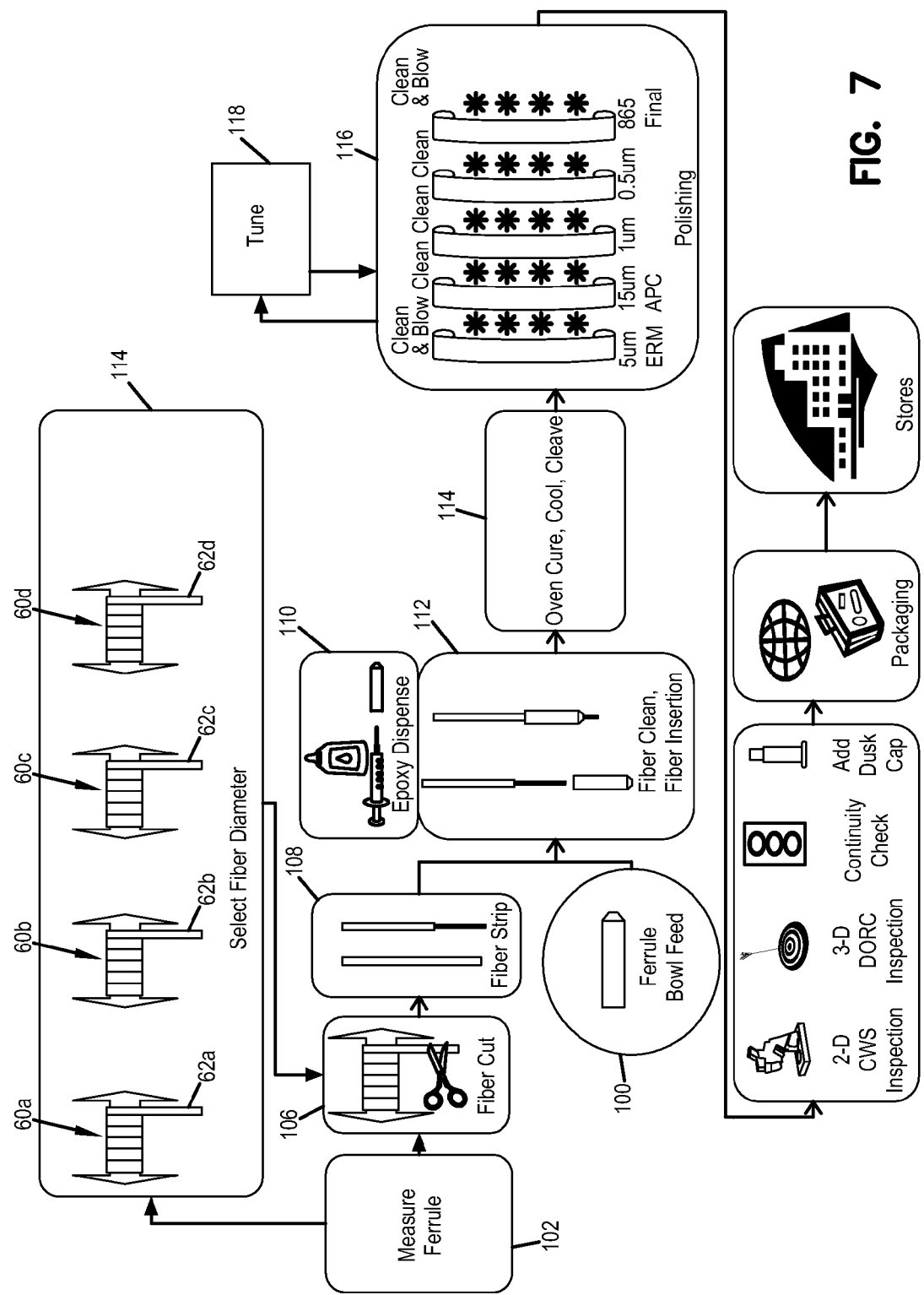
FIG. 7 is a flow chart illustrating a process sequence for manufacturing the ferrule assembly of FIG. 1.

FIG. 7 outlines a process for manufacturing the ferrule assembly 20 of FIGS. 1-3. The manufacturing process begins at step 100 where the ferrule 22 is fed to a processing station or location. It will be appreciated that the ferrule 22 can be fed by an automated feed mechanism such as a bowl feed mechanism.

Once the ferrule 22 has been selected and fed or otherwise moved to the processing station, the inner diameter of the ferrule 22 is preferably measured (see step 102). For example, the first diameter d1 defined by the first bore segment 40 of the ferrule bore 34 is preferably measured. An automated ferrule handler (e.g., a gripper/holder 37 as shown schematically at FIG. 8) can receive the ferrule 22 from the automated feed mechanism and can hold and/or manipulate the ferrule 22 during measurement.

Once the first diameter d1 of the ferrule bore 34 has been determined, an optical fiber suitable for insertion within the ferrule is selected (see step 104). Preferably, a plurality of fiber spools 60*a*-60*d* is provided at the processing station. Each of the fiber spools 60*a*-60*d* includes a separate optical fiber 62*a*-62*d*. Each of the optical fibers 62*a*-62*d* preferably has a different cladding outer diameter. It is desirable to select the optical fiber 62*a*-62*d* having a cladding outer diameter that is closest to the measured diameter d1 of the ferrule 22. In certain embodiments, the measured first diameter d1 is no more than 0.4 microns larger than the cladding outer diameter of the selected optical fiber 62*a*-62*d*.

To enhance core concentricity with respect to the outer diameter of the ferrule 22, it is desirable for the optical fibers 62*a*-62*d* to be high precision optical fibers in which parameters such as cladding outer diameter and core-to-cladding concentricity are manufactured to relatively tightly tolerance. In certain embodiments, each of the optical fibers 62*a*-62*d* has an outer cladding diameter manufactured within a tolerance of +/−0.7 microns and also has a core-to-cladding concentricity offset less than or equal to 0.5 microns (i.e., the center of the core is offset from the center of the cladding diameter by no more than 0.5 microns). The ferrule 22 is also preferably manufactured to relatively precise tolerance specifications. For example, in one embodiment, the diameter d1 of the ferrule has a dimension of 125.5 microns plus 1.0 micron, minus 0.0 microns. Additionally, the ferrule 22 can have a fiber bore to outer diameter concentricity offset less than or equal to 1 micron (i.e., the center of the ferrule bore is offset from the center of the outer diameter of the ferrule by no more than 1 micron). By using a precision ferrule in combination with a precision optical fiber, and by having several different sized precision optical fibers from which to select the optical fiber to be inserted in the ferrule, it is possible to optimize concentricity of the optical fiber within the ferrule 22 without rotational tuning and even more so with rotational tuning. In one economically reasonable embodiment, four fibers of known diameters of 125.3 microns, 125.6 microns, 125.9 microns, and 126.2 microns could be employed to match the ferrule inner diameter to within 0.2 to 0.3 microns. By using this fiber selection process as part of the manufacturing process, it is possible for all of the ferrule assemblies 20 output from the manufacturing process to have a measured first diameter d1 that is no more than 0.4 microns larger than the cladding outer diameter of the selected optical fiber 62*a*-62*d*. Those that fall outside of the tolerance can be rejected, but because of the process only a relatively small number may fall outside of the tolerance thereby enhancing the cost effectiveness of the process. In other embodiments, the ferrule assemblies 20 manufactured and output according to the process can have measured first diameters d1 that on average are no more than 0.4 microns larger than the cladding outer diameters of the selected optical fiber 62*a*-62*d*.

Once the optical fiber 62*a*-62*d* of the appropriate diameter has been selected, the optical fiber is cut to length to form the stub optical fiber 24 (see step 106). In certain embodiments, the cut optical fiber 24 has a length less than 40 microns. In other embodiments, the optical fiber 24 has a length less than 30 microns, or less than 25 microns, or less than 20 microns, or less than 15 microns. In still other embodiments, the cut optical fiber has a length in the range of 12-25 microns.

At step 108, the optical fiber 24 is stripped. By stripping the optical fiber 24, the bare fiber segment 46 is exposed. The bare fiber segment 46 preferably includes a glass core 47 and cladding 49 as shown at FIG. 4. The cutting and stripping steps can be automated.

After stripping of the optical fiber 24, epoxy is dispensed into the ferrule bore 34 of the ferrule 22 (see step 110), and the optical fiber 24 is inserted into the ferrule bore 34. Because of the relatively tight tolerance between the first diameter d1 of the bare fiber segment 46 of the optical fiber stub 24 and the first portion 36 of the fiber bore 34, surface tension between the epoxy within the ferrule bore 34 and the optical fiber stub 24 provides a self-centering function that assists in centering the bare fiber segment 46 within the first bore segment 40. Such fiber insertion is indicated at step 112 of the process. The optical fiber stub 24 is inserted into the ferrule bore 34 through the rear end 28 of the ferrule 22. During insertion, the optical fiber stub 24 is oriented such that the bare fiber segment 46 leads the optical fiber stub 24 through the ferrule 22. After insertion, an end portion of the bare fiber segment 46 projects outwardly from the end face 34 of the ferrule 22. The epoxy delivery and fiber insertion steps can be automated. During such steps, the ferrule can be held by the automated ferrule handler.

At step 114, the ferrule assembly 20 is cured (e.g., oven cured), cooled and cleaved. It is noted that the curing process is particularly efficient because the ferrule 22 can be directly heated and the heat does not need to pass through a connector body or other structure surrounding the ferrule 22. Similarly, the cooling process is efficient since only the ferrule 22 and the optical fiber stub 24 need to be cooled. Cleaving can be conducted using a laser or a mechanical cleaving tool. The curing, cooling and cleaving steps can be automated.

Once the optical fiber stub 24 has been cleaved adjacent the end face 30 of the ferrule 22, the cleaved interface end 32 of the optical fiber 24 can be polished as indicated at step 116. It will be appreciated that the polishing process can include multiple polishing steps using different polishing pads and polishing compounds having different degrees of abrasiveness. Because the ferrule assembly 20 is not connected to an extended length of cable, downward vertical polishing pressure can be applied without side loading from a cable. The absence of an extended length of cable coupled to the ferrule 22 also allows the ferrule assembly 20 to be rotated about its axis 76 during the polishing process. In certain embodiments, the ferrule assembly 20 can be rotated about its axis 76 at a rate of at least 10 rotations per minute, or at least 50 rotations per minute, or at least 100 rotations per minute, or at least 500 rotations per minute.

Figure 8:
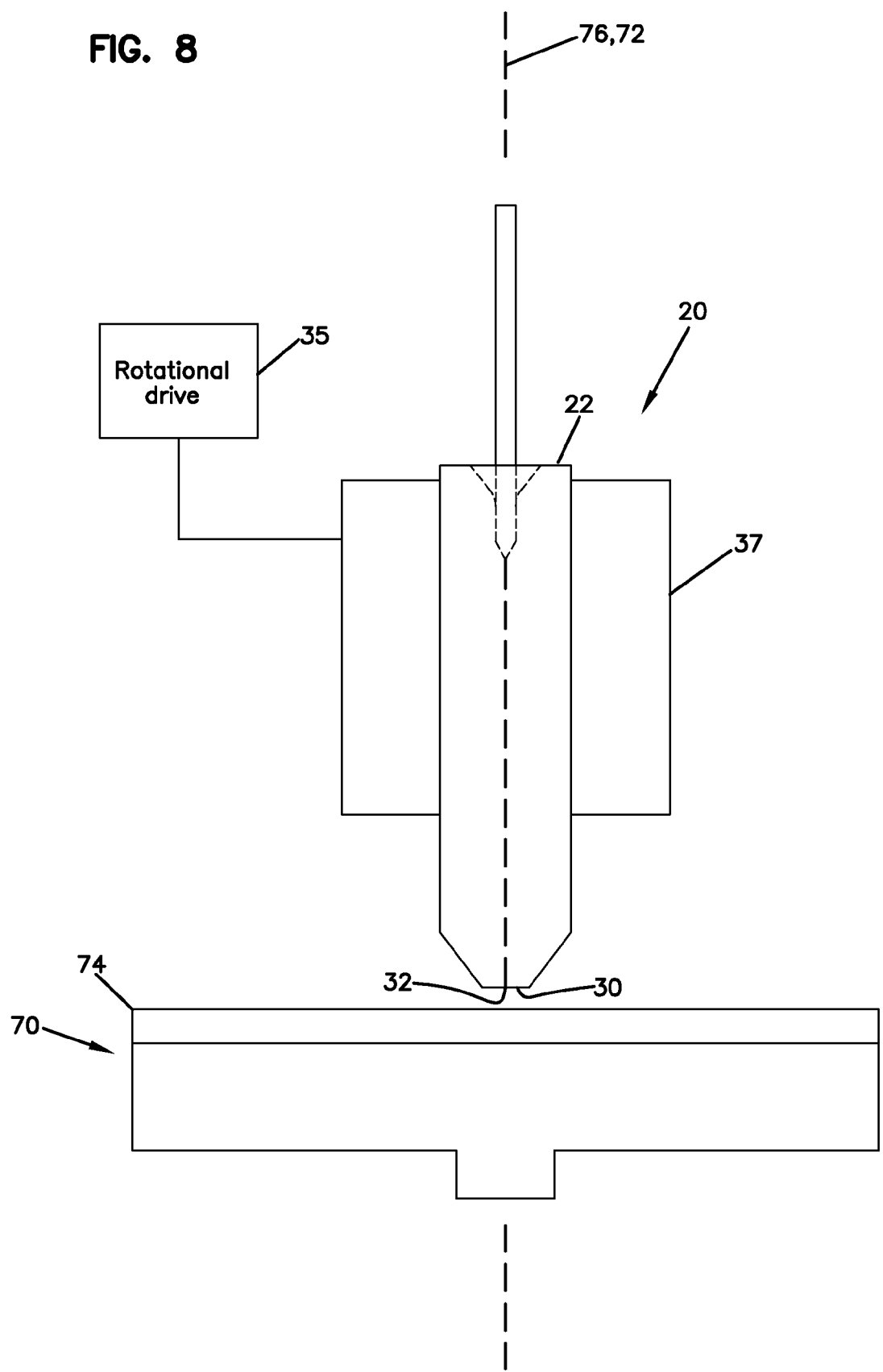
FIG. 8 is a side view showing the ferrule assembly of FIG. 1 in the process of being polished at a polishing table.
Figure 9:
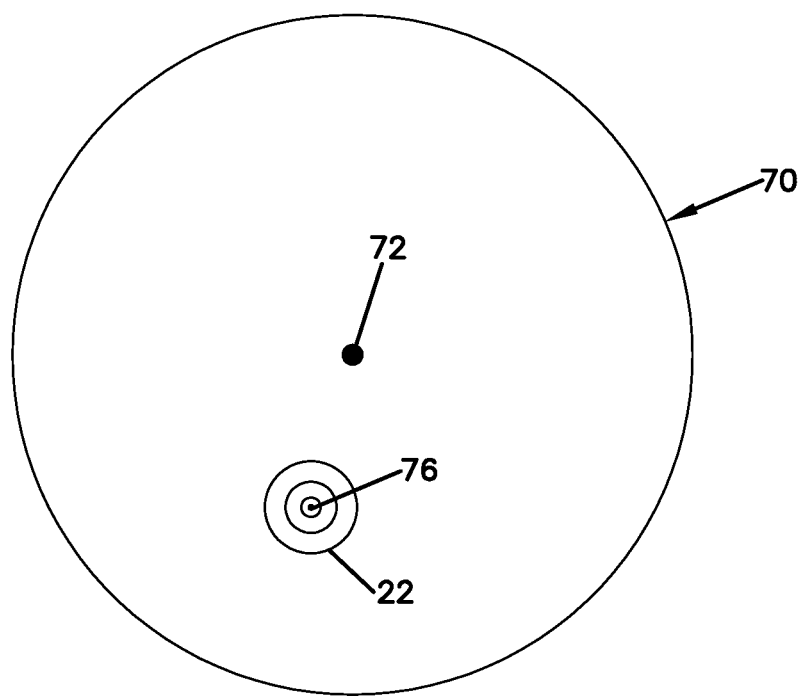
FIG. 9 is a top view of the ferrule assembly and polishing table of FIG. 8.

FIGS. 8 and 9 show the ferrule end face 30 and the interface end 32 of the optical fiber 24 being polished using a rotating polishing table 70 that rotates about an axis 72. A polishing pad 74 can be provided on the rotating polishing table 70. In other embodiments, rather than rotating, the polishing table 70 may oscillate, reciprocate, move along a random orbit path, or otherwise move. Additionally, during the polishing process, it may be desirable to rotate the ferrule 22 about its axis of rotation 76 as described above.

As shown at FIGS. 8 and 9, a mechanical polishing process is used to polish the end face 30 of the ferrule and the interface end 32 of the optical fiber stub 24. In other embodiments, a laser can be used to both cleave and polish/process the interface end 32 of the optical fiber stub 24. When processing the end 32 of the optical fiber stub 24 with a laser, it may be desirable to rotate the ferrule 22 about its axis 76 as described above.

The above-described polishing steps can be automated. During polishing, the ferrule 22 can be held by the automated ferrule handler. In certain embodiments, the automated handler can include a rotational drive 35 for rotating the ferrule 22 about its axis 76 during polishing or other steps disclosed herein here rotation of the ferrule 22 about its center axis is desired.

During the polishing process, it is desirable to interrupt polishing and provide tuning of the ferrule assembly 20 (see step 118). It will be appreciated that tuning is a process where an offset direction of the core 47 is established and an indication of the core offset direction is provided on the ferrule 22. The indication of the core offset direction can include any number of techniques such as printing a mark on the ferrule 22, etching a mark on the ferrule 22, or otherwise marking the ferrule 22. The core offset direction is the direction in which the core 47 is offset from a centerline (e.g., axis 76) of the ferrule 22.

Figure 10:
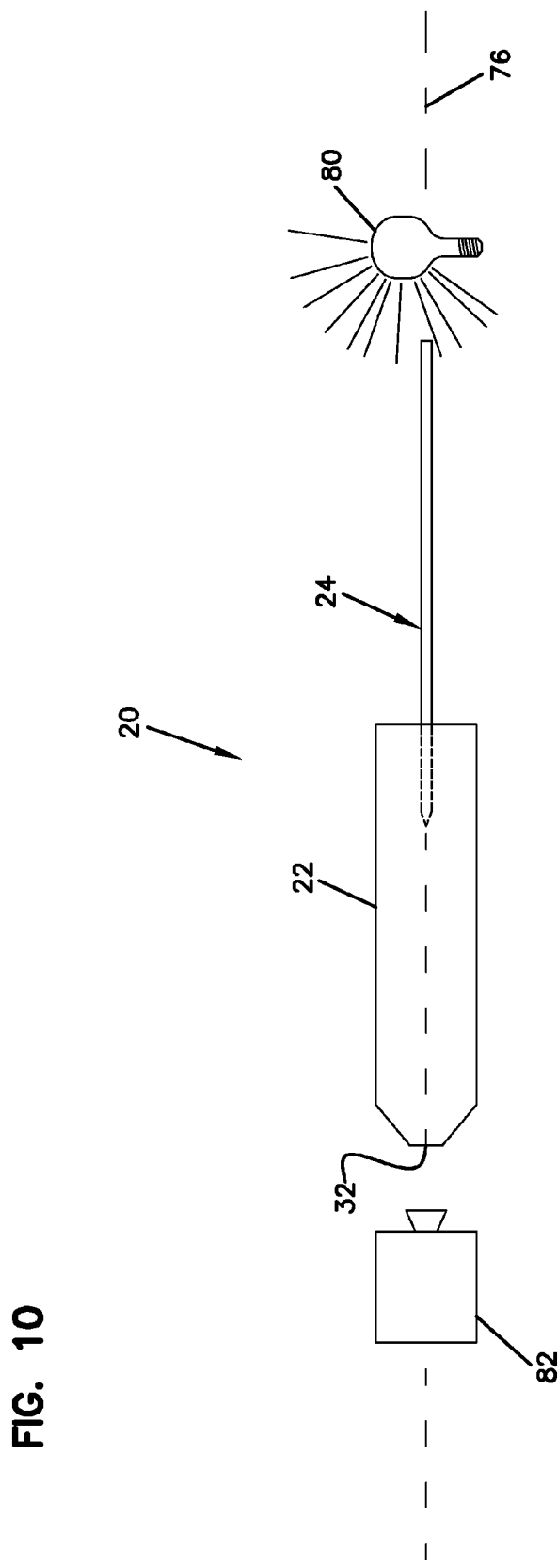
FIG. 10 shows the ferrule assembly of FIG. 1 in the process of being tuned with respect to core concentricity.

As shown at FIG. 10, the ferrule assembly 20 can be tuned by shining a light 80 through a rear end of the optical fiber stub 24 such that the light is conveyed through the optical fiber stub 24 and out the interface end 32 of the optical fiber stub 24. A camera 82 or other structure can be used to view and monitor the light output through the fiber core 47 at the end 32 so as to determine the core position. The ferrule assembly 20 is then rotated about its axis 76 while the light 80 continues to be directed through the optical fiber stub 24 and the camera 82 continues to view the end 32 of the optical fiber stub 24. As the ferrule assembly 20 is rotated about its axis 76, the core 47 of the optical fiber stub 24 changes elevations relative to a horizontal line H (see FIG. 11) that intersects the centerline 76 of the ferrule 22.

Figure 11:
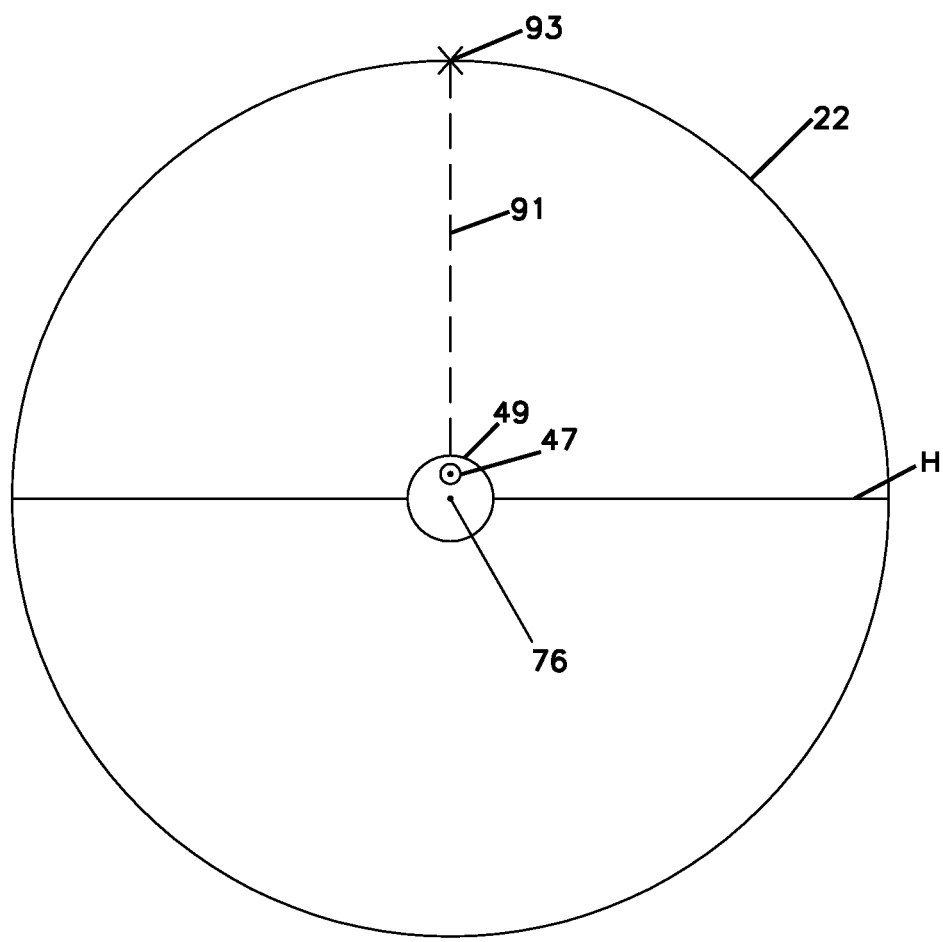
FIG. 11 is an end view of the ferrule assembly of FIG. 1 with the ferrule marked for the purpose of core concentricity tuning.
Figure 12:
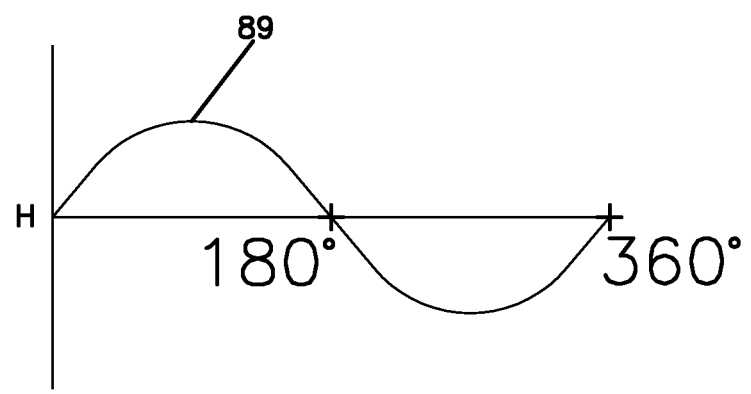
FIG. 12 is a graph used as a tool for determining the direction of core offset established during core concentricity tuning.

FIG. 12 is a graph illustrating the height of the core 47 relative to the horizontal line H as the ferrule 22 is rotated about its centerline axis 76. As shown at FIG. 12, the maximum core height 89 is indicative of an offset direction 91 of the core 47 relative to the axis 76 of the ferrule assembly 20. The axis 76 of the ferrule assembly 20 is defined by the outer diameter of the ferrule 22. Once the core offset direction 91 has been established, the ferrule 22 can be marked accordingly such that the offset direction can be identified at a later time in the manufacturing process. For example, as shown at FIG. 11, a marking 93 is provided in direct alignment with the core offset direction 91. In other embodiments, the marking could be offset 180° from the core offset direction 91 or at other locations on the ferrule 22. When the ferrule assembly 20 is later installed in a connector body, the marking 93 is used to orient the core offset a desired location relative to the connector body. For example, in a preferred embodiment, the core offset direction 91 is oriented at the twelve o'clock position relative to the connector body. The marking 93 can also be used to orient the core offset relative to a hub that is subsequently mounted on the ferrule 22. The hub can include a keying structure for ensuring that the ferrule is mounted at a desired rotational position within the connector body such that the core offset is oriented at a desired rotational position relative to the connector body.

Because the ferrule assembly 20 is tuned prior to insertion within a connector body and/or prior to mounting the hub on the ferrule 22, tuning can be provided at an infinite number of increments (i.e., the marking location can be chosen from an infinite number of rotational/circumferential positions about the centerline of the ferrule) to provide precise alignment of the marking 93 with the core offset direction 91. In another embodiment, the marking location can be chosen from a discrete number of rotational/circumferential positions about the centerline of the ferrule, where the number of discrete rotational/circumferential positions is at least 6, or at least 12, or at least 18, or at least 24, or at least 30. In other examples, the ferrule assembly 20 is tuned after at least a portion of the hub is mounted on the ferrule and the hub can define a discrete number of rotational/circumferential positions. In such examples, a core offset marking can be provided on the hub. The tuning step can be automated and rotation of the ferrule 22 during tuning can be achieved by the automated ferrule handler.

After tuning, the polishing process is completed at step 116 and various inspections are conducted at step 118. The inspections can include a corporate workmanship standard inspection in which the end 32 of the optical fiber stub 24 is inspected with a microscope to insure that there are no unacceptable scratches, pits or chips on the end face. The end face 32 of the optical fiber stub 24 and the end face 30 of the ferrule 22 can also be inspected and analyzed to insure the end faces comply with certain geometry specifications for the end faces. Finally, a continuity check can be conducted by which a light is shined through the optical fiber stub 24 to make sure the optical fiber stub 24 is capable of transmitting light. After the continuity check has been completed, a dust cap can be installed on the ferrule 22 and the ferrule assembly 20 can be packaged at shown at step 120. The various steps described above can be automated.

Figure 13:
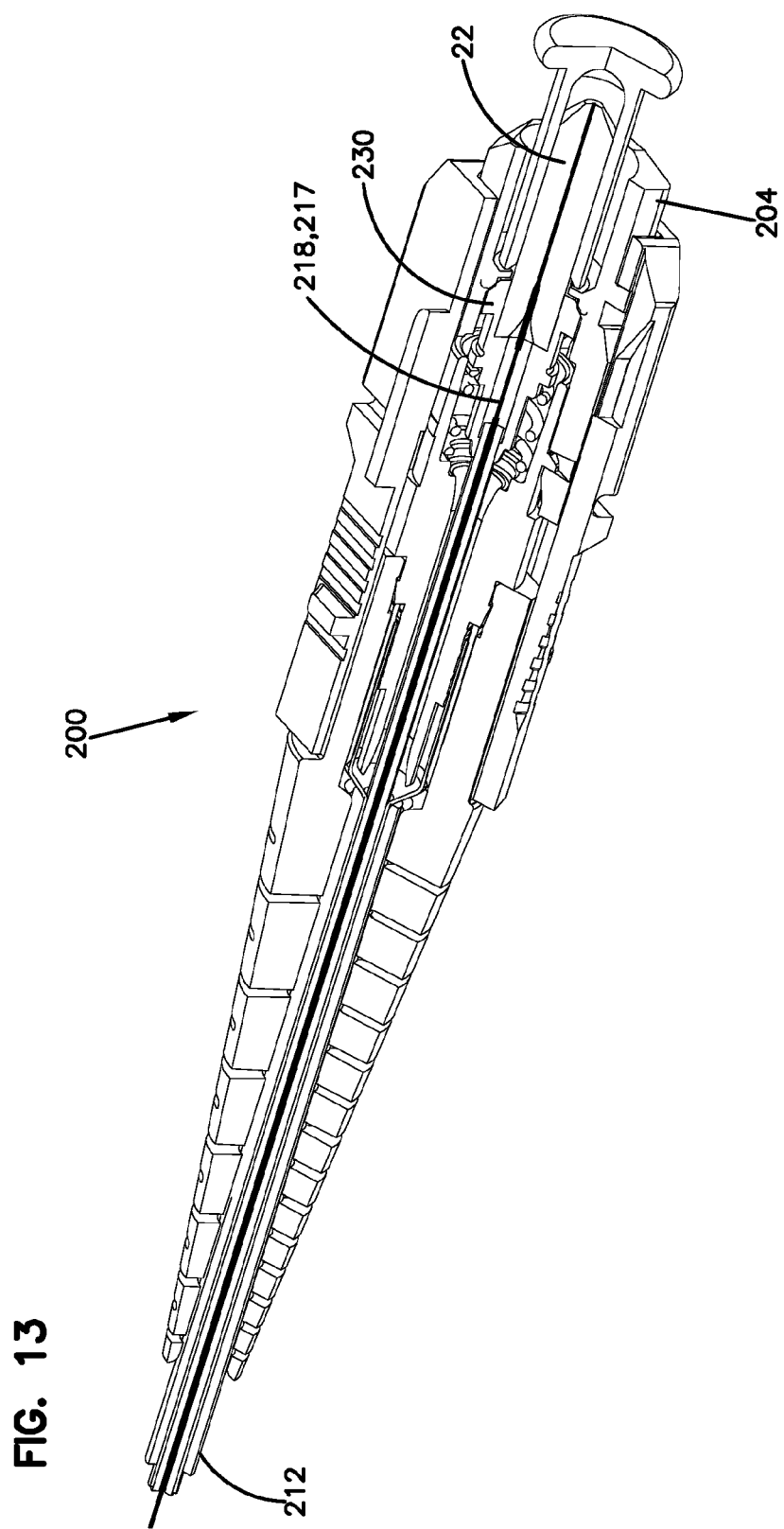
FIG. 13 is a front, perspective, cross-sectional view of a fiber optic connector and cable assembly in accordance with the principles of the present disclosure.
Figure 14:
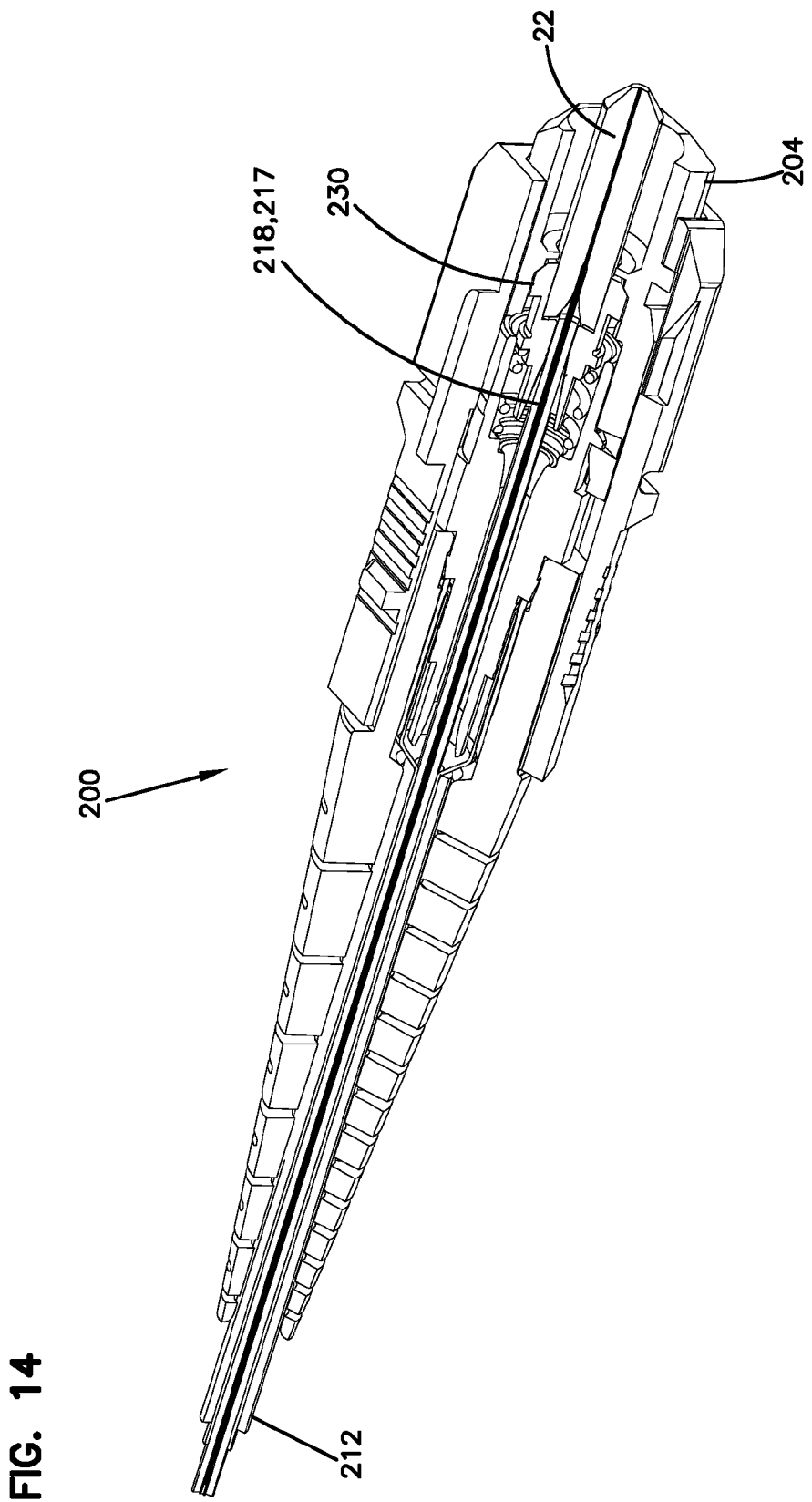
FIG. 14 is another cross-sectional view of the fiber optic connector and cable assembly of FIG. 13, the connector is shown without a dust cap.
Figure 15:
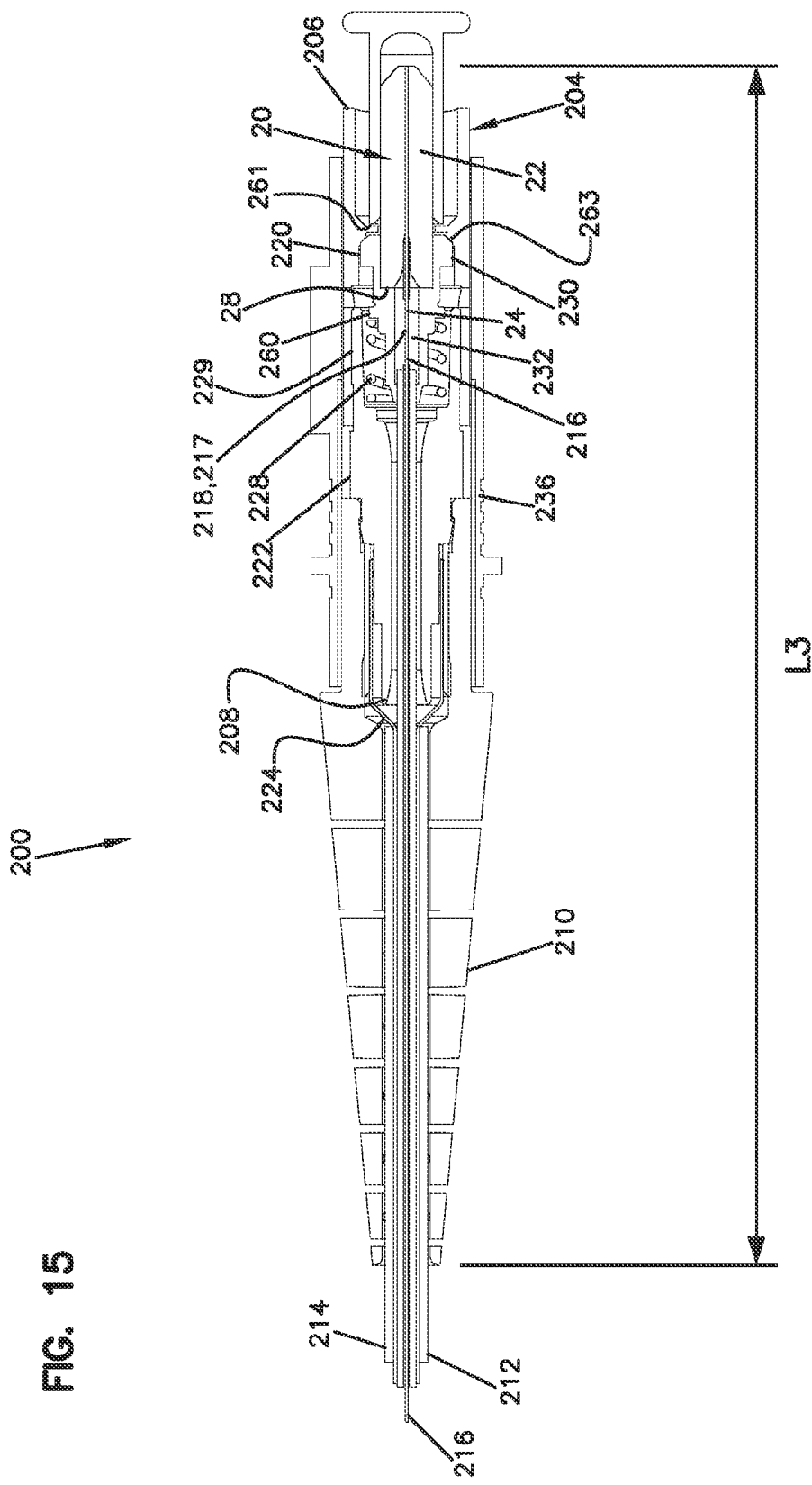
FIG. 15 is a longitudinal, cross-sectional view of the fiber optic connector and cable assembly of FIG. 13.

FIGS. 13-15 illustrate a fiber optic cable and connector assembly 200 in accordance with the principles of the present disclosure. The fiber optic cable and connector assembly 200 includes a fiber optic connector 202 having a connector body 204. The connector body has a front end 206 and a back end 208. The ferrule assembly 20 is positioned at least partially within the connector body 204. Specifically, the ferrule assembly 20 is positioned with the ferrule 22 positioned adjacent to the front end 206 of the connector body 204. The fiber optic connector 202 further includes a boot 210 mounted adjacent the back end 208 of the connector body 204. As used herein, the word "adjacent" means at or near. In a preferred embodiment, the connector 202 is compatible with existing connectors, fiber optic adapter, patch panels and fiber optic cables.

The fiber optic cable and connector assembly 200 further includes a fiber optic cable 212 that extends through the boot 210. The fiber optic cable 212 includes a jacket 214 and an optical fiber 216 positioned within the jacket 214. The optical fiber 216 can be referred to as a "second optical fiber." The optical fiber 216 is optically connected at a fusion splice 217 to the optical fiber 24 of the ferrule assembly 20. The fusion splice 217 is positioned at a splice location 218 spaced from the rear end 28 (i.e., the base) of the ferrule 22. In one embodiment, the splice location 218 is within the connector body 204 and is positioned no more than 20 mm from the rear end 28 of the ferrule 22. The fusion splice 217 is preferably a factory fusion splice. A "factory fusion splice" is a splice performed at a manufacturing facility as part of a manufacturing process. In one embodiment, the fiber optic connector 202 fully complies with Telcordia GR-326 or similar stringent industry or customer specifications. In other examples, the splice can be a field splice.

Referring to FIG. 15, the connector body 204 includes a front piece 220 and a rear piece 222. The front piece 220 forms a front interface end of the fiber optic connector 202 and the rear piece 222 is configured to allow strength members 224 (e.g., aramid yarn, fiberglass or other strength members capable of providing tensile reinforcement to the fiber optic cable 212) of the fiber optic cable 212 are anchored. In certain embodiments, the strength members 224 can be secured to the rear piece 222 of the connector body 204 with a mechanical retainer such as a crimp sleeve. In other embodiments, adhesive or other means can be used to secure the strength members 224 to the connector body 204.

Still referring to FIG. 15, the front and rear pieces 220, 222 of the connector body 204 interconnect together by a connection such as a snap-fit connection, an adhesive connection or other type of connection. When the front and rear pieces 220, 222 are connected together, a spring 228 and a hub 230 are captured between the front and rear pieces 220, 222. The hub 230 is secured over the rear end 28 of the ferrule 22. The hub 230 also covers the splice location 218 such that the fusion splice 217 is located within the hub 230. In the depicted embodiment, an intermediate layer 232 (e.g., a coating layer, an over mold layer, or other layer) is provided between the fusion splice 217 and the hub 230. The spring 228 is captured within a spring pocket 229 defined by the rear piece 222 and functions to bias the hub 230 and the ferrule assembly 20 which is carried with the hub 230 in a forward direction relative to the connector body 204. The hub 230 is a structure secured on the ferrule 22 such that the ferrule 22 and the hub 230 move together as a unit. In certain embodiments, the hub 230 provides structure against which the bias of the spring 228 can be applied to bias the hub 230 and the ferrule 22 forwardly relative to the connector body 204. The hub 230 also includes structure that interferes with an internal structure (e.g., a stop) of the connector body 204 to limit the forward movement of the ferrule 22 and to prevent the ferrule 22 from being pushed out of the front of the connector body 204 by the spring 228. The hub 230 and the splice location 218 can be positioned within the spring pocket 229. The boot 210, the rear piece 222 and the spring 228 all can have internal dimensions (e.g., inner diameters) larger than an outer dimension (e.g., an outer diameter) of the cable 212 such that during assembly/manufacturing the boot 210, the rear piece 222 and the spring 228 can be slid back over the jacket 212 to provide space/clearance for splicing and application of the hub over the spice 217.

In the depicted embodiment, the fiber optic connector 202 is shown as a standard SC-type connector. As such, the fiber optic connector 202 is adapted to be received within an SC-type fiber optic adapter that is used to couple two of the fiber optic connectors together to provide an optical connection there between. The fiber optic connector 202 includes a release sleeve 236 that is slidably mounted on the connector body 204. When the fiber optic connector 202 is inserted within a fiber optic adapter, shoulders of the connector body 204 are engaged by latches of the fiber optic adapter to retain the fiber optic connector 202 within the fiber optic adapter. To release the fiber optic connector 202 from the fiber optic adapter, the release sleeve 236 is slid rearwardly relative to the connector body 204 thereby causing the latches of the fiber optic adapter to disengage from the shoulders of the connector body 204 such that the fiber optic connector 202 can be withdrawn from the fiber optic adapter. An example fiber optic adapter is disclosed at U.S. Pat. No. 5,317,663, which is hereby incorporated by reference in its entirety.

In a preferred embodiment, the splice location 218 is relatively close to the rear end 28 of the ferrule 22. For example, in one embodiment, the splice location 218 is no more than 15 mm from the ferrule 22. In another embodiment, the splice location 218 is no more than 10 mm from the ferrule 22. In still another embodiment, the splice location 218 is no more than 5 mm from the ferrule 22. In further embodiments, the splice location is spaced 1-20 mm from the ferrule 22, or 1-15 mm from the ferrule 22 or spaced 1-10 mm from the ferrule 22, or 1-5 mm from the ferrule 22, or 2-10 mm from the ferrule 22, or 2-5 mm from the ferrule 22, or 1-3 mm from the ferrule 22, or less than 4 mm from the ferrule 22, or less than 3 mm from the ferrule 22, or 1-4 mm from the ferrule 22, or 2-3 mm from the ferrule 22.

To the extent that in some embodiments of the present disclosure a hub may not be provided, the splice location 218 (i.e., the interface between the two optical fibers 24, 216) is preferably located in the region that would normally be occupied by a hub. In certain embodiments, the splice location is provided between the base of the ferrule 22 and the rear end of the spring 228. In certain embodiments, the splice location 218 is within the spring chamber 229. In certain embodiments, the spring 228 biases the ferule 20 toward a forward-most position (i.e., a distal-most position or non-connected position) and during a connection with another connector the spring 228 allows the ferrule 22 to move rearwardly from the forward-most position, against the bias of the spring 228, to a rearward position (i.e., proximal position or connected positioned). In certain embodiments, the splice location 218 is positioned between forward and rearward ends 228a, 228b of the spring 228 when the ferrule is in the forward-most position, and is also positioned between the forward and rearward ends 228a, 228b of the spring 228 when the ferrule 22 is in the rearward position.

In certain embodiments, the hub 230 has a polymeric construction that has been over molded over the rear end of the ferrule 22 and over the splice location 218. By protecting the fusion splice 217 within the hub 230 at a location in close proximity to the ferrule 22, it is possible to manufacture a fiber optic connector that is relatively short in length. In a preferred embodiment, the fiber optic connector 202 has a length L3 that is less than 57 mm. It will be appreciated that the length L3 of the fiber optic connector 202 is measured from the front end 26 of the ferrule 22 to a rear end 240 of the boot 210. In certain embodiments, a portion 231 of the hub 230 that extends rearward of the ferrule 22 has a length L4 that is shorter than the length L1 of the ferrule 22. In certain examples, the splice location 218 is within 5 mm of the rear end of the ferrule 22. Providing the splice location 218 within 5 mm of the rear end of the ferrule 22 assists in designing the fiber optic connector in compliance with standard industry or customer side load and connector length specifications (e.g., GR-326 side load and length requirements).

The boot 210 is shown press-fit over the rear piece 222 of the connector body 204. Specifically, the boot 210 is press-fit over the location where the strength members 224 are attached to the connector body 204. It will be appreciated that the boot 210 has a tapered, flexible configuration that provides the optical fiber 216 with bend radius protection when a side load is applied to the fiber optic connector 202 through the fiber optic cable 212.

In one embodiment, the fusion splice 217 is a factory fusion splice having a splice related insertion loss of 0.1 decibels or less, 0.05 decibels or less, or 0.02 decibels or less in the 1260 nanometer to 1630 nanometer signal wavelength range. Furthermore, in preparing the optical fibers for the fusion splice 217, an active alignment system can be utilized to accurately align the optical fibers 216, 24. Example active alignment systems are sold by Sumitomo, Furukawa, Vytran, 3SAE, and Fujikura. In certain embodiments, the active alignment system can ensure that the centers of the cores of the optical fibers 216, 24 being spliced are offset by no more than 0.01 microns by the alignment system prior to splicing. The alignment system can utilize cameras that view the cores of the optical fibers 216, 24 along viewing lines that are perpendicular to one another (e.g., a top view and a side view).

As described above, in certain embodiments, the optical fiber stub 24 can be manufactured using a precision fiber having tightly toleranced parameters such as core to cladding concentricity and cladding outer diameter variation. In this regard, in certain embodiments, the optical fiber stub 24 can be different (e.g., can have a different construction, different mechanical characteristics, different physical attributes, different optical performance characteristics, different degrees of precision, etc.) than the optical fiber 216 of the fiber optic cable. For example, the optical fiber stub 24 can be a more precisely manufactured optical fiber than the optical fiber 216 of the fiber optic cable 212 (i.e., the stub fiber is manufactured according to tighter tolerances than the cable optical fiber 216). For example, in certain embodiments, the optical fiber stub 24 can have better average core to cladding concentricity than the optical fiber 216. Also, the outer diameter of the cladding of the optical fiber stub 24 can be more precisely toleranced that the outer diameter of the cladding of the optical fiber 216. Further, the optical fiber stub 24 can have a different (e.g., lower) fiber cut-off wavelength than the optical fiber 216. Moreover, the optical fiber stub 24 can have different cladding mode suppression characteristics as compared to the optical fiber 216. For example, as compared to the optical fiber 216, the optical fiber stub 24 can have a construction adapted to provide enhanced cladding mode suppression for suppressing modal interference. Example optical fibers having constructions adapted to reduce/suppress modal interference are disclosed at U.S. Pat. Nos. 6,498,888; 5,241,613; and 4,877,306, which are hereby incorporated by reference in their entireties.

It is well known in the art that splices can introduce losses (e.g., insert loss, return loss). However, the fiber optic cable and connector assembly 200 of the present disclosure includes various features that provide excellent performance despite the presence of an internal splice. Such features include: a) precise core-to-core alignment of the spliced optical fibers; b) precise centering of the optical fiber stub 24 within the ferrule bore 34, precise tuning of the core offset direction within the connector body, and precise centering of the ferrule bore 34 within the ferrule 22.

In certain examples, the fiber optic connector 202 can be in full compliance with the requirements of Telcordia GR-326. Specific sections of Telcordia GR-326 in which the fiber optic connector 202 can be in compliance include sections pertaining to transmission with applied load, installation tests, and the post-condensation thermal cycle test.

Figure 16:
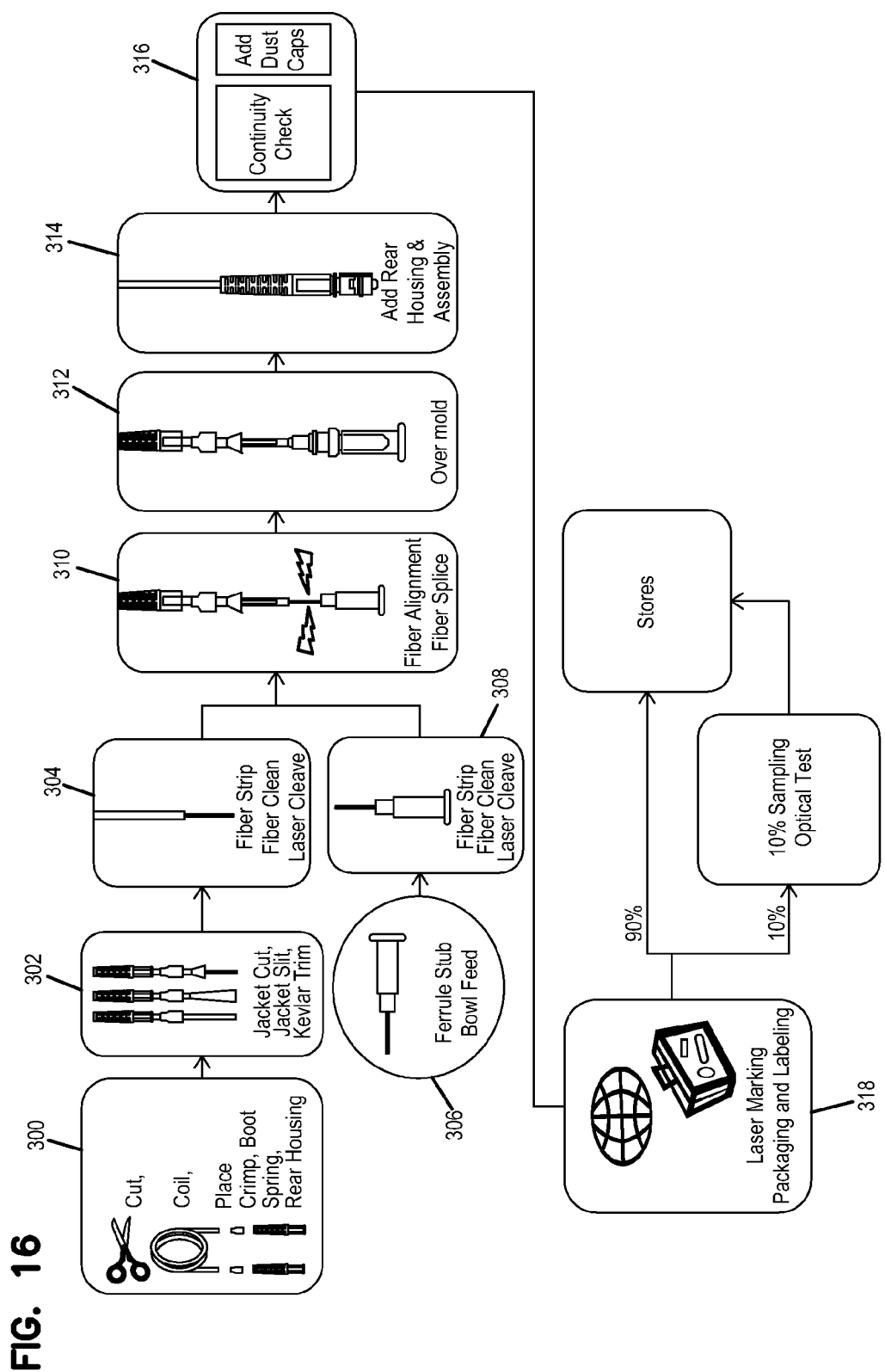
FIG. 16 is a flow chart illustrating a sequence of steps for factory manufacturing the fiber optic connector and cable assembly of FIG. 13.
Figure 18:
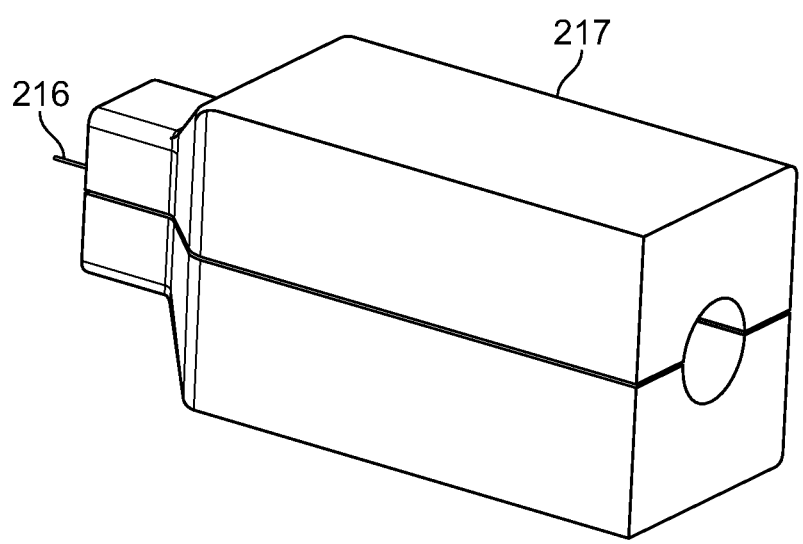
FIG. 18 shows the fiber optic cable of the fiber optic connector and cable assembly of FIG. 13 with its optical fiber being held for stripping, cleaning and laser cleaving.

FIG. 16 shows a process for manufacturing a patch cord formed by mounting fiber optic connectors 202 on opposite ends of the fiber optic cable 212. At step 300 of the method, the fiber optic cable 212 is coiled and the components of the fiber optic connectors 202 are staged. Next, at step 302, the ends of the jacket 214 of the fiber optic cable 212 are then cut and slit, and the strength layer 224 is trimmed. As so prepared, end portions of the optical fiber 216 extend outwardly from each end of the jacket 214. The end portions of the optical fiber 216 are then stripped, cleaned and cleaved (e.g., laser cleaved) (see step 304). During stripping, cleaning and cleaving, the end portions of the optical fiber 216 can be gripped in a holder 217 (e.g., a holding clip or other structure) (see FIG. 18).

Figure 17:
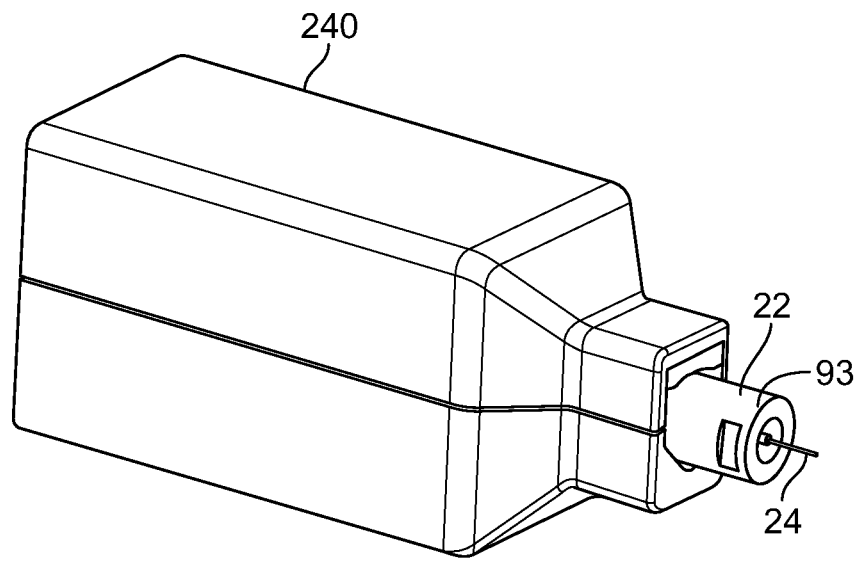
FIG. 17 shows the ferrule assembly of FIG. 1 being held for stripping, cleaning and laser cleaving.

At step 306, ferrule assemblies 20 are fed (e.g., bowl fed) to a holder 240 or holders which grip/hold the ferrule 22. An example holder 240 is shown at FIG. 17. In some examples, the ferrules 22 are oriented within the holders 240 with the tuning marks 93 at the twelve o'clock position so that the ferrule assemblies 20 can be subsequently loaded into their corresponding connector bodies 204 at the twelve o'clock position. In this way, it is ensured that the core offset direction is oriented at the uppermost position/sector of each connector. While the twelve o'clock position is preferred, the core offset direction can be established within the connector body at other rotational positions as well.

While each ferrule 22 is held by the holder 240, the free end of the optical fiber stub 24 is stripped, cleaned (e.g., arc cleaned) and cleaved (e.g., laser cleaved) (see step 308). It will be appreciated that ferrule assemblies 20 are prepared for each end of the patch cable.

Figure 19:
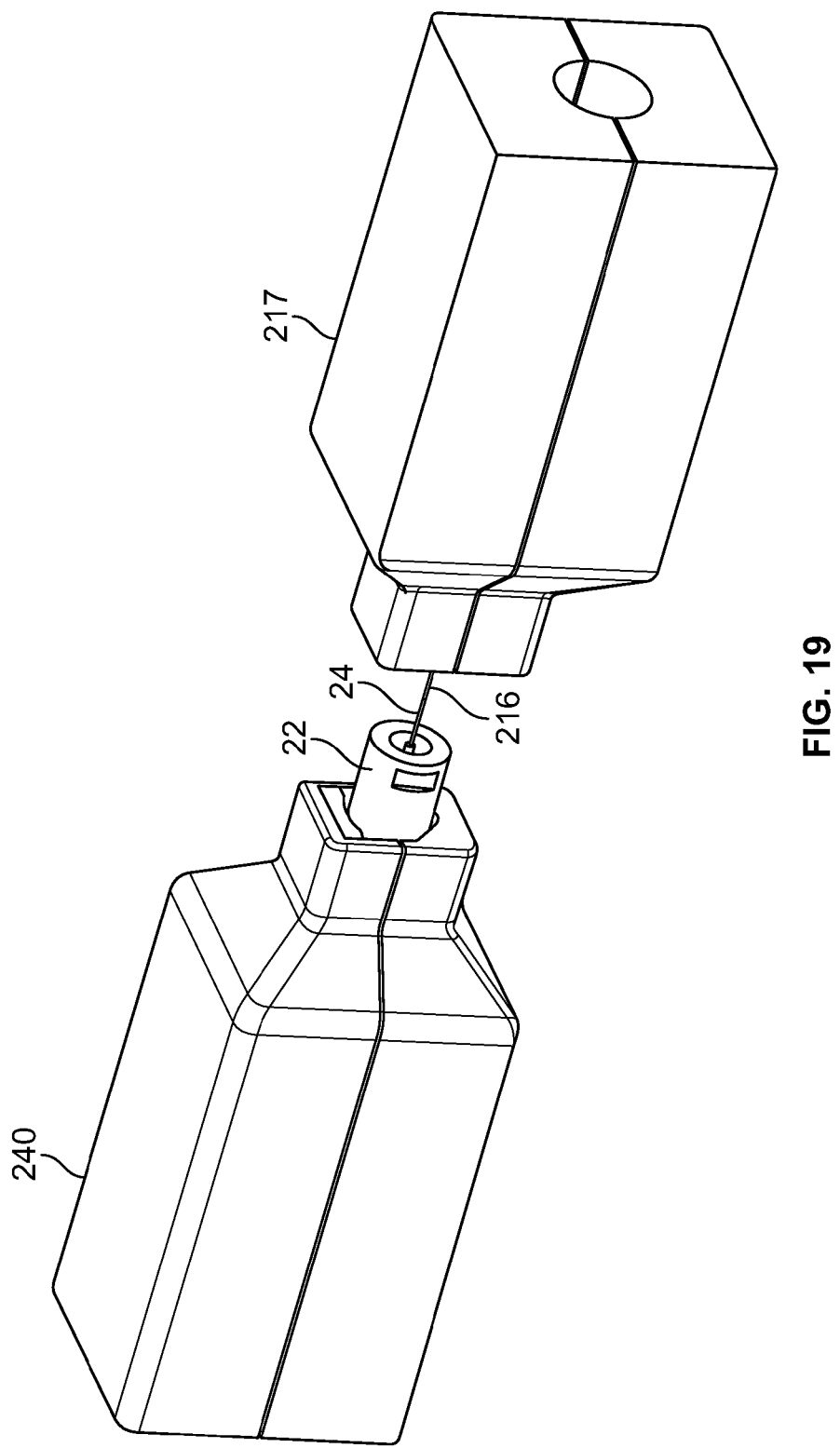
FIG. 19 shows the optical fiber of the ferrule assembly of FIG. 1 in coarse alignment of the optical fiber of the fiber optic cable.
Figure 20:
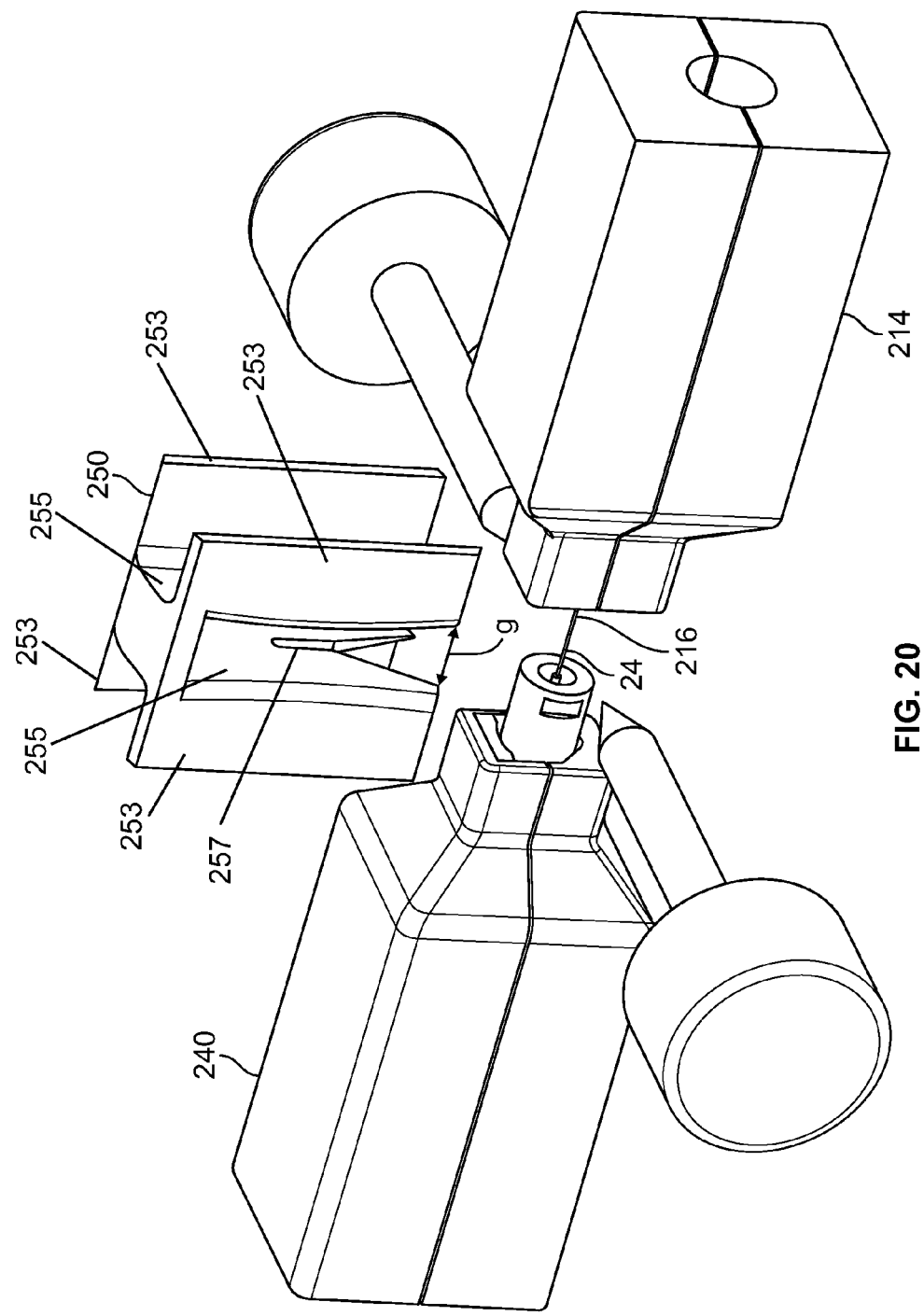
FIG. 20 shows the ferrule fiber precisely aligned with the fiber optic cable fiber, the aligned fibers are shown at an arc treatment station, arc shielding is also shown.

Once the fibers have been stripped, cleaned and cleaved, the optical fiber stub 24 of each ferrule assembly 20 is coarsely aligned with a corresponding end portion of optical fiber 216 (see FIG. 19), and then precisely aligned (see FIG. 20). Precise alignment of the optical fibers can be accomplished using an active alignment device. In using the active alignment device, the fiber 216 is held within the holders 217 with an end portion of the fiber 216 projecting outwardly from one end of the holder 217 (as shown at FIGS. 20-23, the cable 212 projecting from the opposite end of the holder 217 has been omitted). Also, the ferrule 22 is held within a pocket of the holder 240 while the fiber 24 projects from the base of the ferrule 222 and is not contacted directly by the holder 240 or any other structure. The holder 240 can include a clip or other structure having two or more pieces that clamp and hold the ferrule 22 during active alignment of the fibers 216, 24. The pocket of the holder 240 can include an internal structure (e.g., a V-groove, semi-circular groove, etc. for aligning/positioning the ferrule 22). The end portions of the fibers are preferable unsupported (e.g., not in direct contact with a structure such as a v-groove). In one example, the fiber 24 projects less than 5 mm from the base end of the ferrule 22. This relatively short length facilitates the active alignment process. In certain examples, the center axis of the fiber 24 is angled no more than 0.1 degrees relative to the center line of the ferrule. This also assists the active alignment process. While ideally there is no angular offset between the center axis of the fiber 24 and the ferrule 22, the short stub length of the fiber 24 assist in minimizing the effect during active alignment of any angular offset that may exist. Robotics are preferably used to manipulate the holders 240, 217 to achieve axial alignment between the cores of the fibers 24, 216. Because alignment does not rely on contacting extended lengths of the fibers 24, 216 with alignment structure such as v-grooves, the splice location can be provided in close proximity to the base of the ferrule 22 (e.g., within 5 mm of the base). In certain embodiments, only splices in which the centers of the cores of the optical fibers 216, 24 being spliced are offset by no more than 0.01 microns are acceptable, and splices falling outside of this parameter are rejected. In other embodiments, the average core offset for fibers spliced by the process is less than 0.01 microns.

Figure 21:
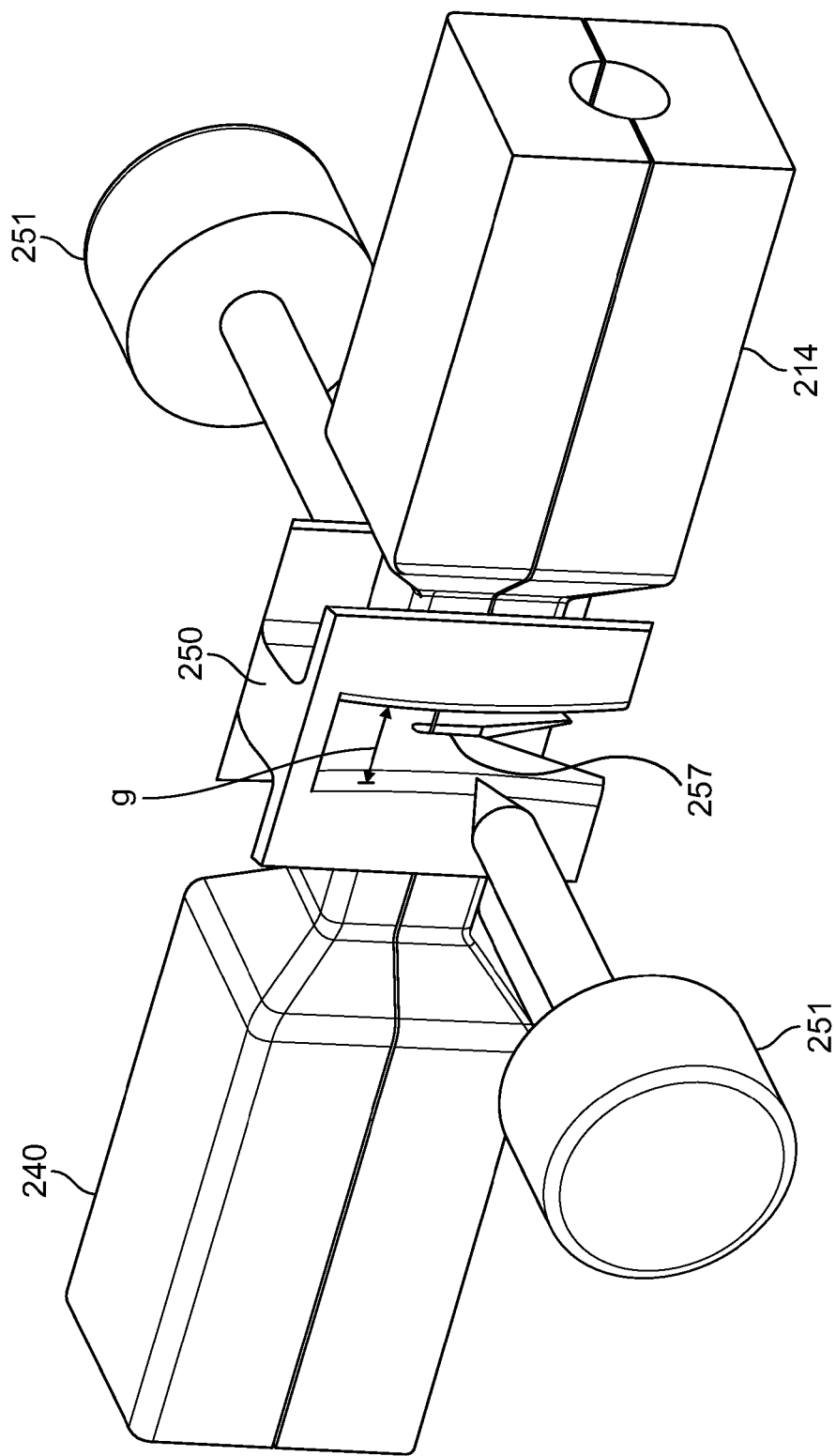
FIG. 21 shows the arrangement of FIG. 20 with the shielding lowered to protect the ferrule and coated portions of the fibers when the arc treatment device is activated to form a fusion splice between the aligned optical fibers.
Figure 22:
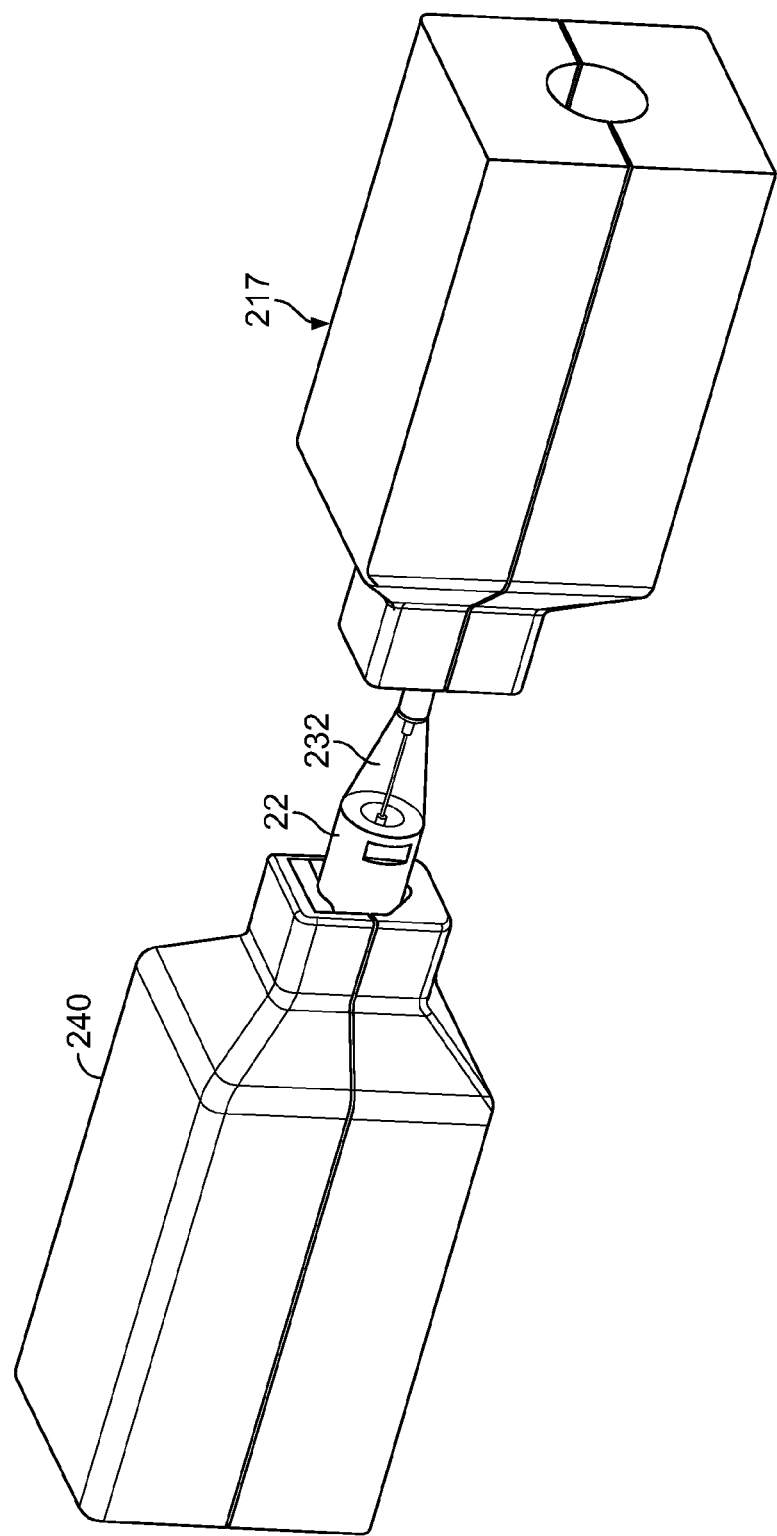
FIG. 22 shows the arrangement of FIG. 21 after an initial protective overcoat or over mold layer has been formed over the fusion splice.

After precise axial alignment has been achieved, a shielding unit 250 is lowered over the splice location 218 and a fusion splice machine 251 (e.g., an arc treatment machine) is used to fuse the optical fibers 24, 216 together. The shielding unit 250 includes shielding portions for shielding the ferrule 22 and coated portions of the optical fibers 24, 216 intended to be spliced together. The shielding structure 250 can have a ceramic construction, Polyether ether ketone (PEEK) construction, another heat resistant plastic construction or other type of heat resistant construction. Preferably, the shielding structure 250 includes a gap g through which an arc or other energy source from the fusion splice machine 251 can pass to fusion splice the optical fibers 24, 216 together. Preferably the gap g is 1-3 mm, or 2-2.5 mm. FIG. 20 shows the shielding structure 250 in the raised orientation and FIG. 21 shows the shielding structure in a shielding position. The shielding structure can include side walls 253 that protect the sides of the ferrule 22 and extend along the lengths of optical fibers 24, 216, and cross-walls 255 that extend between the side walls 253. The cross-walls 255 extend across to the optical fibers 24, 216 (e.g., transverse to the optic fibers 24, 216) and include slots 257 for receiving the optical fibers 24, 216. The side walls 253 also protect the portions of the fibers 24, 216 adjacent the splice location and the holders 214, 240. The cross-walls 255 protect the fibers 24, 216, the rear end 28 of the ferrule 22 and the holders 214, 240. A bridge section extends across the gap g between the cross-walls 255. Step 310 of FIG. 16 is representative of the alignment, shielding and fusion splicing operations.

After the fusion splice has been completed, a protective layer 232 can be placed, applied or otherwise provided over the optical fibers 24, 216 in the region between the rear end 28 of the ferrule 22 and a buffered/coated portion of the optical fiber 216. In one example, the protective layer 232 extends completely from the rear end 28 of the ferrule 22 to a coated and buffered portion of the optical fiber 216. As depicted, the coated and buffered portion of the optical fiber 216 includes coatings in the form of a 220-260 micron acrylate layers which cover the glass portion of the optical fiber, and a buffer layer 221 (e.g., a loose or tight buffer tube) having an outer diameter ranging from 500-1,100 microns. At FIG. 22, the protective layer 232 is shown extending over the splice location 218 completely from the rear end 28 of the ferrule 22 to the buffer layer of the optical fiber 216. In one embodiment, the protective layer 232 is generally cylindrical (see FIG. 15) and has a diameter slightly larger than the buffer layer and generally the same as a major diameter of the conical transition 39 of the ferrule bore 34. In other embodiments, the protective layer 232 can have a truncated conical configuration (see FIG. 22) with a major diameter generally equal to the outer diameter of the ferrule 22 and a minor diameter generally equal to the outer diameter of the buffer layer of the optical fiber 216. It will be appreciated that the protective layer 232 can be applied using an over molding technique. Alternatively, coating, spraying, laminating or other techniques can be used to apply the protective layer.

In certain embodiments, the protective layer 232 is made of a material that is softer (e.g., has a lower hardness) than the material used to manufacture the hub 230. In certain embodiments, the unstripped portion of the optical fiber 216 has an inner coating layer that surrounds the cladding layer, and the protective layer 232 has mechanical attributes such as softness/hardness that substantially match or are comparable to the mechanical attributes of the inner coating layer of the unstripped portion of the optical fiber 216. In certain embodiments, the protective layer 232 can be made of a thermoplastic material, a thermoset material (a material where cross-linking is established during heat curing), other types of cross-linked materials or other materials. Example materials include acrylates, epoxies, urethanes, silicones and other materials.

At least some of the materials can be UV curable (i.e., the materials cure when exposed to ultraviolet radiation/light). One example material includes a UV curable splicing compound such as DSM-200 which is sold by DSM Desotech, Inc. of Elgin Ill. In certain embodiments, an injection molding process (e.g., a thermoplastic injection molding process) can be used to apply and form the protective layer 232 about the splice location 218.

Figure 23:
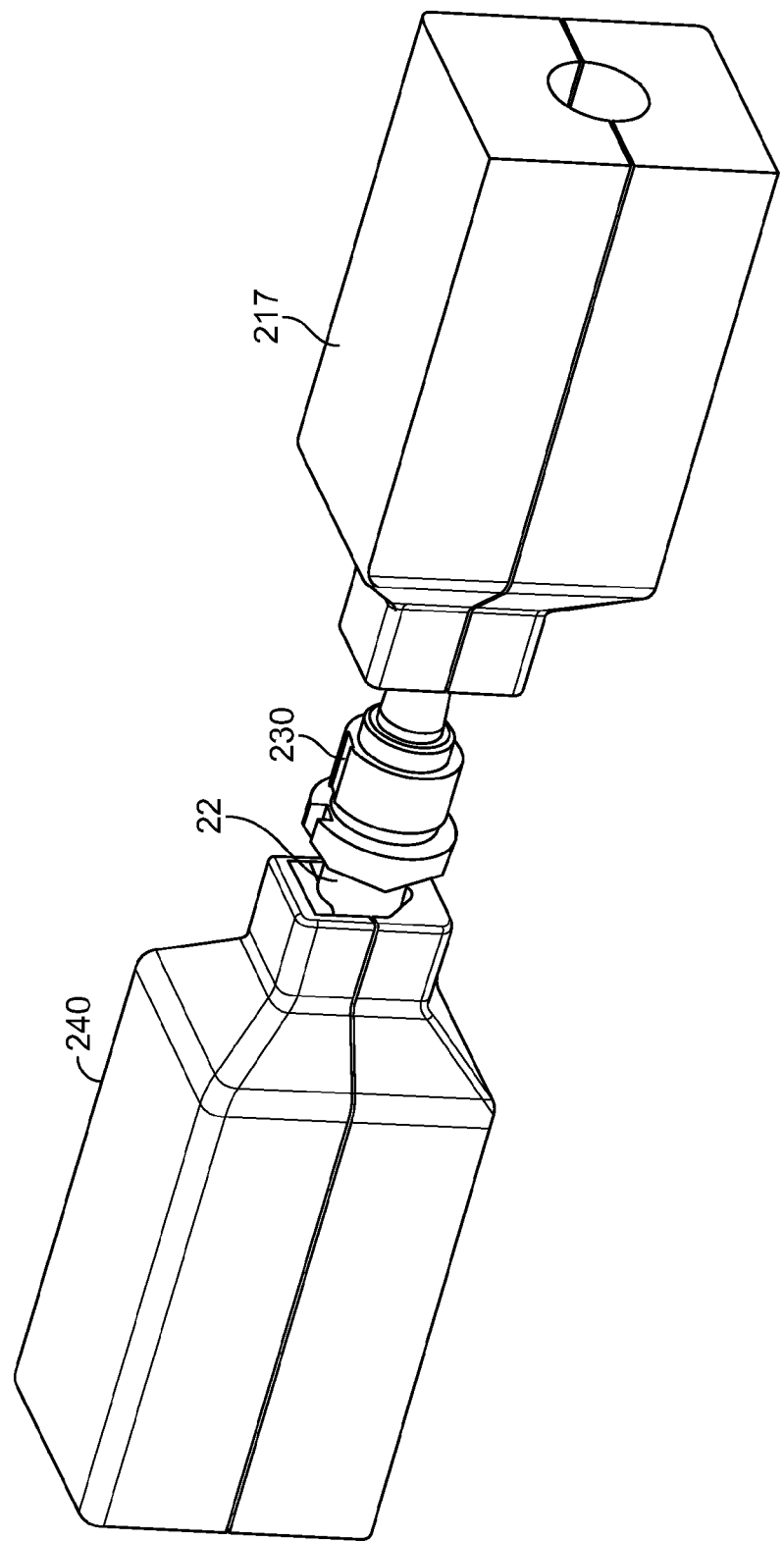
FIG. 23 shows the arrangement of FIG. 22 after a hub has been over molded over the rear portion of the ferrule of the ferrule assembly and also over the splice between the aligned fibers.
Figure 24:
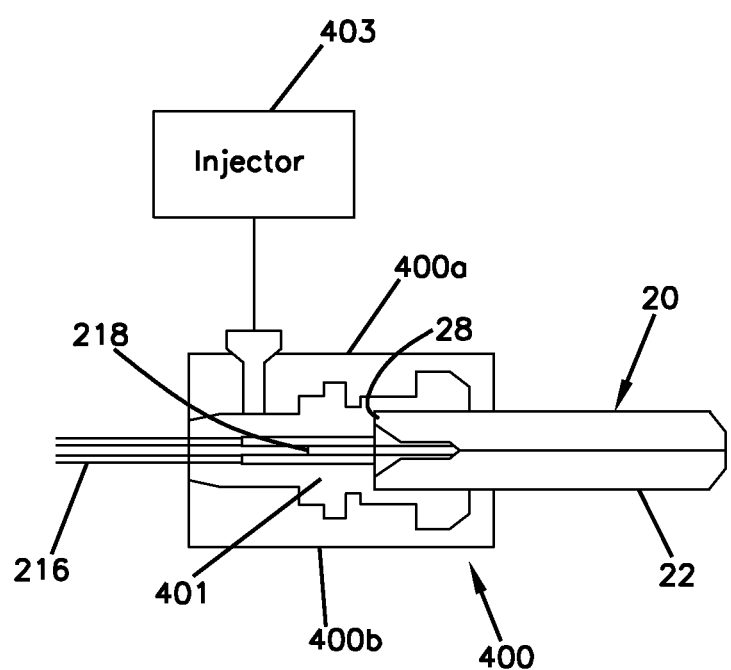
FIG. 24 is a cross-sectional view illustrating a mold for forming the over molded hub of FIG. 23.

Once the protective layer 232 has been applied and cured, the hub 230 is preferably over molded over the protective layer 232 as shown at FIG. 23. The hub 230 is preferably over molded over the rear end 28 of the ferrule 22 and also over the splice location 218. FIG. 24 shows a mold assembly 400 mold pieces 400a, 400b having an inner shape that matches the outer shape of the hub 230. The mold assembly 410 shown in FIGS. 75-81, discussed below, may also be used to form the hub 230. Preferably, a polymeric material is injected from an injection machine 403 into a cavity 401 defined by the mold pieces 400a, 400b to over mold the polymeric material over the splice location 218 and the rear end 28 of the ferrule 22. In certain embodiments, the hub 230 is molded by injecting a UV curable material into the mold, and the mold pieces 400a, 400b are made of a UV transmissive material (e.g., Teflon) such that UV light/radiation can be transmitted through the mold pieces 400a, 400b for curing the hub 230 within the mold.

Figure 25:
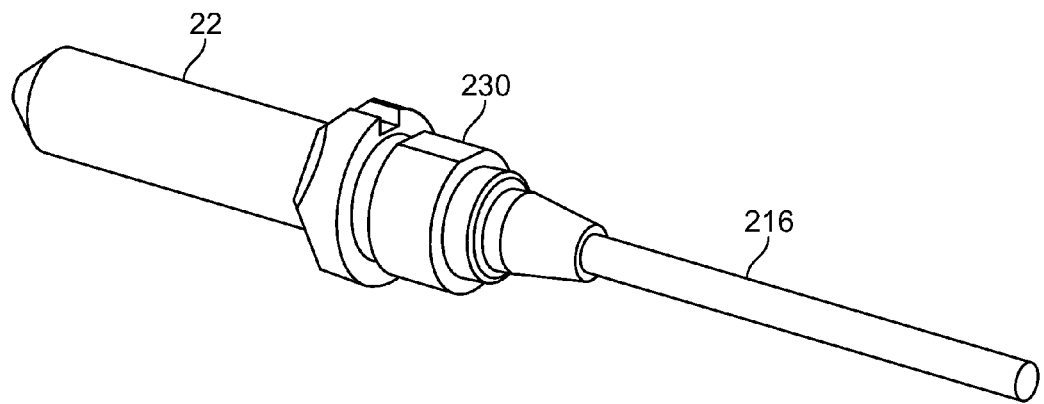
FIG. 25 is a perspective view of the ferrule assembly of FIG. 1 spliced to the fiber optic cable and over molded with the hub.

Referring back to FIG. 15, the hub 230 is shaped to include a flange 260 that engages the spring 228. Additionally, the hub 230 is configured to support the rear end 28 of the ferrule 22 within the connector body 204. Furthermore, a forward end or flange 263 of the hub 230 is configured to engage a shoulder 261 within the connector body 204 to halt forward movement of the ferrule assembly 20 caused by the forward bias provided by the spring 228. In this way, the flange 263 functions to retain the ferrule 22 within the connector body 202. FIG. 25 shows the ferrule assembly 20 after the hub 230 has been over molded over the rear end 28 of the ferrule 22, over the splice location 218 and over a buffered portion of the optical fiber 216 of the fiber optic cable 212. Step 312 of FIG. 16 is representative of the over molding operations.

In certain embodiments, the hub 230 can be made of a thermoplastic material, a thermoset material (a material where cross-linking is established during heat curing), other types of cross-linked materials, or other materials. Example materials include acrylates, epoxies, urethanes, silicones and other materials. At least some of the materials can be UV curable (i.e., the materials cure when exposed to ultraviolet radiation/light). As described above, in certain embodiments, an injection molding process (e.g., a thermoplastic injection molding process) can be used to apply and form the hub 230 about the splice location 218 and ferrule 22. In certain embodiments, a hot melt material can be injected into the mold to form the hub 230. The use of hot melt materials (e.g., hot melt thermoplastic materials) and/or UV curable materials allows the hub over molding process to be conducted at relatively low pressures (e.g., less than 1000 pounds per square inch (psi)) and at relatively low temperatures (e.g., less than 300 degrees Celsius). In certain examples, curing can take place at temperatures less than 200 degrees Celsius, or less than 100 degrees Celsius, or at room temperature, and at pressures less than 100 psi or at pressures less than 10 or 5 psi.

After the hubs 230 have been over molded at each end of the fiber optic cable 212, the other components of the fiber optic connectors 202 are assembled over the ferrule assembly 20 and the hub 230 (see step 314 at FIG. 16). Additionally, the strength members of the fiber optic cable 212 are attached to the rear ends of the connector bodies 204 of the fiber optic connectors 202. A continuity check can be conducted for the patch cable and dust caps are positioned over the ferrules 22 (see step 316 at FIG. 16). Finally, the patch cords are packaged and labeled (see step 318 of FIG. 16). It will be appreciated that any and/or all of the above connector manufacturing steps can be automated. Robotics can improve the consistency and quality of the connectorization process and automation can assist in lowering labor related costs.

Various additional fiber optic connector embodiments are described below. It will be appreciated that the various materials, properties, dimensions and other features described above with respect to components such as the ferrule, the optical fibers, the hub, connector body and the boot are also applicable to like components described below.

Figure 26:
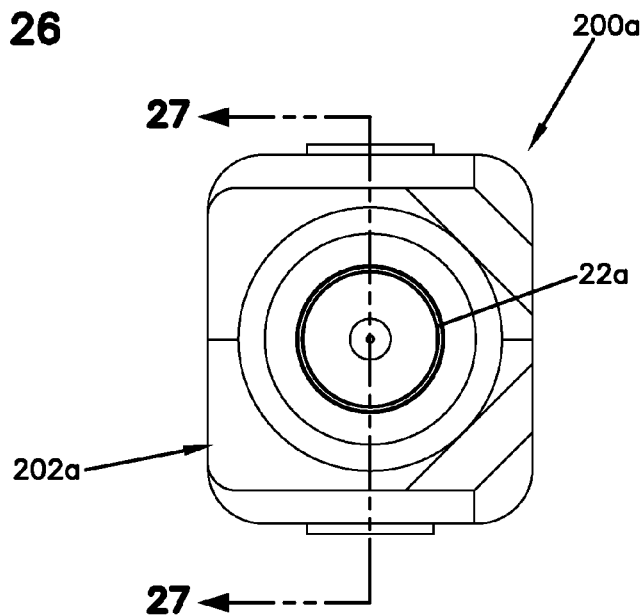
FIG. 26 is a front end view of another fiber optic connector in accordance with the principles of the present disclosure.
Figure 27A:
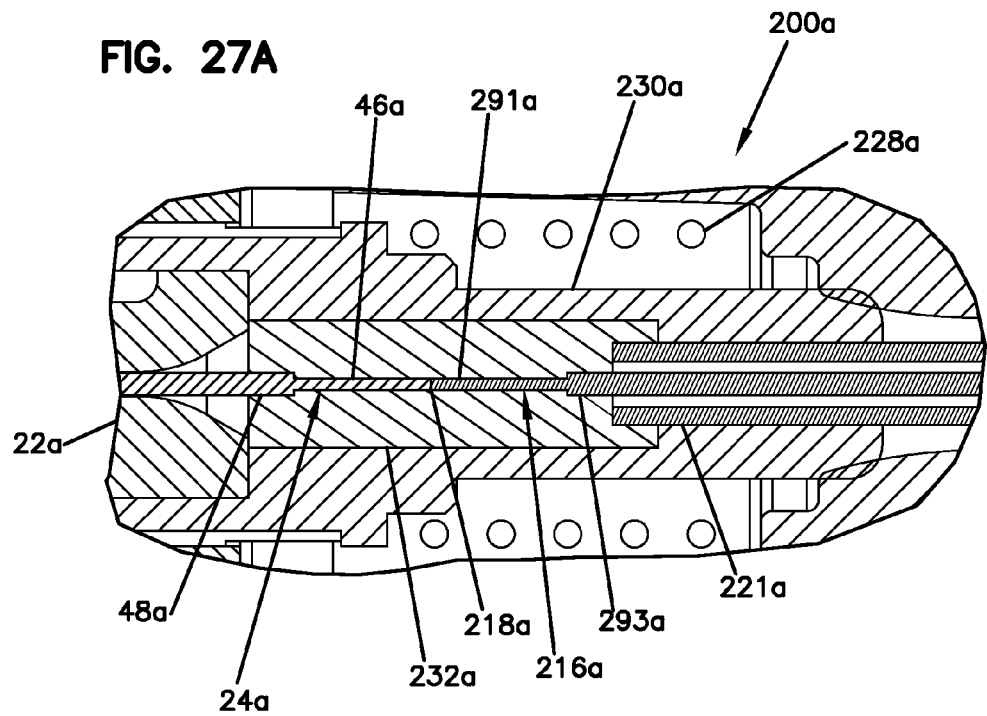
FIG. 27A is an enlarged view of a portion of FIG. 27.
Figure 27:
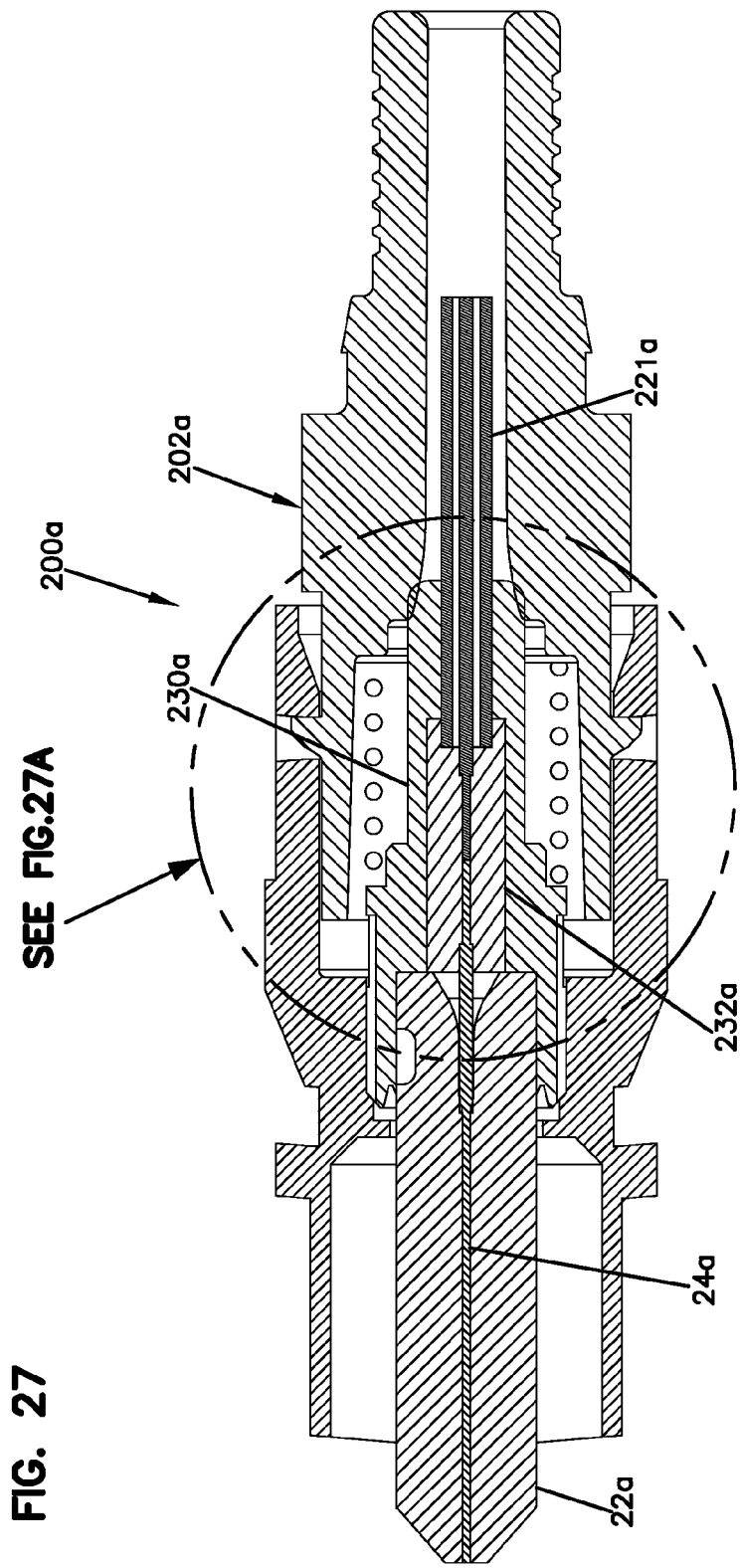
FIG. 27 is a cross-sectional view taken along section line 27-27 of FIG. 26.

FIGS. 26, 27 and 27A illustrate another fiber optic cable and connector assembly 200a in accordance with the principles of the present disclosure. The fiber optic cable and connector assembly 200a includes a fiber optic connector 202a having a connector body 204a in which a ferrule 22a is mounted. The ferrule 22a supports an optical fiber stub 24a having a bare optical fiber segment 46a spliced to a bare fiber segment 291a of an optical fiber 216a of an optical cable. The optical fiber 216a includes a coated portion 293a. A loose buffer tube 221a surrounds and protects at least a portion of the coated portion 293a of the optical fiber 216a. The bare fiber segment 46a is spliced to the bare fiber segment 291a at a splice location 218a. A generally cylindrical protective layer 232a is coated or overmolded over the splice location 218a. More specifically, the protective layer 232a is shown extending from a rearward end of the ferrule 22a to a forward end of the buffer tube 221a. The protective layer 232a fully encapsulates the bare fiber segments 46a, 291a and also encapsulates a portion of a coated fiber segment 48a of the optical fiber stub 24a and a portion of the coated portion 293a of the optical fiber 216a. The protective layer 232a further encapsulates the forward end of the loose buffer tube 221a. In certain embodiments, some of the material forming the protective layer 232a flows around the exterior of the buffer tube 221a and also flows inside the buffer tube 221a between the interior of the buffer tube 221a and the coated portion 293a of the optical fiber 216a. A hub 230a is over molded around the rearward end of the ferrule 22 and encapsulates and protects the protective layer 232a as well as the splice location 218a within the protective layer 232a. The hub 230a is bonded or otherwise secured/attached to the ferrule 22a. A spring 228a biases the hub 230a and the ferrule 222a in a forward direction. As shown at FIG. 27, the hub 232a extends from the rearward end of the ferrule 22a to the loose buffer tube 221a and fully encapsulates the protective layer 232a. Additionally, a rearward portion of the hub 232a surrounds and bonds to an exterior surface of the buffer tube 221a to prevent the buffer tube 221a from being pulled from the connector. Because both the protective layer 232a and the hub 230a are bonded or otherwise attached to the buffer tube 221a, the buffer tube 221a has enhanced pull-out characteristics. Such characteristics are further enhanced if the protective layer 232a is bonded to both the outside and the inside of the buffer tube 221a.

Figure 29:
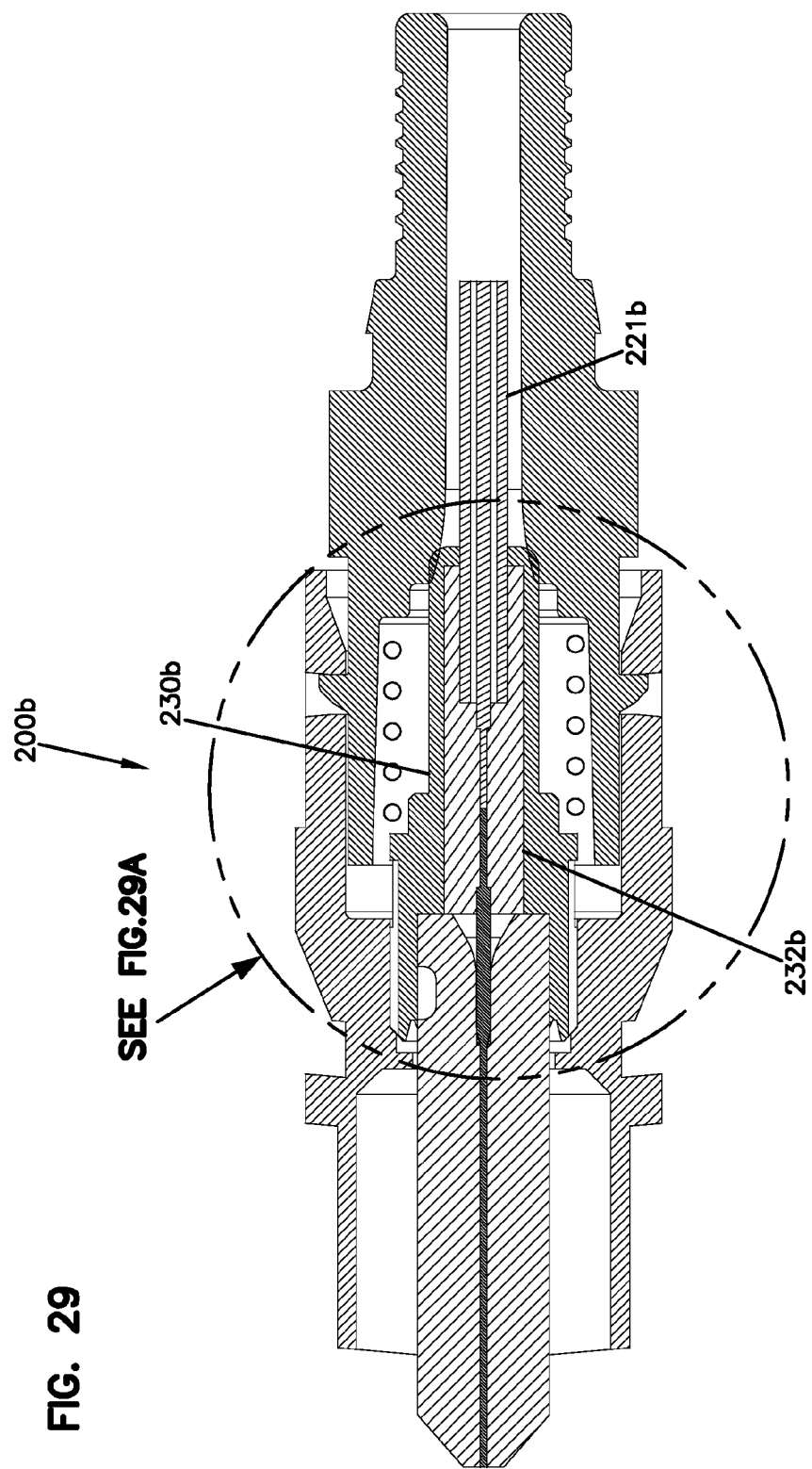
FIG. 29 is a cross-sectional view taken along section line 29-29 of FIG. 28.

In the embodiment of FIG. 27, the portion of the hub 230a attached to the outer surface of the buffer tube 221a has an axial length that is longer than a corresponding axial length of the portion of the protective layer 232a that is attached to the buffer tube 221a. FIGS. 28, 29 and 29A show another fiber optic cable and connector assembly 200b having the same basic construction as the fiber optic cable and connector assembly 200a except a protective layer 232b has been lengthened to increase the contact length between the protective layer 232b and a buffer tube 221b, and a hub 230b has been modified to accommodate the lengthened protective layer 232b. In this way, the portion of the protective layer 232b attached to the buffer tube 221b is longer than the portion of the hub 232b that engages and is bonded to or attached to the buffer tube 221b. The embodiment of FIGS. 28, 29 and 29a is particularly advantageous for applications where the protective layer 232 has better adhesion characteristics with respect to the buffer tube 221 as compared to the material of the hub 230b. In contrast, the embodiment of FIGS. 27, 28 and 28A is preferred for embodiments where the material of the hub 230a has enhanced bonding characteristics with respect to the buffer tube 221a as compared to the material of the protective layer 232a. In both of the embodiments, the rear portion of the hub engages and circumferentially surrounds (i.e., shuts-off against) the buffer tube.

Figure 30:
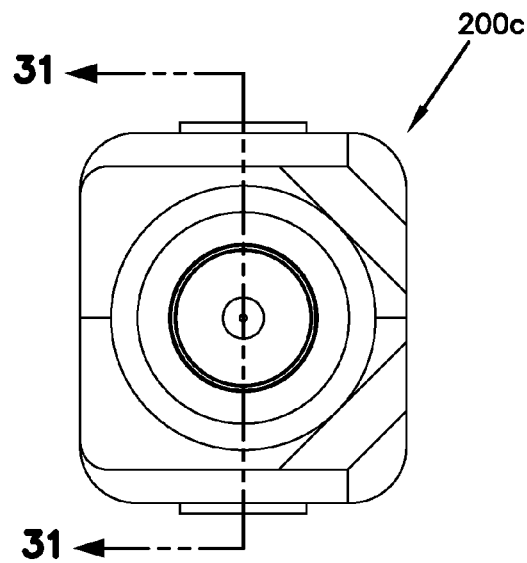
FIG. 30 is a front end view of another fiber optic connector in accordance with the principles of the present disclosure.
Figure 31A:
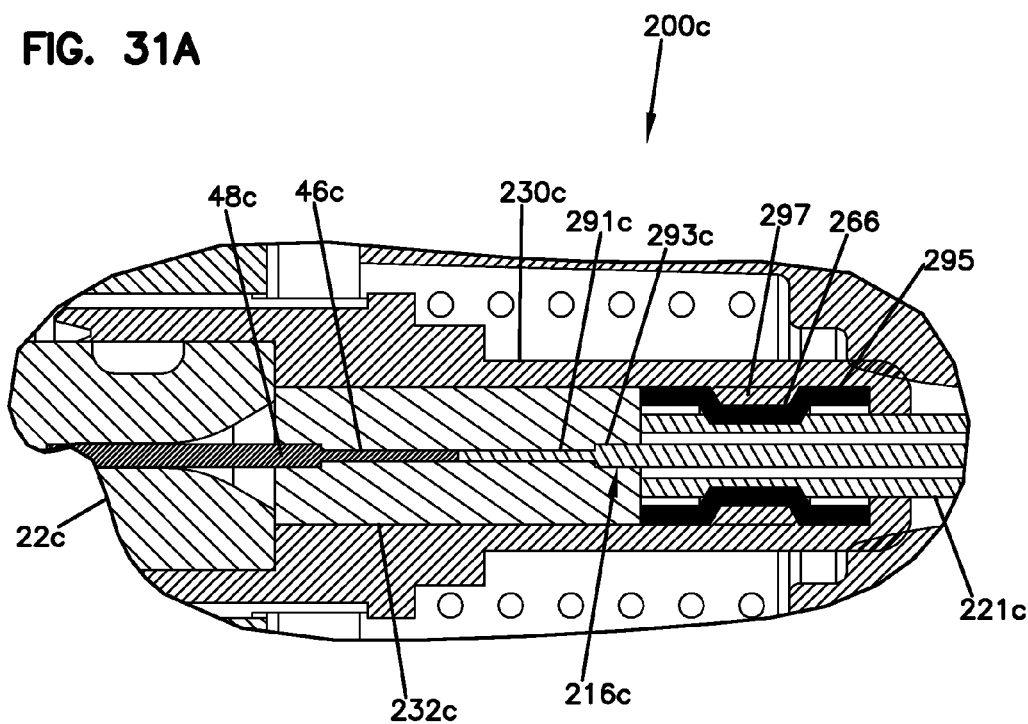
FIG. 31A is an enlarged view of a portion of FIG. 31.
Figure 31:
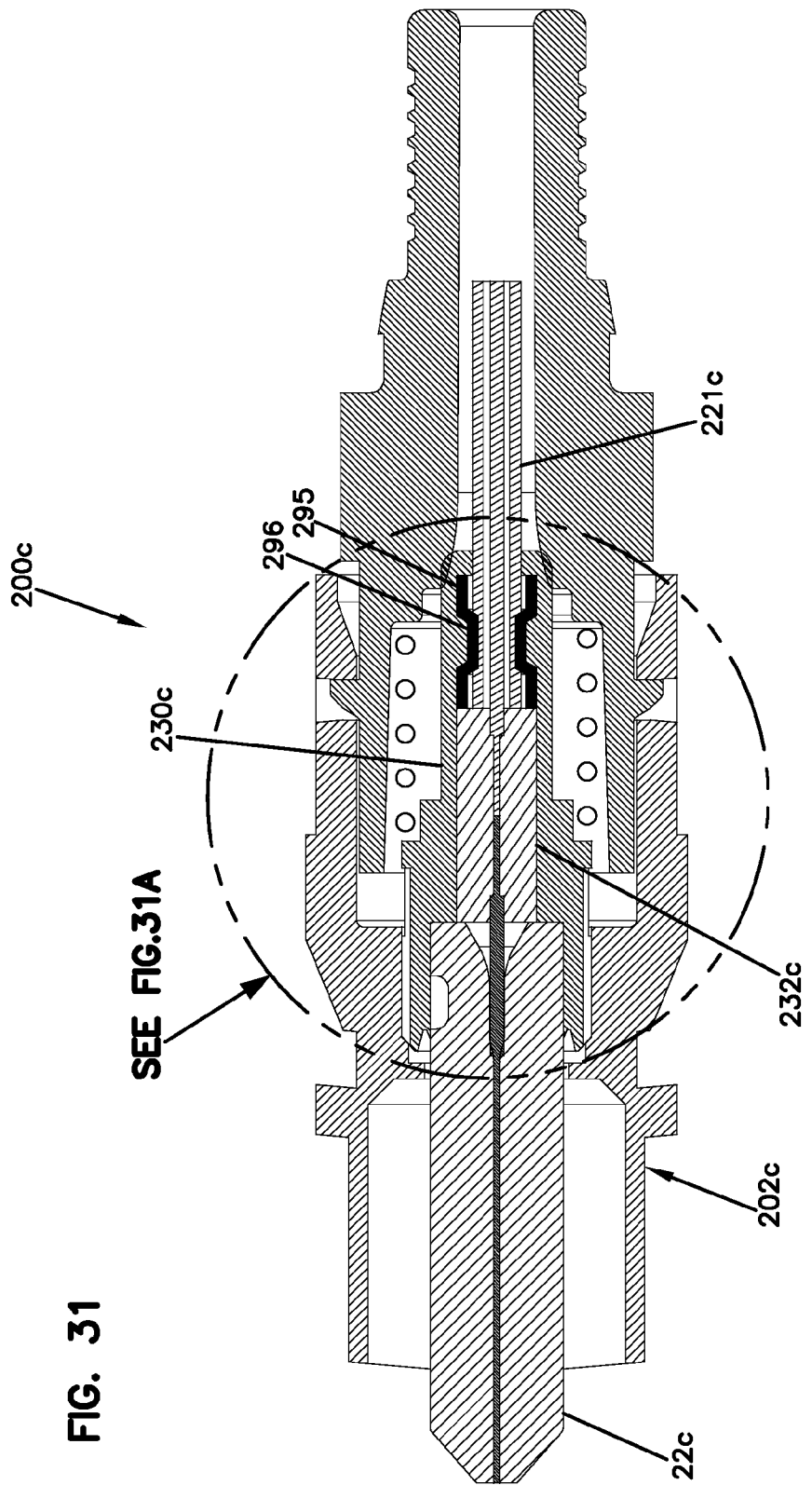
FIG. 31 is a cross-sectional view taken along section line 31-31 of FIG. 30.

FIGS. 30, 31 and 31A show a further fiber optic cable and connector assembly 200c in accordance with the principles of the present disclosure. The fiber optic cable end connector assembly 200c has structure adapted to enhance retention of a buffer tube 221c within a fiber optic connector 202c. As shown at FIGS. 31 and 31A, the fiber optic connector 202c includes a crimp ring 295 mechanically crimped adjacent a forward end of the buffer tube 221c. The crimp ring 295 includes a recess or receptacle in the form of an annular groove 296 that extends around a perimeter of the crimp ring 295. The fiber optic connector 202c further includes a hub 230c over molded over the crimp ring 295 and the forward end of the buffer tube 221c. The hub 230c includes an annular projection 297 that projects radially inwardly into the annular groove 296 of the crimp ring 295. In this way, a mechanical interlock exists between the hub 230c and the crimp ring 295. The mechanical interlock resists relative axial movement between the crimp ring 295. The crimp ring has a forward end that abuts against a protective layer 232c that protects a splice location 218c between an optical fiber stub 24c and an optical fiber 216. The optical fiber stub 24c has forward ends supported in a ferrule 22c and rearward end portions that project rearwardly from the ferrule 22c. The optical fiber 216c corresponds to a fiber optic cable. The protective layer 232c protects a bare fiber segment 291c and a coated portion 293c of the optical fiber 216c as well as a coated fiber segment 48c and a bare fiber segment 46c of the optical fiber stub 24c. The hub 230c surrounds and is coupled to (i.e., boded to, affixed to, attached to) a rearward end of the ferrule 22c and fully encloses the protective layer 232c, the forward end of the buffer tube 221c and the crimp ring 295. A rearward end of the hub 230c forms an annular buffer tube contact surface that shuts off against an exterior of the buffer tube 221c at a location rearward of the crimp ring 295.

Figure 32:
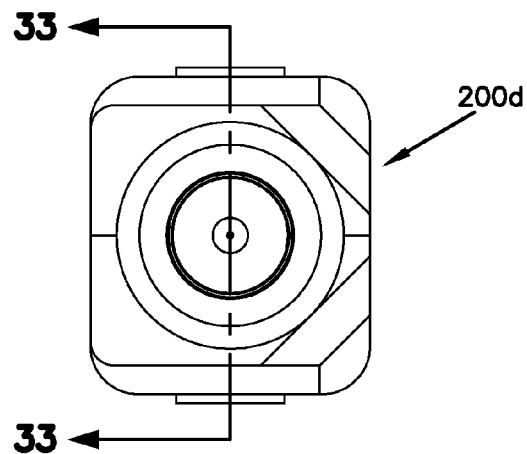
FIG. 32 is a front end view of a further fiber optic connector in accordance with the principles of the present disclosure.
Figure 33A:
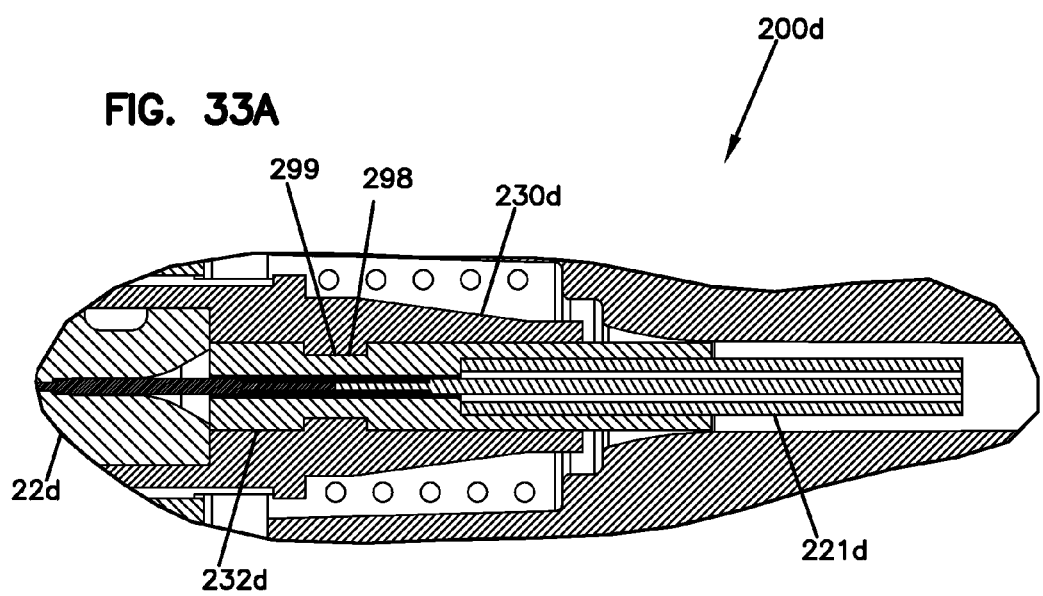
FIG. 33A is an enlarged view of a portion of FIG. 33.
Figure 33:
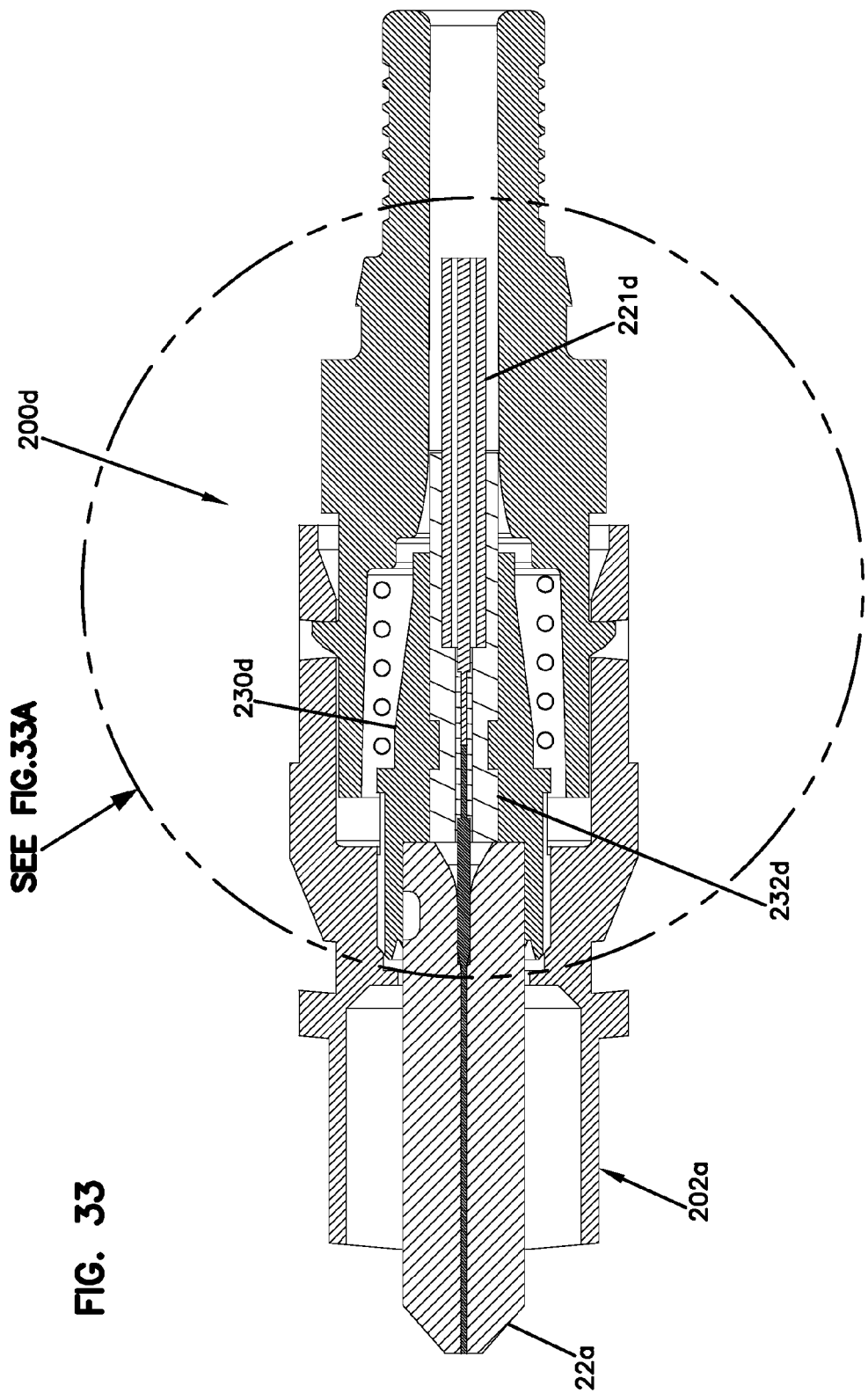
FIG. 33 is a cross-sectional view taken along section line 33-33 of FIG. 32.

In the embodiments of FIGS. 27, 29 and 31, the hubs have rear portions that circumferentially engage their corresponding buffer tubes. Thus, the molds used to form the hubs shut off on the buffer tubes. In contrast, FIGS. 32, 33 and 33a show a further fiber optic cable and connector assembly 200d in accordance with the principles of the present disclosure where a hub 230d of a fiber optic connector 202d does not engage a corresponding buffer tube 221d of the fiber optic cable and connector assembly 200d. Instead, the fiber optic cable and connector assembly 200d includes an elongated protective layer 232d that encapsulates a forward end of the buffer tube 221d and also encapsulates the splice location 218d. The protective layer 232d defines an annular groove 298 that extends around its perimeter at a location adjacent the splice location 218d. The hub 230d is over molded over the protective layer 232d and includes an annular projection 299 that fills and fits within the annular groove 298. This way, a mechanical interlock is formed between the protection layer 232d and the hub 230d to prevent a relative axial movement between the hub 230d and the protective layer 232d. The protective layer 232d is preferably affixed or otherwise bonded to the exterior surface of the buffer tube 221d and also can fill a portion of the buffer tube 221d so as to bond with an interior surface of the buffer tube 221d. The protective layer 232d projects rearwardly beyond a rearward end of the hub 230d. In this way, the rearward end of the hub 230d circumferentially surrounds and contacts the protective layer 232d but does not contact the buffer tube 221d. Thus, a mold for forming the hub 230d is configured to shut-off around the protective layer 232d rather than the buffer tube 221d. In other embodiments more than one inner lock structure can be provided between the hub 230d and the protective layer 232d. Additionally, the inner lock structures can be provided at different locations along the length of the protective layer 232d. The protective layer 232d has an outer diameter larger than an outer diameter of the buffer tube 221d.

Figure 34:
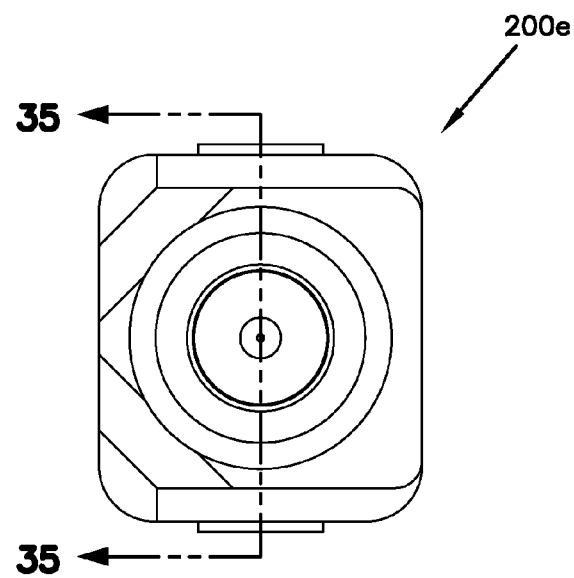
FIG. 34 is a front end view of another fiber optic connector in accordance with the principles of the present disclosure.
Figure 35A:
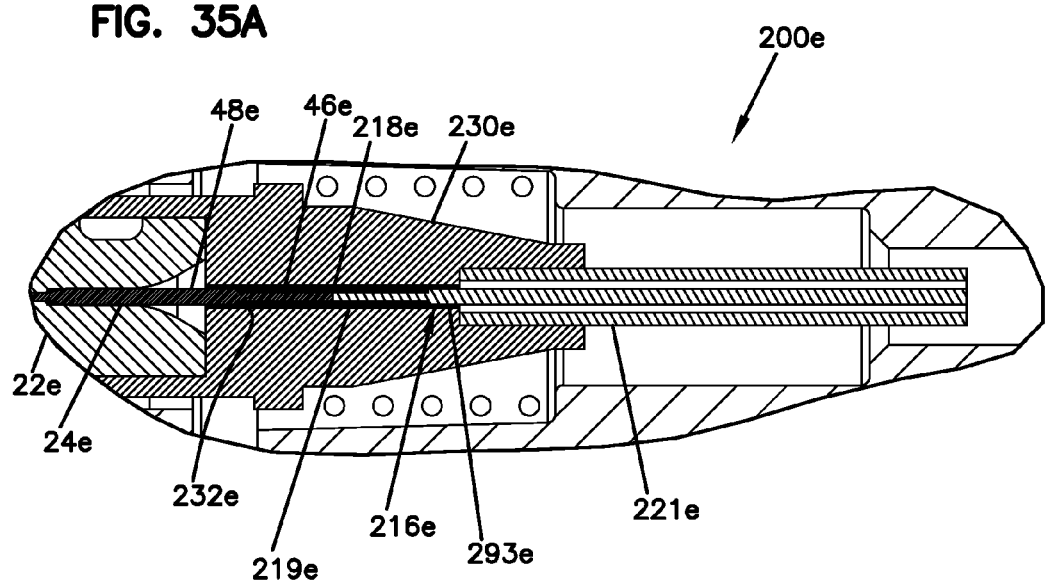
FIG. 35A is an enlarged view of a portion of FIG. 35.
Figure 35:
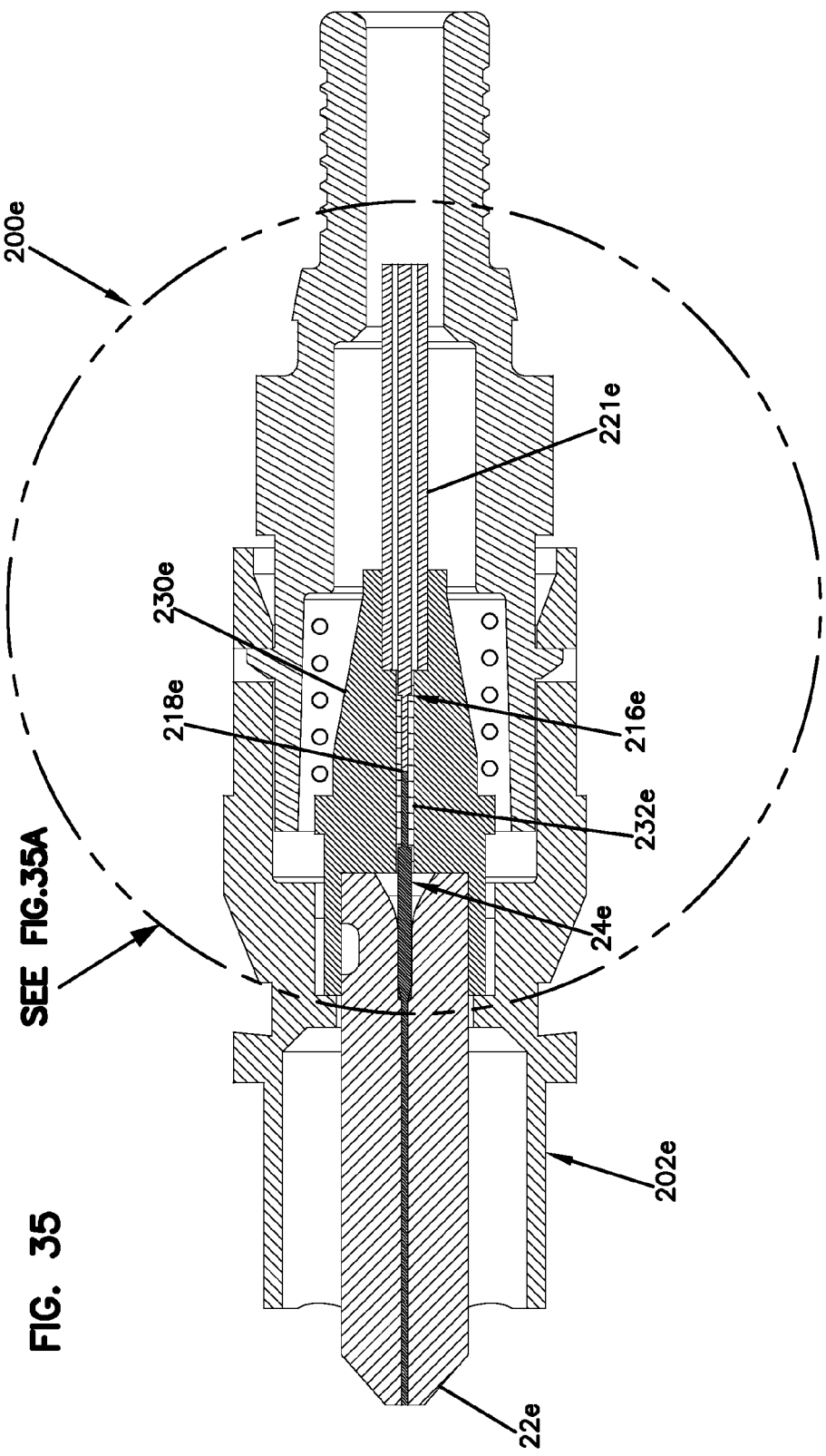
FIG. 35 is a cross-sectional view taken along section line 35-35 of FIG. 34.

FIGS. 34, 35 and 35a show another fiber optic cable and connector assembly 200e in accordance with the principles of the present disclosure. The fiber optic cable and connector assembly 200e includes a fiber optic connector 202e having a ferrule 22e supporting an optical fiber stub 24e. The fiber optic cable and connector assembly 200e also includes an optical fiber 216e spliced to the optical fiber stub 24e at a splice location 218e. The optical fiber 216 corresponds to an optical cable having a buffer tube 221e. The optical fiber stub 24e includes a coated fiber segment 48e and a bare fiber segment 46c (i.e., a bare glass segment). The optical fiber 216 includes a bare fiber segment 291e and a coated portion 293e. A protective layer 232e extends from a rear end of the ferrule 22e to a forward end of the buffer tube 221e. In the depicted embodiment, the protective layer 232e is generally cylindrical and has a maximum outer diameter that is smaller than an inner diameter of the buffer tube 221e. The protective layer 232e protects the splice location 218e and the bare fiber segments 46e and 291e. The protective layer 232e also encapsulates portions of the coated fiber segment 48e and the coated portion 293e. A hub 230e is over molded over the rear end of the ferrule 22e, and over the forward end of the buffer tube 221e. The protective layer 232e is fully enclosed or encapsulated within the hub 230e. A mold used to form the hub 230e closes on the buffer tube 221e. This way, the rear portion of the hub 230e circumferentially surrounds and is affixed to an outer surface of the buffer tube 221e. A front portion of the hub 230e circumferentially surrounds and is coupled to the rear end of the ferrule 22e.

Figure 36:
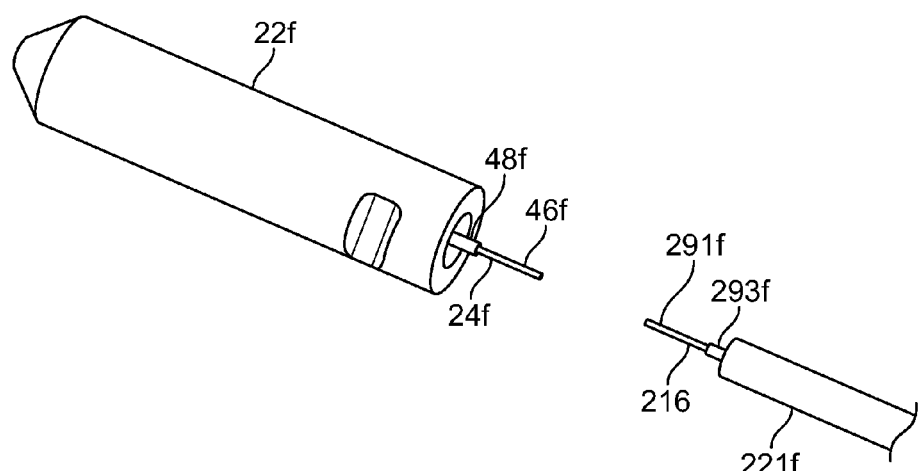
FIGS. 36-40 show an example manufacturing sequence for splicing a fiber stub of a ferrule to a fiber of a cable and for enclosing the splice and a portion of the ferrule within a composite hub suitable for use in any of the fiber optic connectors disclosed herein.
Figure 37:
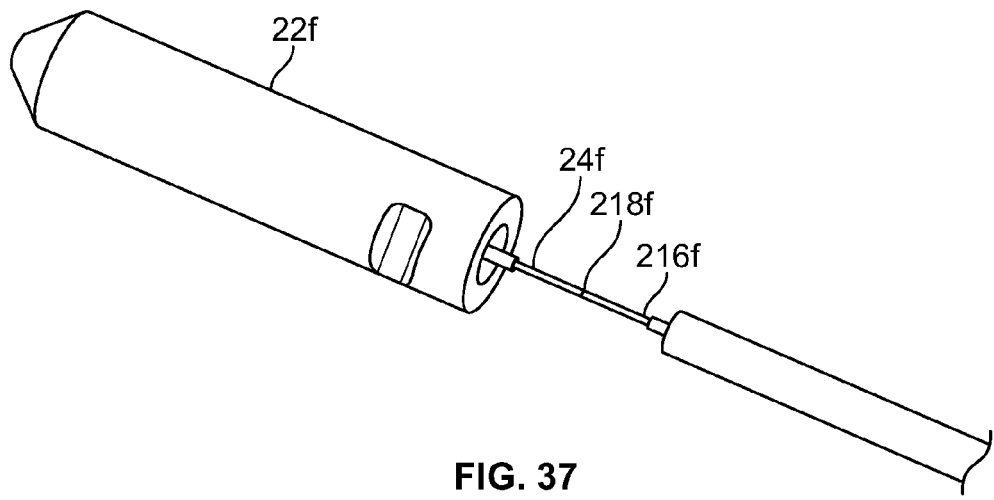
Figure 38:
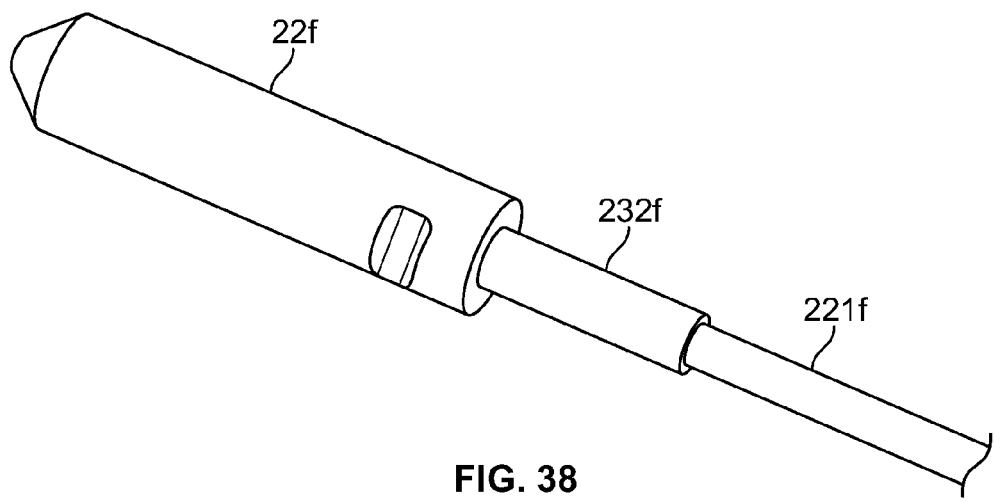
Figure 39:
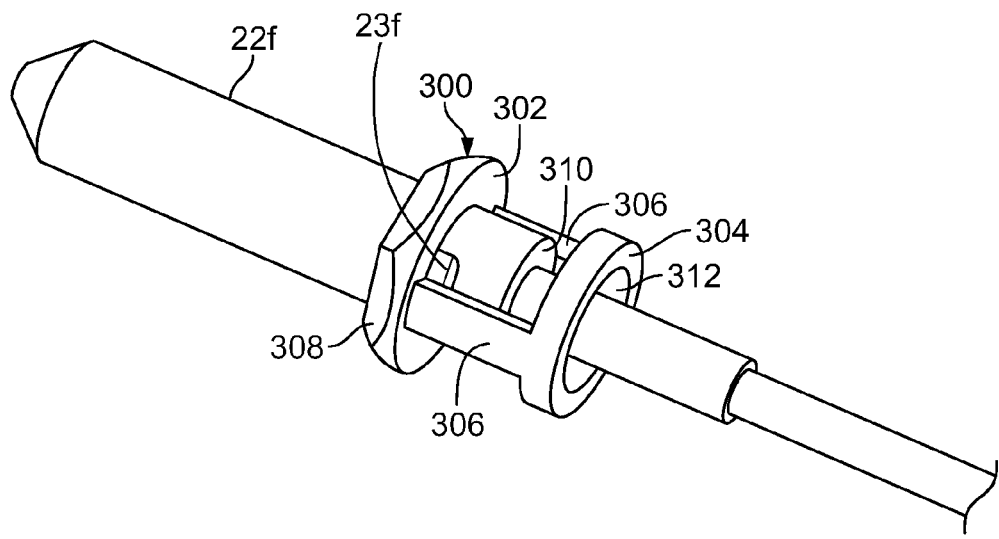
Figure 40:
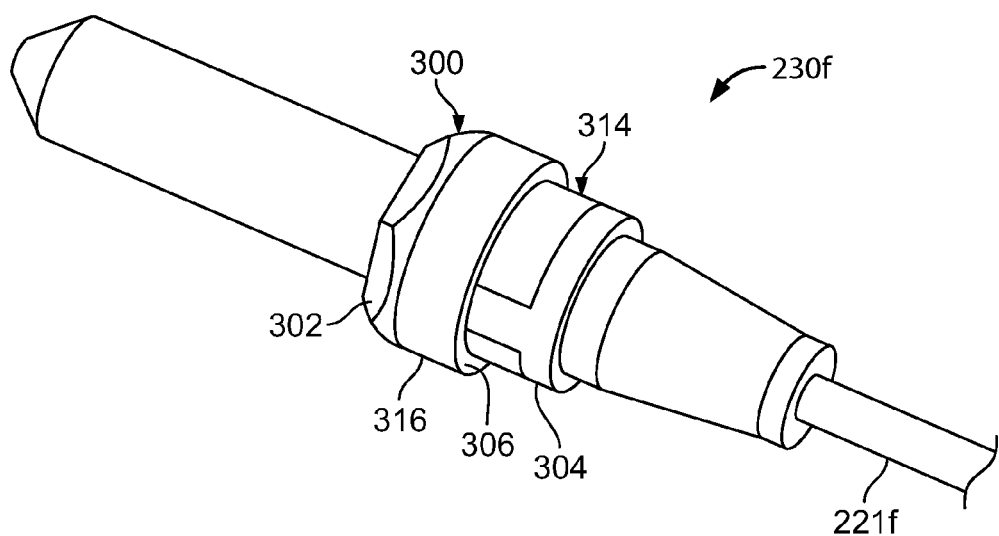

FIGS. 36-40 show a sequence for splicing an optical fiber stub 24f supported by a ferrule 22f to an optical fiber 216f of a fiber optic cable. The optical fiber stub 24f includes a bare fiber segment 46f and a coated fiber segment 48f. The optical fiber 216f includes a bare fiber segment 291f and a coated portion 293f. The fiber optic cable also includes a buffer tube 221f that surrounds the coated portion 293f of the optical fiber 216f. FIG. 36 shows the optical fiber 216f coaxially aligned with the optical fiber stub 24f in preparation for splicing. FIG. 37 shows the optical fiber stub 24f spliced to the optical fiber 216f. FIG. 38 shows a protective layer 232f over molded or otherwise applied over a splice location 218f between the optical fiber 216f and the optical fiber stub 24f. The protective layer 232f extends from a rearward end of the ferrule 22f to a forward end of the buffer tube 221f. FIG. 39 shows a hub frame 300 (e.g., a case or framework) mounted over the rearward end of the ferrule 22f and the forward end of the protective layer 232f. The hub frame 300 is preferably a pre-molded part that can be inserted over the ferrule 22f. In certain embodiments, the hub frame 300 is manufactured of a relatively hard plastic material such as a polyamide material. As shown at FIG. 39, the hub frame 300 includes a forward ring 302 that mounts over the ferrule 22f and a rearward ring 304 positioned over the protective layer 232f. A plurality of axial ribs 306 connect the forward ring 302 to the rearward ring 304. An inner diameter of the forward ring 302 preferably closely matches the size of the outer diameter of the ferrule 22f. A front end of the forward ring 302 can include a plurality of chamfered surfaces 308 adapted for seating within a connector body when the assembly is spring biased to a forward position within a connector. A plurality of openings 310 are defined between the axial ribs 206. For example, in the depicted embodiment, two axial ribs 206 spaced about 180° apart from one another are provided between the forward and rearward rings 302, 304. In other embodiments, more than two axial ribs 306 can be provided. The rearward ring 304 has an inner diameter that is substantially larger than an outer diameter of the protective layer 232f. In this way, an annular gap 312 is defined between the inner surface of the rearward ring 304 and the outer surface of the protective layer 232f. The hub frame 300 can be made of a material that is harder and more robust that the material used to form a rear portion of the hub. The hub frame 300 can be over molded on the ferrule 22f and can include an inner portion that fills or fits within a slot/recess 23f of the ferrule 22f to enhance retention of the hub frame 300 on the ferrule 22f. The hub frame 300 can be over molded using an over molding process having higher process temperatures and pressures than an over molding process used to form a portion of the hub (e.g., hub portion 314) that covers the splice location. In this way, the hub is provided with a robust construction without exposing the splice location to high processing temperatures and pressures.

After the hub frame 300 has been mounted over the ferrule 22f as shown at FIG. 39, an over molded hub portion 314 can be over molded within and over the hub frame 300 to form a composite hub 230f that is coupled to the ferrule 22f and contains the splice location 218f. The over molded portion 314 preferably fills void regions between the axial ribs 306 and also fills the annular gap 312 between the rearward ring 304 and the protective layer 232f. In the depicted embodiment, the over molded hub portion 314 completely encapsulates the protective layer 232f and includes a rearward portion that closes around the buffer tube 221f. The hub frame 300 and the over molded hub portion 314 cooperate to define the composite hub 230f that is anchored to the ferrule 22f. The over molded hub portion flows into the gaps between the annular ribs 306 of the hub frame 300 and bonds to an exterior surface of the ferrule and functions to lock the hub frame 300 in place relative to the ferrule 22f. The axial ribs 306 are shown embedded within the over molded hub portion 314 and a portion of the over molded hub portion forms a ring 316 that surrounds the axial ribs 306. The ring 316 abuts against a backside of the forward ring 302 and has an exterior surface that is generally flush with an exterior surface of the forward ring 302. The front end of the forward ring 302 is not covered by the over molded portion 314. In this way, the forward end of the forward ring 302 forms a front nose of the composite hub 230f.

It will be appreciated that the composite hub 230f can be used in any of the fiber optic connectors in accordance with the principles of the present disclosure. Additionally, in certain embodiments, the over molded hub portion 314 is formed of a hot melt adhesive or other material that can be applied and cured at relatively low molding temperatures and pressures. In certain embodiments, the overmolded hub portion 314 is made of a material having different material properties than the material of the hub frame 300. For example, the overmolded hub portion 314 can be softer or more resilient than the hub frame 300. The composite nature of the hub 230f simplifies the molding operation.

The composite construction of the composite hub 230f relies on the hub frame 300 to provide mechanical strength and precision. The composite construction of the composite hub 230f relies on the over molded hub portion 314 for securement of the composite hub 230f to the ferrule 22f, for securement of the composite hub 230f to the buffer tube 221f and for providing additional protection with respect to the splice location 218f and the bare fiber segments 46f, 291f.

Figure 41:
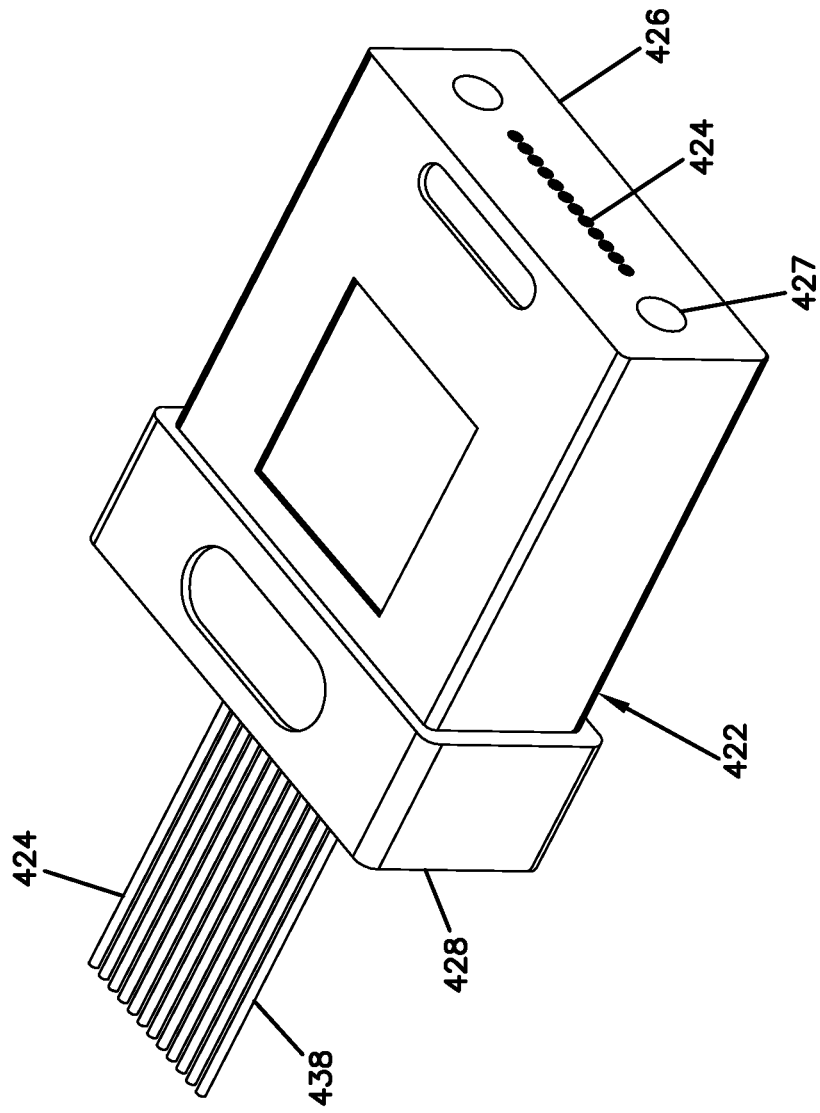
FIG. 41 illustrates a multi-fiber ferrule suitable for use with multi-fiber connectors in accordance with the principles of the present disclosure, the multi-fiber ferrule is shown supporting an optical fiber stub having a plurality of optical fibers.

It will be appreciated that various aspects of the present disclosure are also applicable to multi-fiber connectors. For example, FIG. 41 shows a multi-fiber ferrule 422 supporting a plurality of optical fiber stub having a plurality of optical fibers 424. The ferrule 422 can include openings 427 in which alignment pins can be mounted to configure the ferrule 422 as a male component. The optical fibers 424 are preferably aligned along a row within the ferrule 422 and have end faces that are polished and accessible at a forward end 426 of the ferrule 422. Rear portions 438 of the optical fibers 424 project rearwardly from a rear end 428 of the ferrule 422. Similar to previous embodiments, the optical fibers 424 can be precision optical fibers having different properties or characteristics than the optical fibers of the fiber optic cable to which the optical fiber stub is to be spliced.

In certain embodiments, the optical fibers 424 of the optical fiber stub are spliced to the optical fibers of the cable at a location in close proximity to the rear end 428 of the ferrule 422. For example, in one embodiment, the splice location is within 10 millimeters of the rear end 428 of the ferrule 422. In other embodiments, the splice location is within 5 millimeters of the rear end of 428 of the ferrule 422. In still other embodiments, the splice location is in the range of 2-5 millimeters of the rear end 428 of the ferrule 422.

Figure 42:
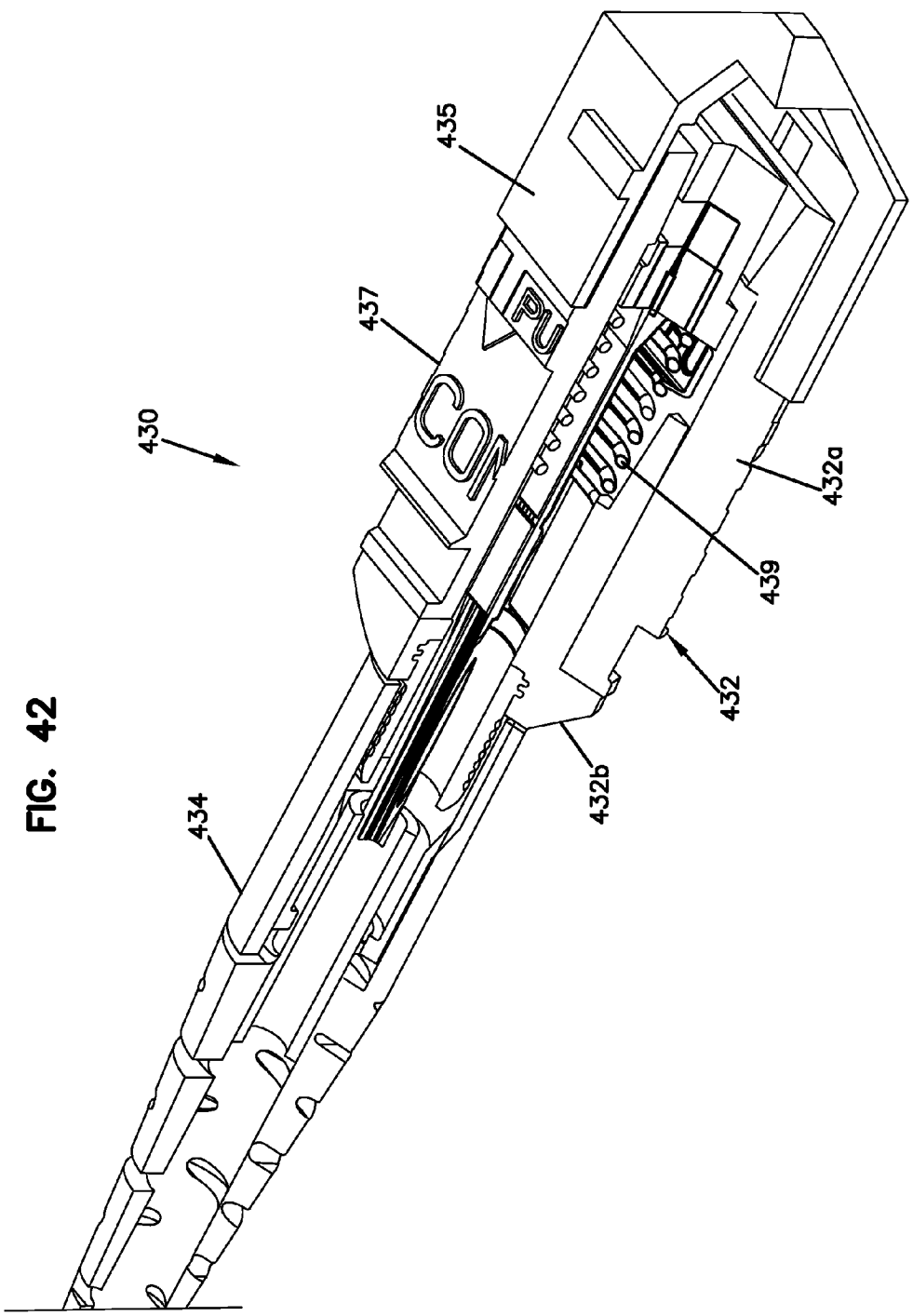
FIG. 42 illustrates a multi-fiber optical connector incorporating the multi-fiber ferrule of FIG. 41.

FIG. 42 shows the ferrule 422 mounted within a multi-fiber fiber optic connector 430. The connector 430 includes a connector body 432 having a front piece 432a and a rear piece 432b. A boot 434 is mounted to a rear end of the rear piece 432b of the connector body 432. The front end 426 of the ferrule 422 is accessible at the front end of the connector body 432. A removable dust cap 435 is shown mounted over the front end 426 of the ferrule 422. A release sleeve 437 is mounted over the connector body 432. A spring 439 biases the ferrule 422 in a forward direction. To use the fiber optic connector 430, the dust cap 435 is removed thereby allowing the front end of the connector to be inserted within a corresponding fiber optic adapter (e.g., an MPO adapter). As is known in the art, the fiber optic connector 430 (e.g., an MPO connector) snaps within the fiber optic adapter. By pulling back on the release sleeve 437, the fiber optic connector 430 can be released from the fiber optic adapter.

FIGS. 43-48 show a sequence of steps for preparing a multi-fiber fiber optic cable 440 to be spliced to the optical fibers 424 of the ferrule 422 of FIG. 41. The multi-fiber cable 440 can include a plurality of optical fibers 442 positioned within a jacket 444. A strength layer 446 for providing tensile reinforcement to the cable 440 can be positioned between the jacket 444 and the optical fibers 442. In certain embodiments, the strength layer 446 is made of a tensile reinforcing material such as aramid yarn.

As shown at FIG. 43, the outer jacket 444 has been stripped to expose about 25-35 millimeters of the optical fibers 442. The strength layer 446 is shown separated from the fibers 442 and folded back over the jacket 444. The optical fibers 442 have been sorted and arranged into a row. A material such as tape 448 can be used to hold the coated optical fibers 442 in the desired order. In the depicted embodiment, the optical fibers 442 include twelve fibers arranged in a planar 12×1 array. In other embodiments, other types of instant adhesive can be used to secure the optical fibers 442 in the desired order sequence.

FIG. 44 shows the strength layer 446 trimmed to a suitable length for securement to the multi-fiber connector 430. In one embodiment, the strength layer 446 is trimmed to a length of about 4-6 millimeters.

Figure 45:
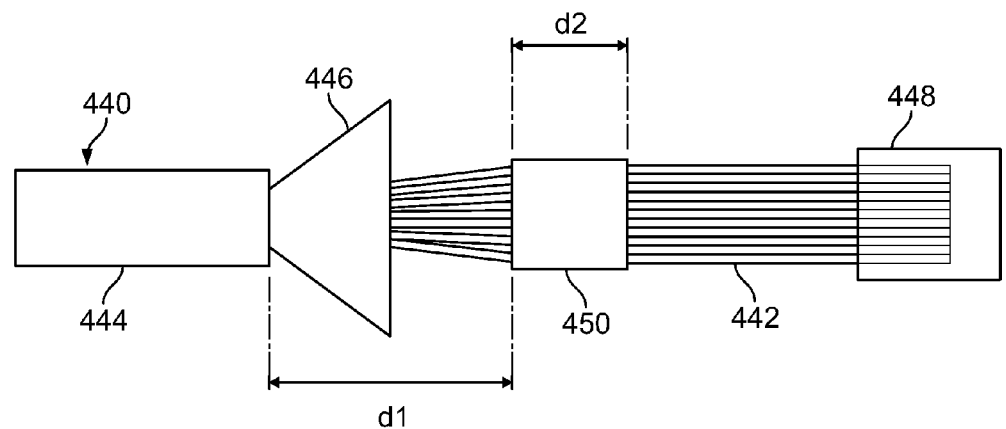

FIG. 45 shows a thermoplastic over molded section 450 is molded over the ordered optical fibers 442. In one embodiment, the over molded section 450 is separated from the cable jacket 444 by a distance d1 in the range of about 9-13 millimeters. In certain embodiments, the over molded section 450 has a length d2 of about 3-6 millimeters. In certain embodiments, d1 can equal about 11 millimeters and d2 can equal about 4.5 millimeters.

Figure 46:
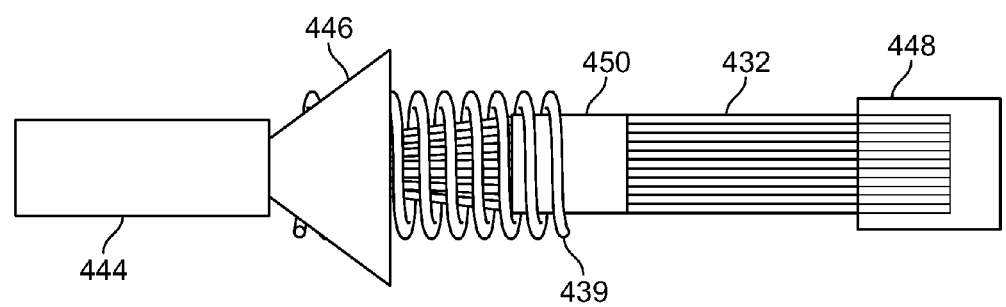
Figure 47:
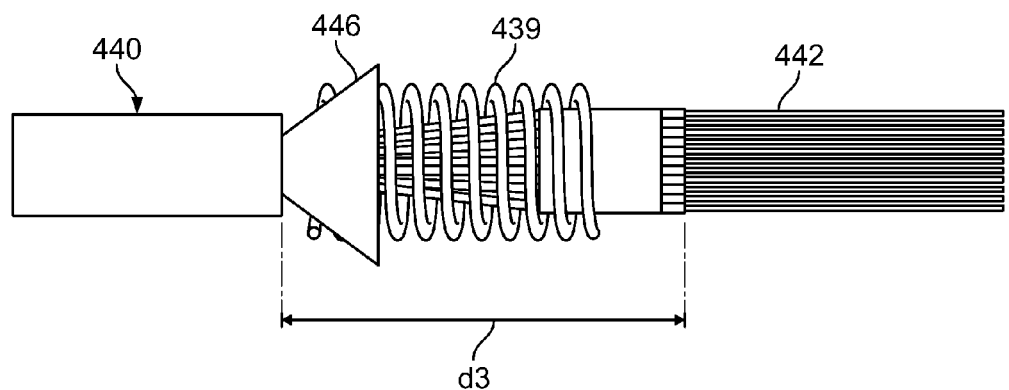
Figure 48:
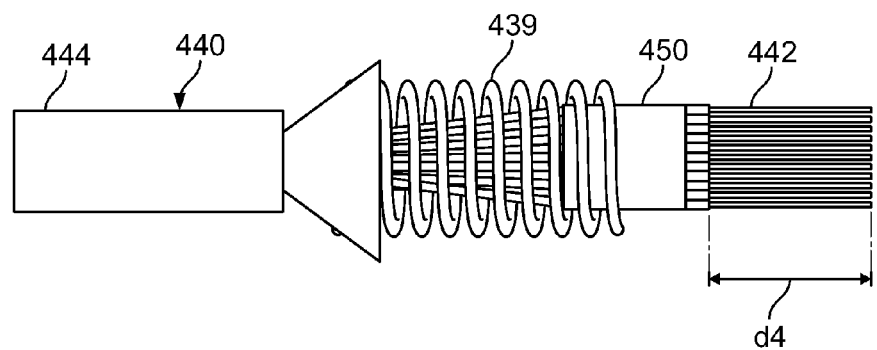

FIG. 46 shows the spring 439 of the multi-fiber connector 430 inserted over the optical fibers 442 of the cable 440. FIG. 47 shows coatings of the optical fibers 442 stripped from the optical fibers 442. In this way, bare glass portions of the optical fibers 442 are exposed. In certain embodiments, the bare glass portions can start at a point spaced a distance d3 of about 15-17 millimeters from the end of the cable jacket 444. After the stripping step, the bare optical fibers can be cleaned and inspected for defects. FIG. 48 shows the optical fibers 442 after the optical fibers 442 have been cleaved (e.g., laser cleaved). In certain embodiments, after cleaving, the bare fiber portions of the optical fibers 442 have a length d4 of about 5 millimeters. After cleaving, the fiber optic cable 440 is ready to be spliced to the optical fibers 424 supported by the multi-fiber ferrule 422.

Figure 49:
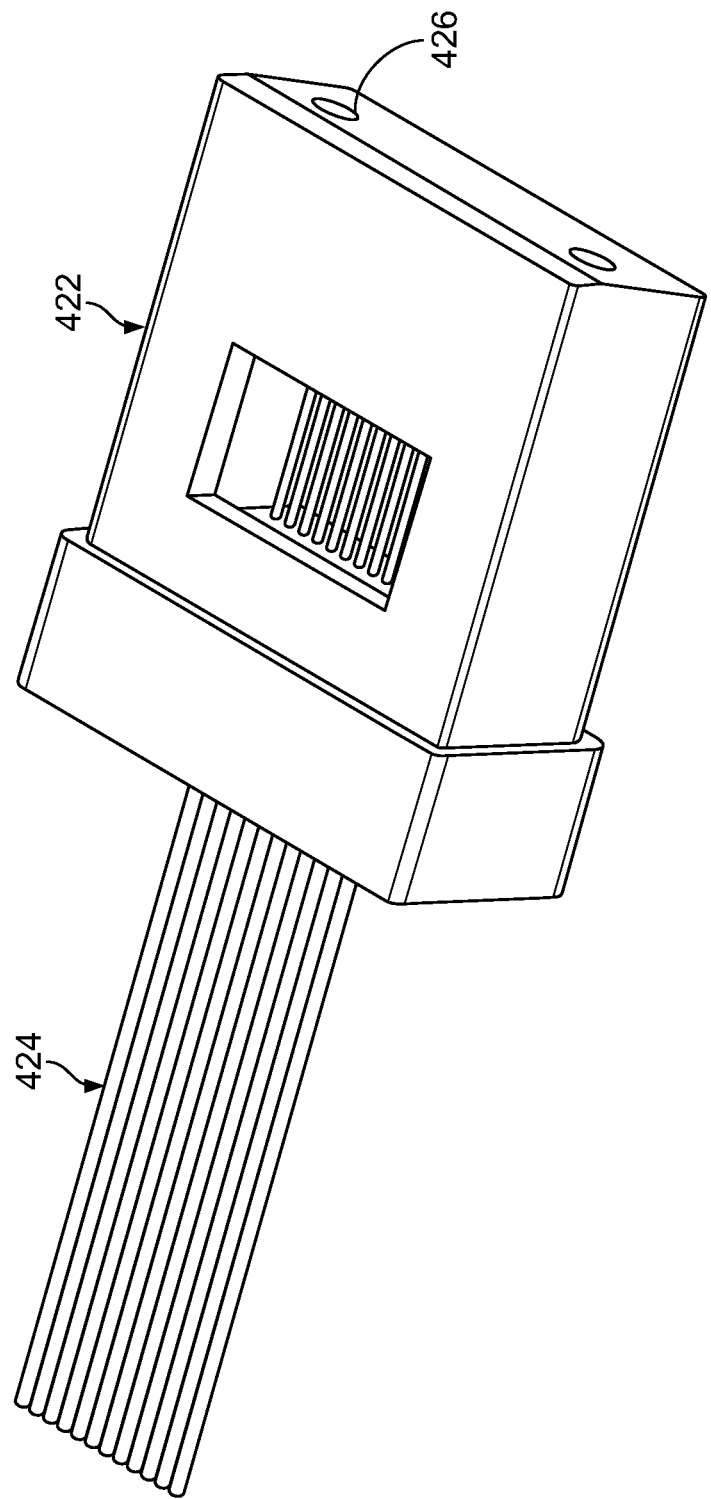
FIGS. 49-51 show a sequence of process steps for preparing the optical fiber stub of the multi-fiber ferrule of FIG. 41 for splicing to the multi-fiber cable of FIGS. 43-48.

The assembly of the multi-fiber ferrule 422 and the optical fibers 424 is shown at FIG. 49. To access the depicted assembly, the ferrule 422 can be bowl fed and picked and placed at the output of the bowl. It will be appreciated that the front end 426 of the ferrule 422 has been preprocessed and the end faces of the optical fibers 424 at the front end 426 have been pre-polished. Additionally, in the bowl, the end face 426 is preferably protected by a dust cap. An automated system can scan and read information provided on the ferrule 422 (or on the dust cap) that identifies the ferrule 422. The automated system can also remove the packed dust cap, rotate the ferrule 422 in a vision system to accurately find the window on the ferrule, and can accurately position the ferrule in a gripper/carrier without touching or damaging the front face 426 of the ferrule 422.

Figure 50:
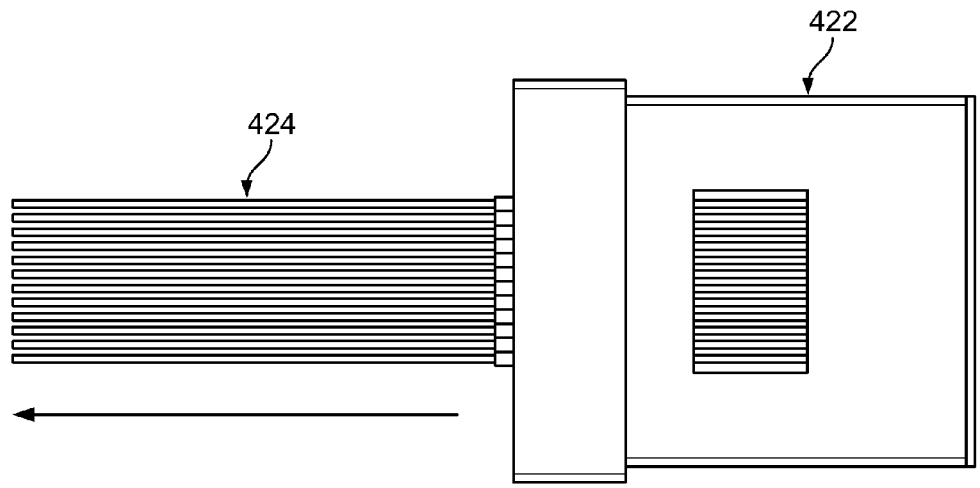
Figure 51:
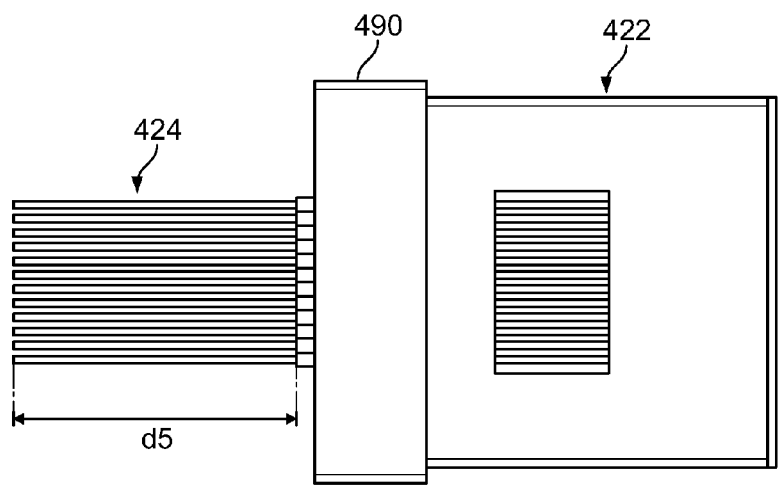

FIGS. 50 and 51 show steps for preparing the optical fibers 424 of the multi-fiber ferrule 422 for splicing to the optical fibers of the multi-fiber cable 440. To prepare the ferrule 422 and the optical fibers 424 for splicing, coatings of the optical fibers 424 are stripped to expose bare glass portions of the optical fibers 424 as shown at FIG. 50. Also, the optical fibers can be cleaned and inspected for defects. As shown at FIG. 51, the bare optical fibers are then cleaved to a length d5 of preferably 5 millimeters or less. As shown at FIG. 51, buffered portions of the optical fibers project outwardly from the rear side of the ferrule 422 by a distance less than about 1 millimeter. In the depicted embodiment of FIG. 51, a boot 450 is shown schematically positioned within the ferrule 422 adjacent the rear end 428. The boot 450 is configured to provide bend radius protection and strain relief to the optical fibers 424 adjacent the rear end 428 of the ferrule 422. Preferably, the boot 450 projects no more than 2 millimeters rearwardly from the rear end 428 of the ferrule 422. In the depicted embodiment, a rear end of the boot is flush with the rear end 428 of the ferrule 422. In other embodiments, the rear end of the boot 450 can be recessed within the ferrule 422 so as to be forwardly offset from the rear end 428 of the ferrule. This way, the boot 450 provides protection of the optical fibers 424 without interfering with subsequent splicing operations that take place in close proximity to the rear end 428 of the ferrule 422.

Figure 52:
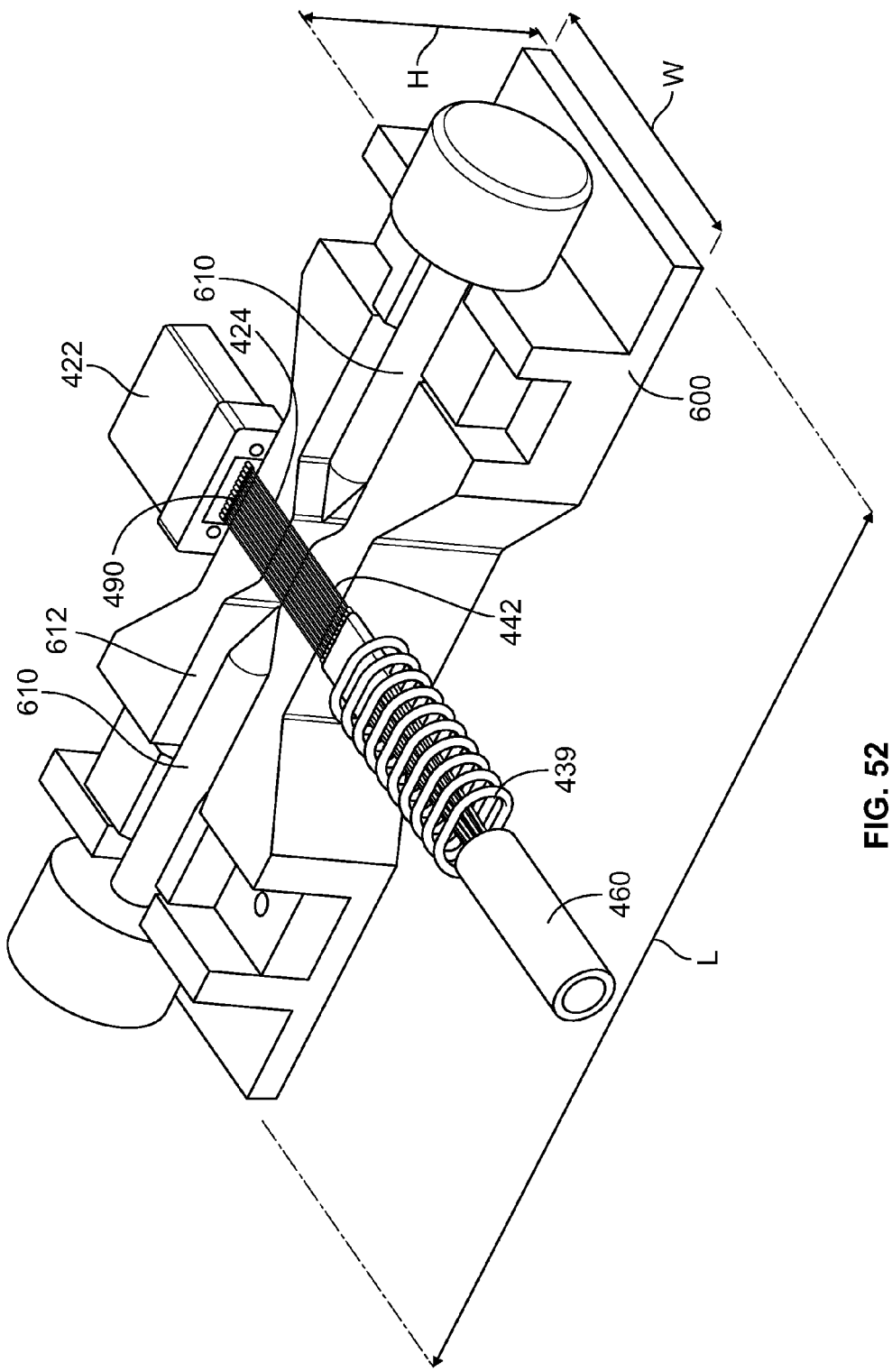
FIG. 52 is a perspective view of a fusion splicing tray in accordance with the principles of the present disclosure for use in fusion splicing the multi-fiber cable of FIGS. 43-48 to the fiber stub of the ferrule of FIG. 41.
Figure 53A:
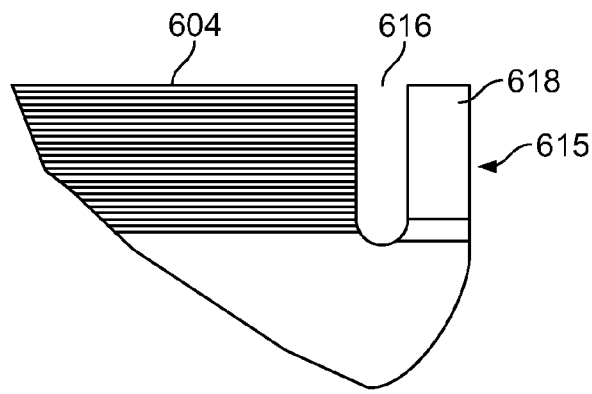
FIG. 53A is an enlarged view of a portion of FIG. 53.

FIG. 52 shows the stub optical fibers 424 of the ferrule 422 being fusion spliced to the optical fibers 442 of the multi-fiber cable 440. A fusion splicing tray 600 is used to provide alignment of the optical fibers 442, 424 and to protect various components from exposure to the fusion splicing arc. The tray has a length L, a width W and a height H. The width W extends in a direction parallel to the optical fibers 442, 424 when the optical fibers 442, 424 are supported on the tray 600. As shown at FIG. 53, when viewed in top plan view, the tray 600 has a narrowed, waist region 602 (i.e., a narrowed region or a waist region) at an intermediate location along the length L. The narrow, waist region 602 has a reduced width W1 that is smaller than the width w of the tray 600 at the ends of the tray 600. The narrow region 602 is provided by notches 603 that extend into a main body of the tray 600 at opposite sides of the tray 600. In other embodiments, only one of the notches may be provided to form the narrowed region 602.

The narrowed region 602 corresponds to a splicing region/zone 613 where the optical fibers 442, 424 are routed across the tray 600 and fusion spliced together. Alignment structures in the form of v-grooves 604 are provided at a top side of the tray 600 adjacent the narrowed region 602 for supporting the optical fibers 442, 424 and for coaxially aligning the optical fibers 442, 424. In other embodiments, active alignment equipment of the type previously described can also be used to coaxially align the optical fibers. The narrowed region 602 provides clearance for allowing the optical fibers 442 to be spliced to the optical fibers 424 in close proximity to the rear end 428 of the ferrule 422.

Figure 54:
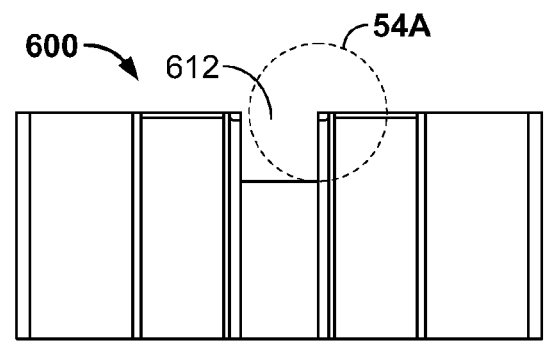
FIG. 54 is a cross-sectional view taken along section line 54-54 of FIG. 53.
Figure 54A:
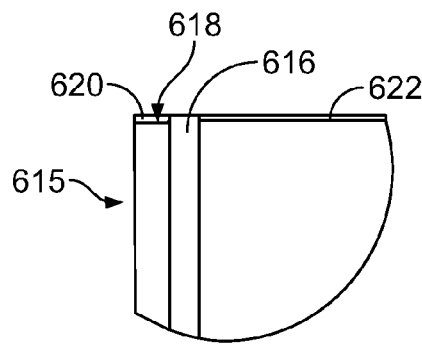
FIG. 54A is an enlarged view of a portion of FIG. 54.
Figure 55:
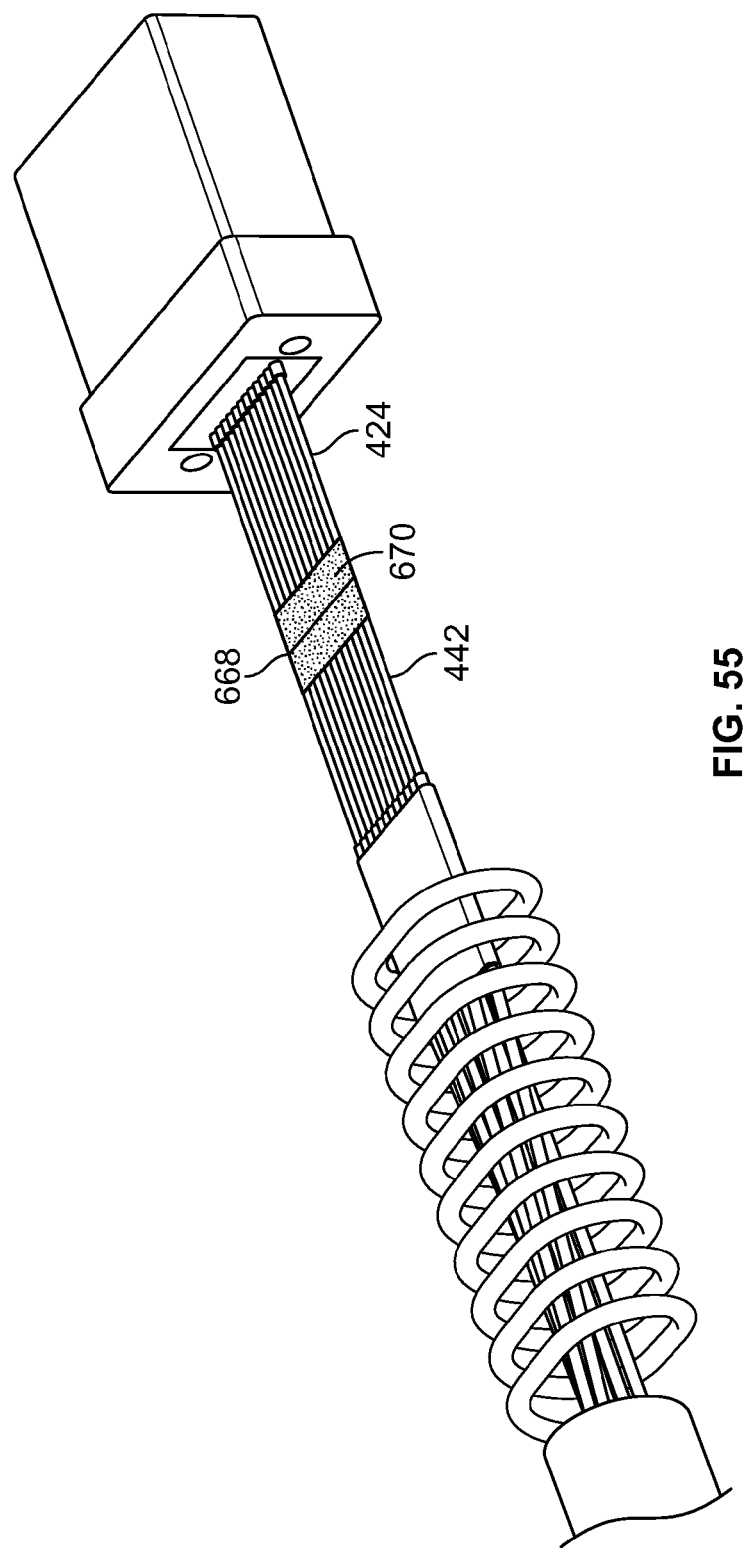

The tray 600 also includes structure for preventing debris from contaminating the splicing region 613. As shown at FIGS. 52 and 53, arc/fusion splicing electrodes 610 fit within a slot 612 that extends along the length L of the tray 600. The slot 612 narrows to a narrowed portion 615 as the slot passes the region where the v-grooves 604 support the optical fibers 442, 424. The narrowed portion 615 corresponds to the spicing region 613. The electrodes 610 are positioned on opposite sides of the splicing region 613 of the tray 600. Free ends of the optical fibers 442, 424 that are intended to be spliced together overhang the narrowed portion 615 of the slot 612. Contamination reduction slots 616 are positioned adjacent to each of the sets of v-grooves 604. Specifically, the contamination reduction slots 616 are positioned between the v-grooves 604 and the narrowed portion 165 of the slot 612. Preferably, the contamination reduction slots 616 extend completely through the height H of the tray 600 and allow contamination to fall through the tray 600 rather than contaminating the ends of the fibers prior to splicing. Rails 618 are positioned between the contamination reduction slots 616 and the narrowed portion 615 of the slot 612. The rails 618 are preferably slightly recessed relative to the depth of the v-grooves 604. For example, as shown at FIG. 54a, top sides 620 of the rail 16 are positioned lower than valleys 622 of the v-grooves 604. It will be appreciated that the depth of the slot 612 extends substantially below the top sides 620 of the rails 618. The rails 618 function to catch debris before the debris enters the slot 612.

The slot 612 is preferably deep enough for an electric arc to be passed between the electrodes 610 and used to heat and fuse together the ends of the optical fibers 442, 424. By recessing the electrode 610 within the slot 612, the tray 600 functions to shield the ferrule 422 and other components from heat associated with the arc. Prior to fusing the ends of the optical fibers together via the arc generated across the electrodes 610, a short burst of electric arc can be used to clean the splice zone. The v-grooves can be defined in a ceramic portion of the tray 600 (or the tray can be fully made of ceramic or like materials) and can be used to provide final alignment of the optical fibers 442, 424. The tray 600 can also protect the areas outside the splice zone from unwanted exposure to the electric arc. The arc provided between the electrode 610 reflows the glass of the optical fibers and thereby provides a splice thereinbetween. In other embodiments, alternative heat sources may be used as well.

After the fusion splicing process has been completed, the components are removed from the tray 600 and the fusion splice area is preferably over molded with a protective coating material such as an ultraviolet cured polymer. The ultraviolet cured polymer is preferably cured to ensure that it is stable to temperatures exceeding 100° C. The ferrule 422 is then configured to be a female component (see FIG. 56) or a male component (see FIG. 57). A spring clip can be mounted adjacent the back side of the ferrule as needed for either the female configuration or the male configuration of the connector.

Figure 58:
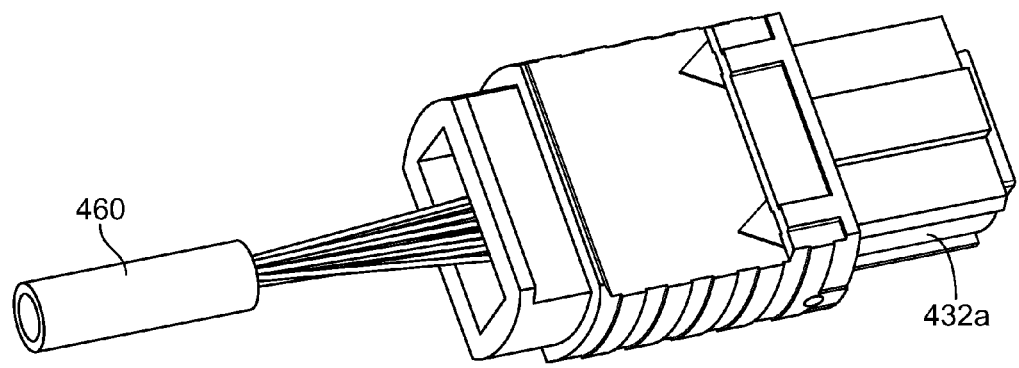
Figure 59:
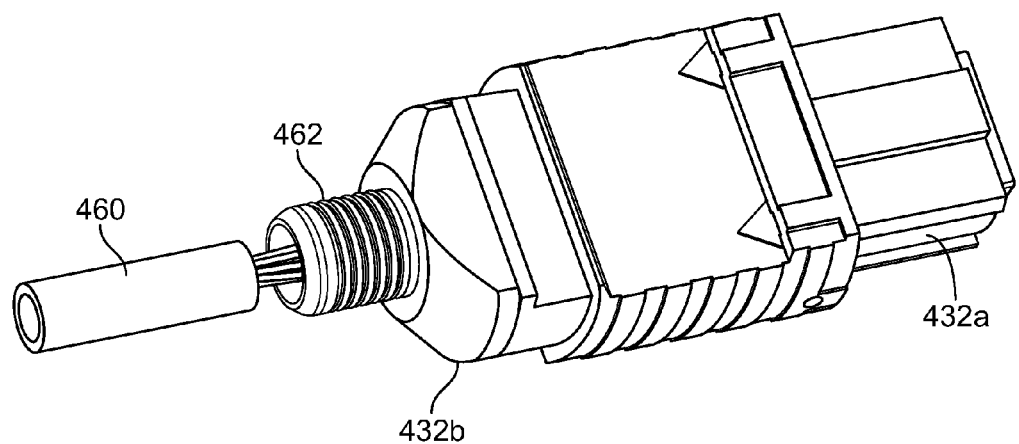
Figure 60:
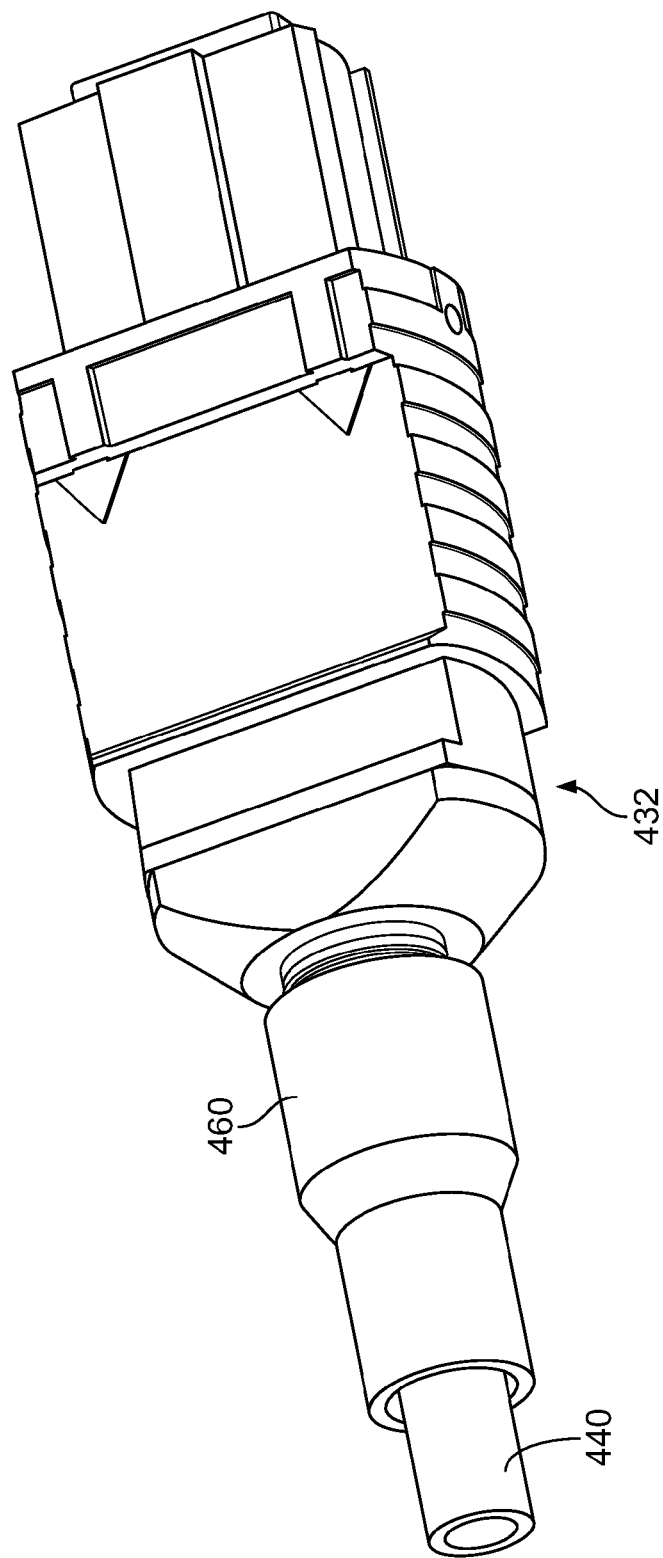

Subsequently, the ferrule 424 and the spring are loaded into the front portion 432a of the connector housing 432 (see FIG. 58) and the rear portion 432b of the connector housing 432 is secured to the front portion 432a thereby retaining the spring and ferrule therein (see FIG. 59). The strength layer 446 of the cable 440 is then secured (e.g., crimped with crimp ring 460) to a rear stub 462 of the rear portion 432b of the connector housing 432 (see FIGS. 59 and 60). Next, the boot 434 is installed over the crimp band as shown at FIG. 61 and the dust cap 435 is installed over the front end of the connector 430 as shown at FIG. 62.

Figure 65:
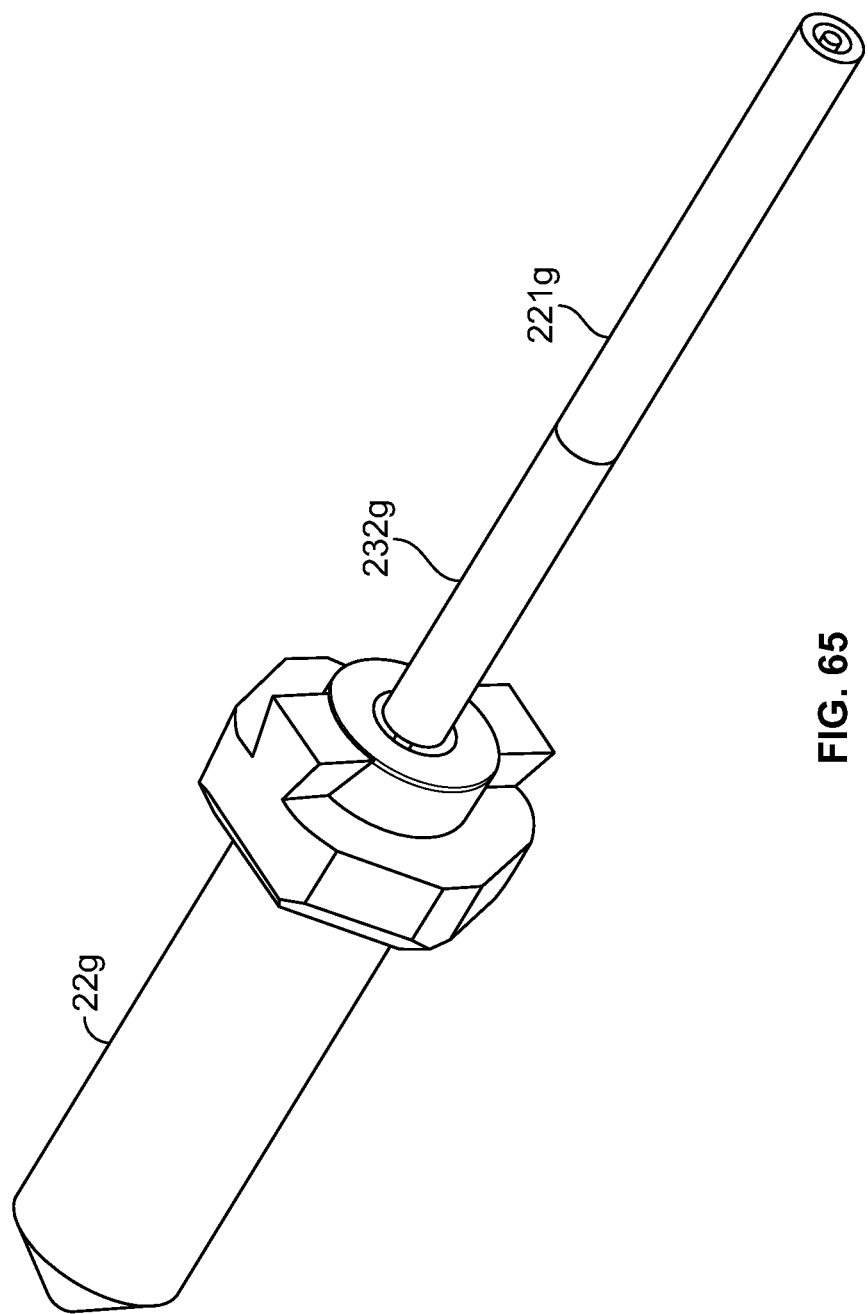
Figure 66:
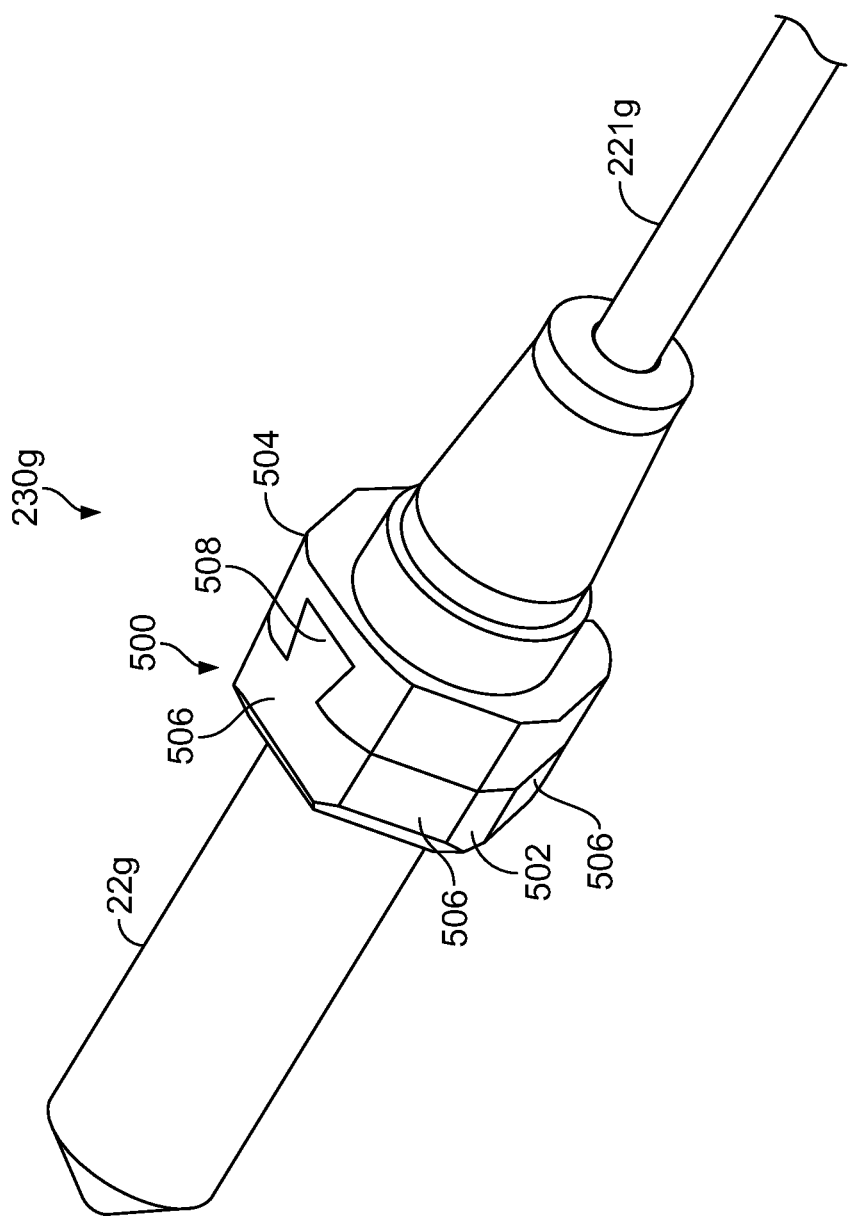

FIGS. 63-67 show a sequence for splicing an optical fiber stub 24g supported by a ferrule 22g to an optical fiber 216g of a fiber optic cable. The optical fiber stub 24g includes a bare fiber segment 46g and a coated fiber segment 48g. The optical fiber 216g includes a bare fiber segment 291g and a coated portion 293g. The fiber optic cable also includes a buffer tube 221g that surrounds the coated portion 293g of the optical fiber 216g. FIG. 63 shows the optical fiber 216g coaxially aligned with the optical fiber stub 24g in preparation for splicing. FIG. 64 shows the optical fiber stub 24g spliced to the optical fiber 216g. FIG. 65 shows a protective layer 232g over molded or otherwise applied over a splice location 218g between the optical fiber 216g and the optical fiber stub 24g. The protective layer 232g extends from a rearward end of the ferrule 22g to a forward end of the buffer tube 221g. FIG. 66 shows a body 500 having a front hub portion 502 and a rear hub portion 504. The front hub portion 502 includes flat sides 506 and an inter lock portion 508, such as a dove tail. In certain embodiments, the front hub portion 502 of the body 500 can be manufactured of a relatively hard plastic material such as a polyamide material. As shown at FIG. 66, the front hub portion 502 is premolded (e.g., overmolded) over the ferrule 22g prior to the optical fiber stub 24g being spliced to the optical fiber 216g. Marking can be placed on the flat sides 506 of the front hub portion 502 to aid in tuning. In certain embodiments, the front hub portion 502 has 6 or 8 flats. The flat 506 closest to the core offset direction can be marked for later identification when the ferrule 22g assembly is loaded in a connector body. Thus, the marked flat 506 can be used to identify (either manually or automatically) the core offset direction of the ferrule 22g.

Figure 67:
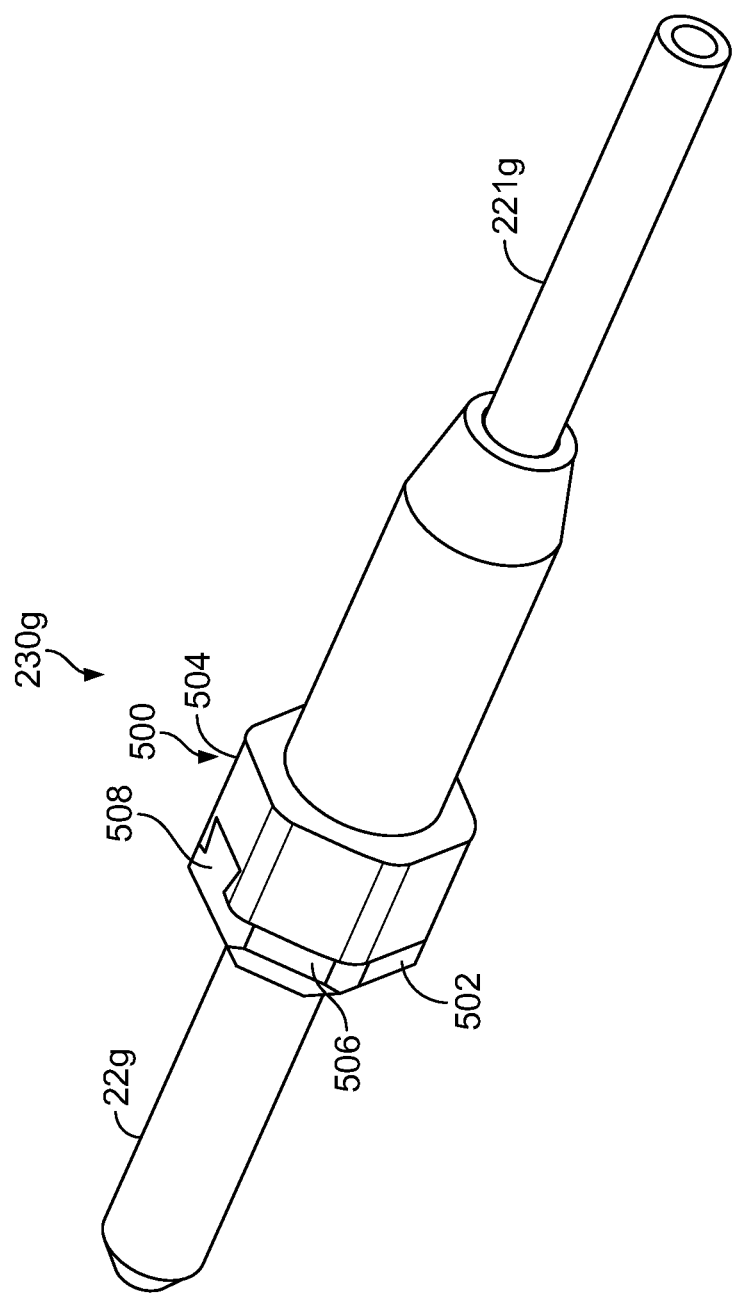
Figure 68:
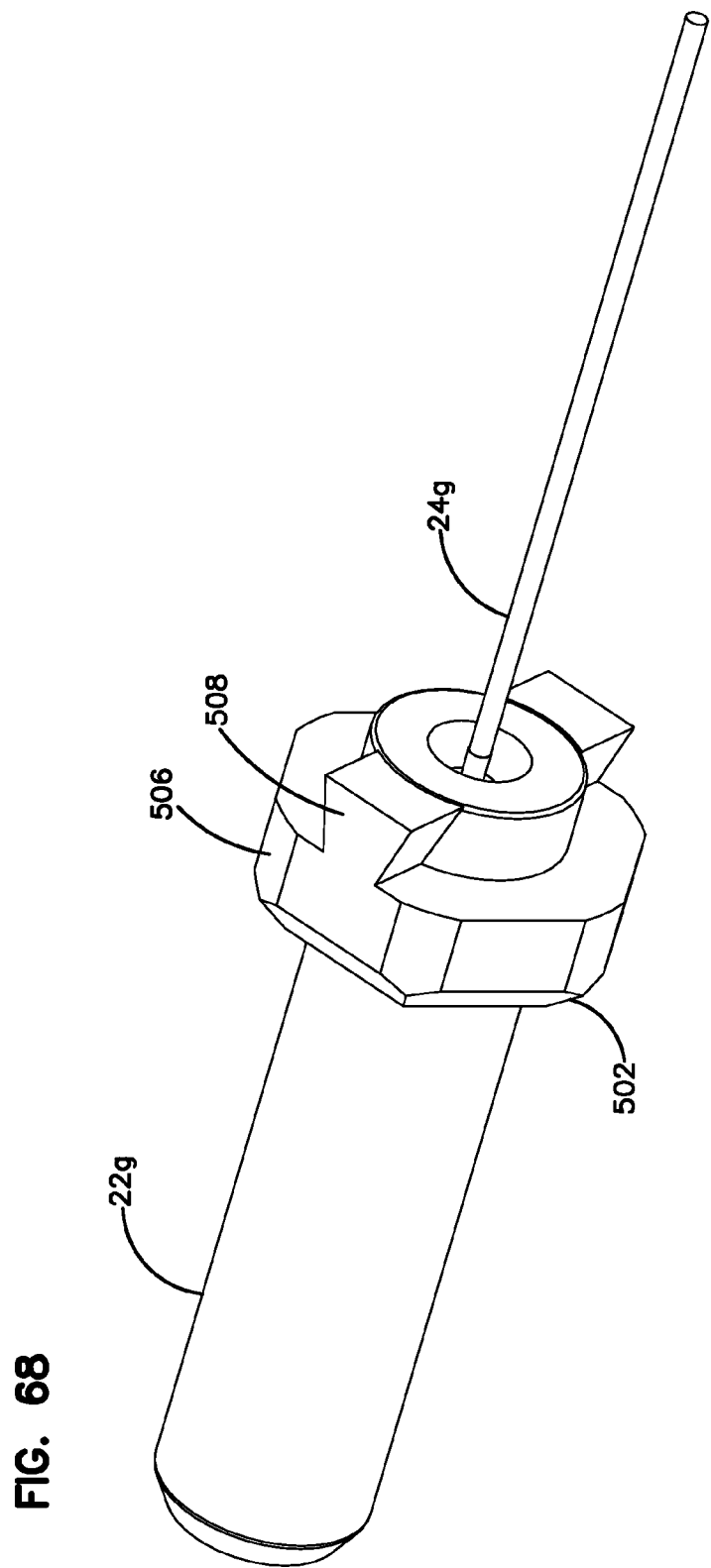
FIG. 68 is a pre-assembled depiction of a ferrule and flange according to the principles of the present invention.
Figure 71:
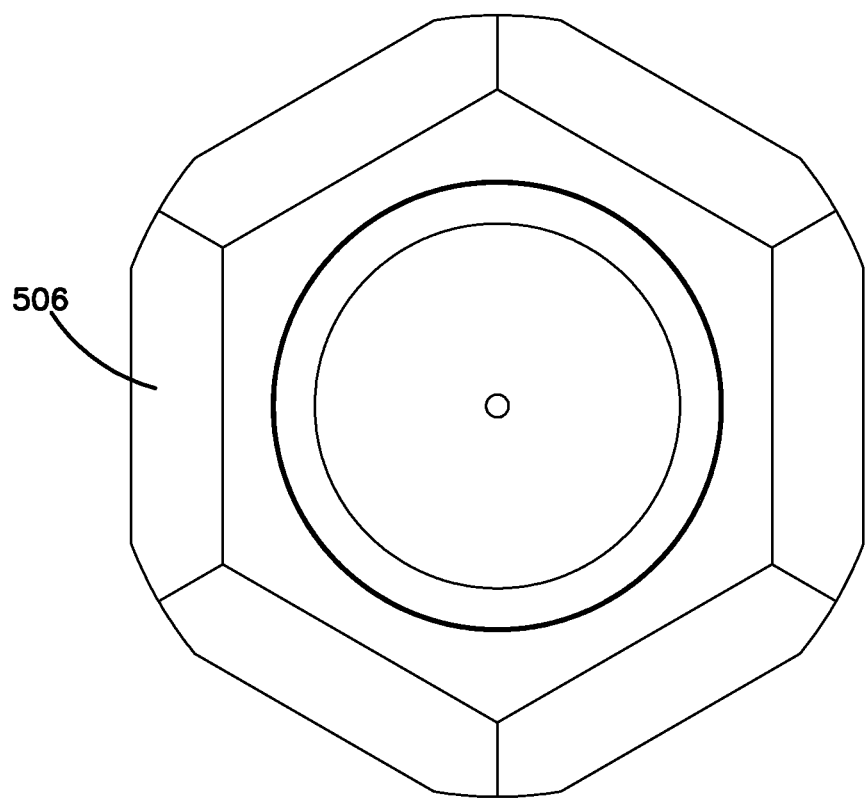
FIG. 71 is a top view of FIG. 68.
Figure 72:
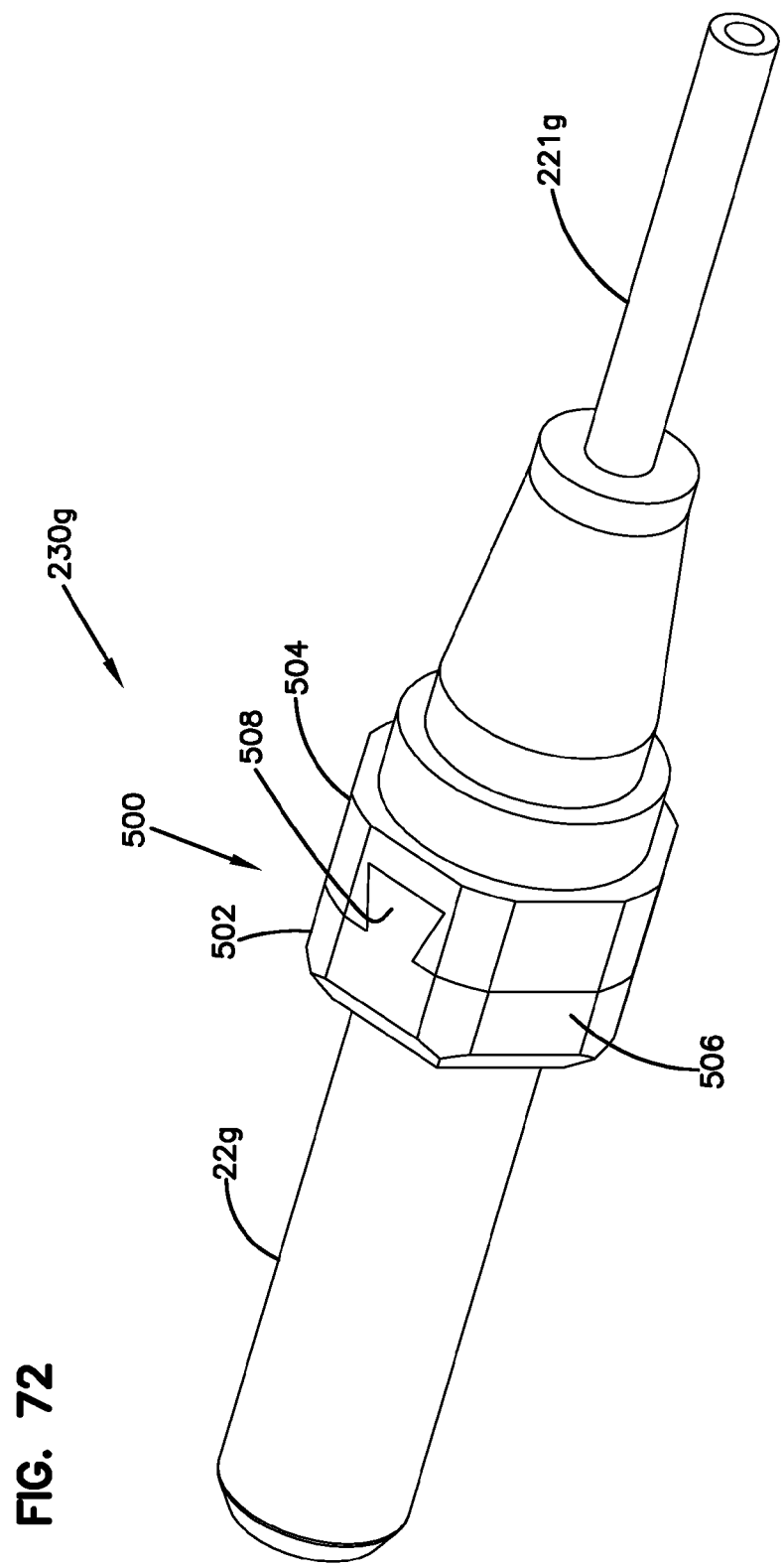
FIG. 72 is a perspective view of the ferrule assembly of FIGS. 63-65 spliced to the fiber optic cable and over molded with the hub.

After the front hub portion 502 has been molded over the ferrule 22g and the fibers 24g, 216g have been spliced together, as shown at FIG. 64, the rear hub portion 504 can be over molded within and over the front hub portion 502 to form a composite hub 230g that is coupled to the ferrule 22g and contains the splice location 218g. The rear hub portion 504 is overmolded to encapsulate the dove tail of the front hub portion 502 and the protective layer 232g. In the depicted embodiment, the rear hub portion 504 completely encapsulates the protective layer 232g and includes a rearward portion that closes around the buffer tube 221g. The front end of the front hub portion 502 is not covered by the rear hub portion 504. In this way, the forward end of the front hub portion 502 forms a front nose of the composite hub 230g. FIG. 67 shows an alternative embodiment of the rear hub portion 504. Referring to FIG. 68, the ferrule 22g is shown without the rear hub portion 504 and the buffer tube 221g removed. FIGS. 69-70 are side and cross-sectional views of FIG. 68. FIG. 71 is a top view of FIG. 69 and FIG. 72 is a perspective view of the alternative embodiment. FIGS. 73-74 are side and cross-sectional view of FIG. 72.

It will be appreciated that the composite hub 230g can be used in any of the fiber optic connectors in accordance with the principles of the present disclosure. Additionally, in certain embodiments, the rear hub portion 504 is formed of a hot melt adhesive that can be applied and cured at relatively low molding temperatures and pressures. Rear hub portion 504 can also be formed from a UV curable material (i.e., the materials cure when exposed to ultraviolet radiation/light), for example, UV curable acrylates, such as OPTOCAST™ 3761 manufactured by Electronic Materials, Inc. of Breckenridge, Colo.; ULTRA LIGHT-WELD® 3099 manufactured by Dymax Corporation of Torrington, Conn.; and 3M™ SCOTCH-WELD™ manufactured by 3M of St. Paul, Minn. The use of UV curable materials is advantageous in that curing can occur at room temperatures and at generally lower pressures (e.g. less than 30 kpsi, and generally between 20-30 kpsi). The availability of low pressure curing helps to ensure that the components, such as the optical fiber(s), being over molded are not damaged during the molding process. In certain embodiments, an injection molding process can be used to apply and form the rear hub portion 504 from a UV curable material about the protective layer 232g and the front hub portion 502. In certain embodiments, the rear hub portion 504 is made of a material having different material properties than the material of the front hub portion 502. For example, the rear hub portion 504 can be softer or more resilient than the front hub portion 502. The composite nature of the hub 230g simplifies the molding operation. The front hub portion 502 can be over molded using an over molding process having higher temperatures and pressures than the over molding process used to form the rear hub portion 504. The front hub portion can interlock with the ferrule 22g.

In some embodiments, the composite construction of the composite hub 230g relies on the front hub portion 502 to provide mechanical strength and precision and for securement of the composite hub 230g to the ferrule 22g (e.g., the front hub portion 502 is bonded to the ferrule 22g). In some embodiments, the composite construction of the composite hub 230g relies on the rear hub portion 504 for securement of the composite hub 230g to the buffer tube 221g and for providing additional protection with respect to the splice location 218g and the bare fiber segments 46g, 291g.

In one embodiment, the front hub portion 504 can be mounted (e.g., over molded) on the ferrule 22g prior to polishing, cleaning, cleaving, stripping, tuning, active alignment and splicing of the ferrule assembly. In this way, the front hub portion 504 can be used to facilitate handling and positioning of the ferrule 22g during the various processing steps. In one example, a flat of the front hub portion 504 can be marked for tuning purposes.

In one embodiment, the rear hub portion 504 can be overmolded to encapsulate the dove tail of the front hub portion 502 and the protective layer 232g in an injection mold assembly 700, as shown in FIGS. 75-81. As shown, mold assembly 700 includes an upper mold assembly 702 and a lower mold assembly 704. The upper mold assembly 702 includes an upper mold block 706 attached to and operated by the mold assembly 700 via an upper frame piece 708. Likewise, the lower mold assembly 704 includes a lower mold block 710 attached to and operated by the mold assembly 700 via a lower frame piece 712. The actuation of the frame pieces 708, 712 may be manual or automatic.

In one embodiment, the upper and lower mold blocks 706, 710 are formed from a UV light transmissive material, such as Dupont™ TEFLON® FEP 100 Fluoropolymer Resin. This material has been found to have sufficient UV light transmission characteristics above 300 nm wavelengths at thicknesses corresponding to those used for mold blocks 706, 710 (e.g. about 50-75% transmissivity for material thicknesses between 1-2 millimeters at UV wavelengths of 365 nm at an initial intensity of about 1.7-2.0 watts/square centimeter). Also, TEFLON® has beneficial properties that allow for the mold blocks 706, 710 to be molded with complex mold cavity shapes while also being resistant to adhesion to the cured material in the mold cavities. This material also allows for the mold blocks 706, 710 to have mating surfaces that are sufficiently formed to avoid undesirable flashing on the molded part.

The upper mold block 706 and the lower mold block 710 may have a plurality of cooperating cavity portions 714, 716 for forming the rear hub portion 504. As can be most easily seen at FIGS. 80-81, the upper mold block 706 has an upper cavity portion 714 that cooperates with a lower cavity portion 716 on the lower mold block 710. As shown, the upper cavity portion 714 includes a mold cavity portion 714a, a ferrule securing portion 714b, and a buffer tube pocket portion 714c while lower cavity portion 716 includes a mold cavity portion 716a, a ferrule securing portion 716b, and a buffer tube pocket portion 716c. When the upper and lower mold blocks 706, 710 are pressed against each other via operation of the frame pieces 708, 712, the upper and lower cavity portions 714, 716 form a mold cavity with portions 714a, 716a, and secure the ferrule 22g with portions 714b, 716b. The buffer tube pockets 714c, 716c create a passageway for buffer tube 221g during the molding process.

It is noted that mold blocks 706, 710 may include upper and lower vacuum channels 724, 726, connected to a vacuum source (not shown), for securing the ferrules 22g against portions 714b, 716b to prevent unwanted movement during the molding process. As shown, channels 724, 726 extend along the mold blocks 706, 710 to each of the cavity portions 714b, 716b. It is further noted that the contours of the mold cavity portions 714a, 716a match the shape of the full formed rear hub portion 504 shown in FIGS. 67 and 72-74. In the embodiment shown at FIGS. 75-79, there are twelve pairs of cooperating mold cavity portions 714, 716 such that twelve rear hub portions 504 may be formed simultaneously by the mold assembly 700.

As shown, the mold assembly 700 further includes a series of injection needles 718. In one embodiment, there is one injection needle 718 for each mold cavity. However, more than one injection needle may be provided for each mold cavity. The injection needles 718 are for injecting uncured material for the rear hub portion 504 into the mold cavities formed once the mold blocks 706, 710 have been pressed against each other. In one embodiment, the lower mold block 710 includes passageways 752 which provide a fluid communication path between the injection needles 718 and the corresponding mold cavities. It is noted that the injection needles 718 may be made from a material that is non-transmissive to UV light, such as a metal, in order to prevent unwanted or premature curing within the injection needle 718.

Figure 78:
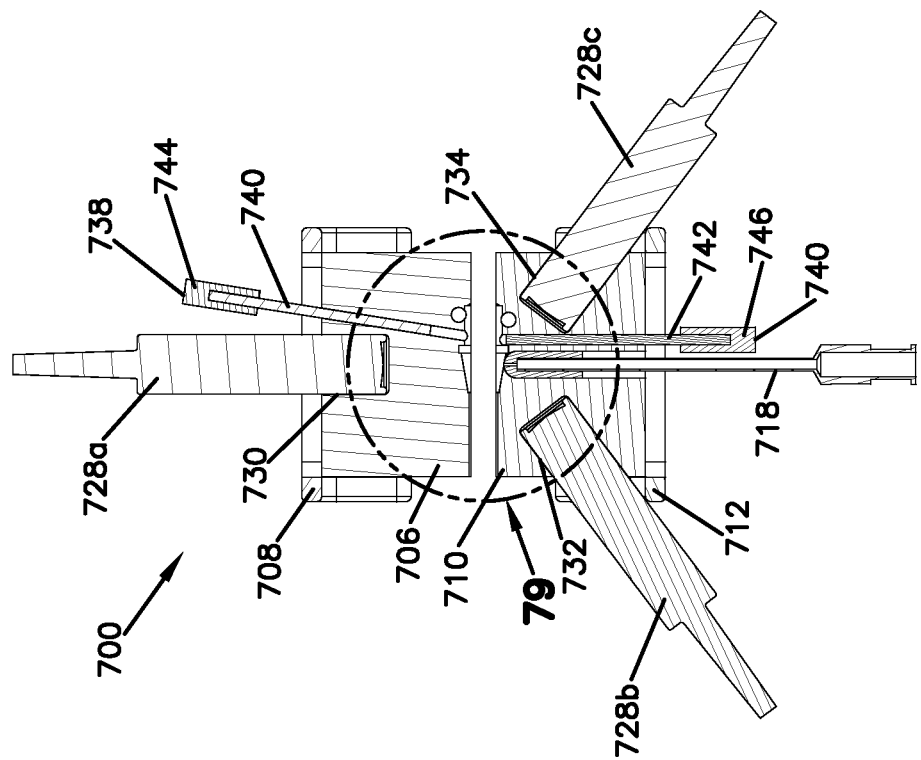
FIG. 78 is a cross-sectional view of the mold assembly shown in FIG. 75.
Figure 79:
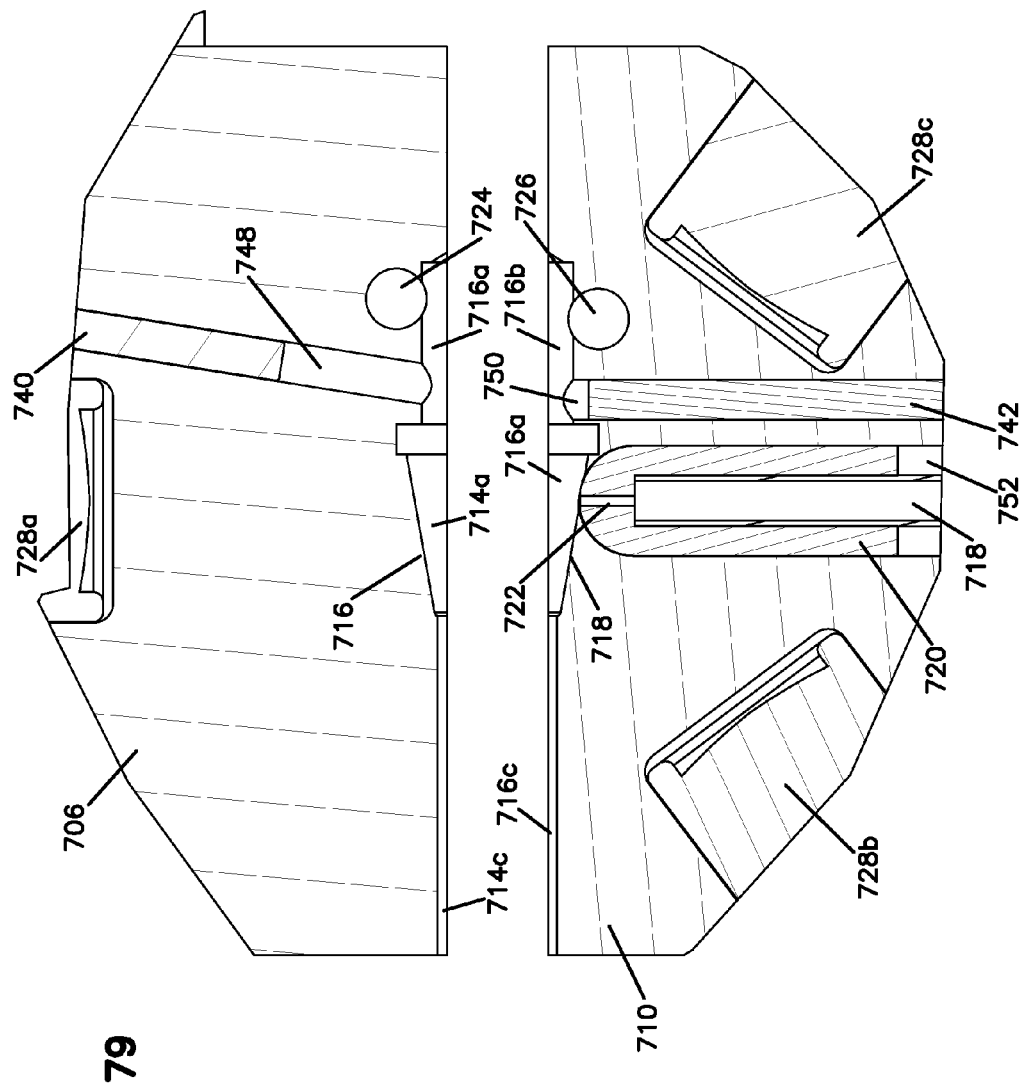
FIG. 79 is an enlarged cross-sectional view from a portion of the mold assembly view depicted in FIG. 78.
Figure 80:
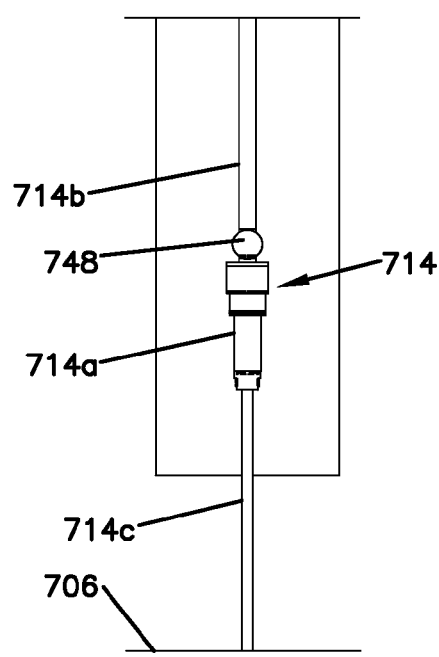
FIG. 80 is a top view of a cavity portion of an upper part of the mold assembly shown in FIG. 75.
Figure 81:
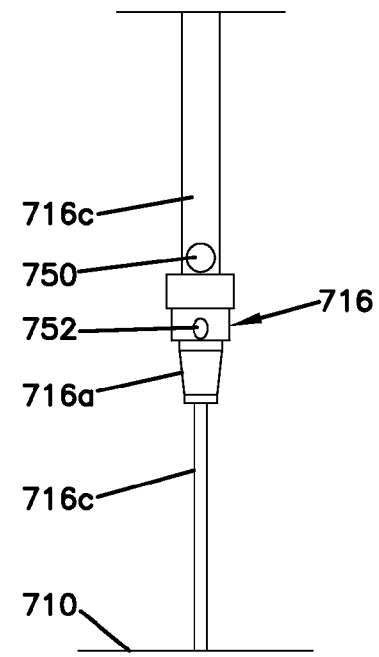
FIG. 81 is a top view of a cavity portion of a lower part of the mold assembly shown in FIG. 75.

Referring to FIGS. 78-79, a valve 720 having a passageway 722 is provided within the passageway 752 of the lower mold block 710. In one embodiment, the valve 720 is made from a material that is non-transmissive to UV light, such as opaque silicone or EPDM rubber. Such a material will help to prevent uncured material within the valve 720 and/or injection needle 718 from being undesirably cured during the molding process. In one embodiment, the valve 720 is configured as a one-way valve such that uncured material may flow into the mold cavity through passageway 722, but may not flow from the mold cavity back into the injection needle 718.

In one embodiment, valve 720 is made from a flexible polymeric material and is configured such that passageway 722 opens when a threshold pressure exerted by the uncured material within injection needle 718 is exceeded, and closes when pressure is sufficiently reduced. In one embodiment, valve 720 is a slit-type valve. It is noted that FIGS. 78-79 show the valve 720 in an open position with the passageway 722 being shown with an exaggerated size for the purpose of clarity. The combined features of valve 720 also result in a molded rear hub portion 504 that is free from legs or runners that would normally need to be removed from a molded product after the molding process.

Additionally, each injection needle 718 may be configured to be inserted through its respective valve 720 and into the cavity area 716a, 714a when injecting molding material into the cavities. In such a configuration, the injection needles 718 may be retracted out of the mold cavities after the cavities are sufficiently filled and before the curing process begins. It is also noted that mold assembly 700 may also be configured to draw a slight vacuum on the uncured material within the injection needles 718 after filling the mold cavity to help ensure that uncured material is removed further away from the area of UV light exposure.

Figure 75:
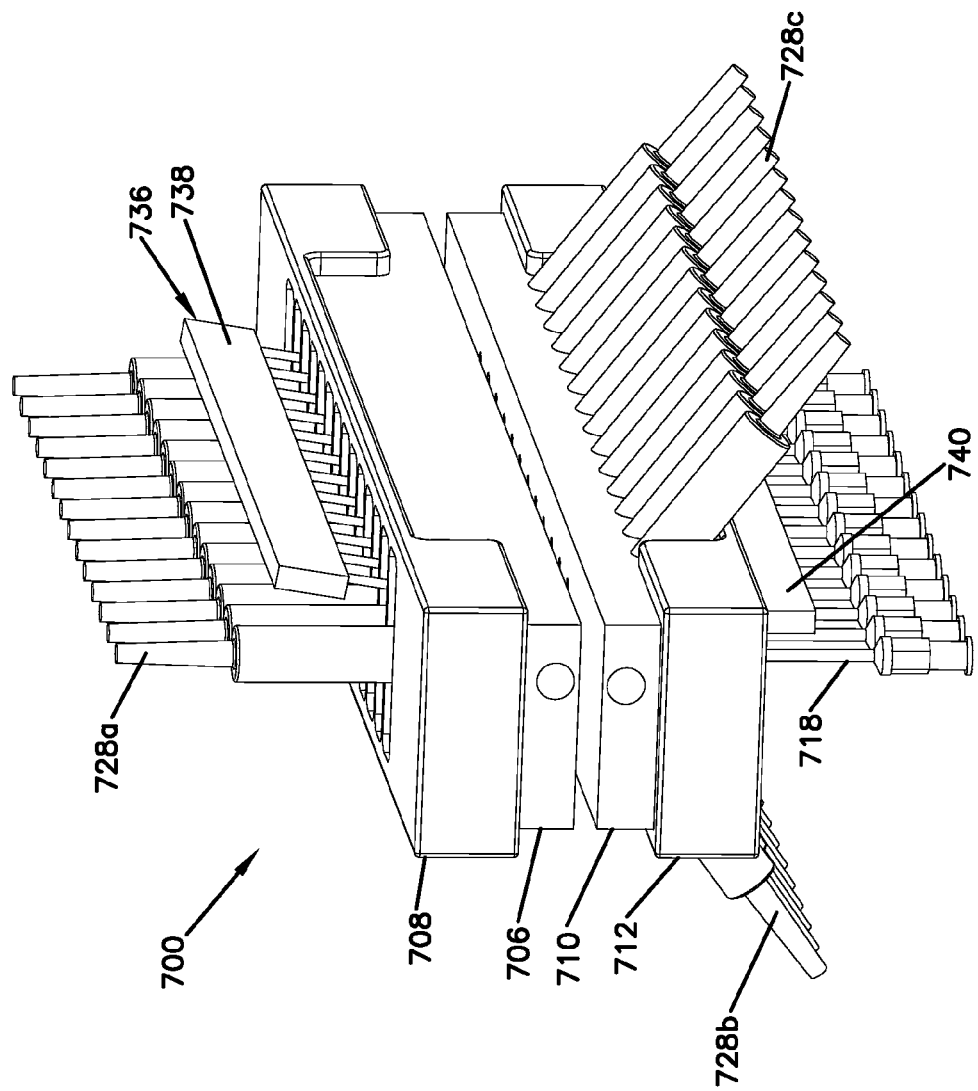
FIG. 75 is a front perspective view of an embodiment of a mold assembly according to the principles of the present disclosure.
Figure 76:
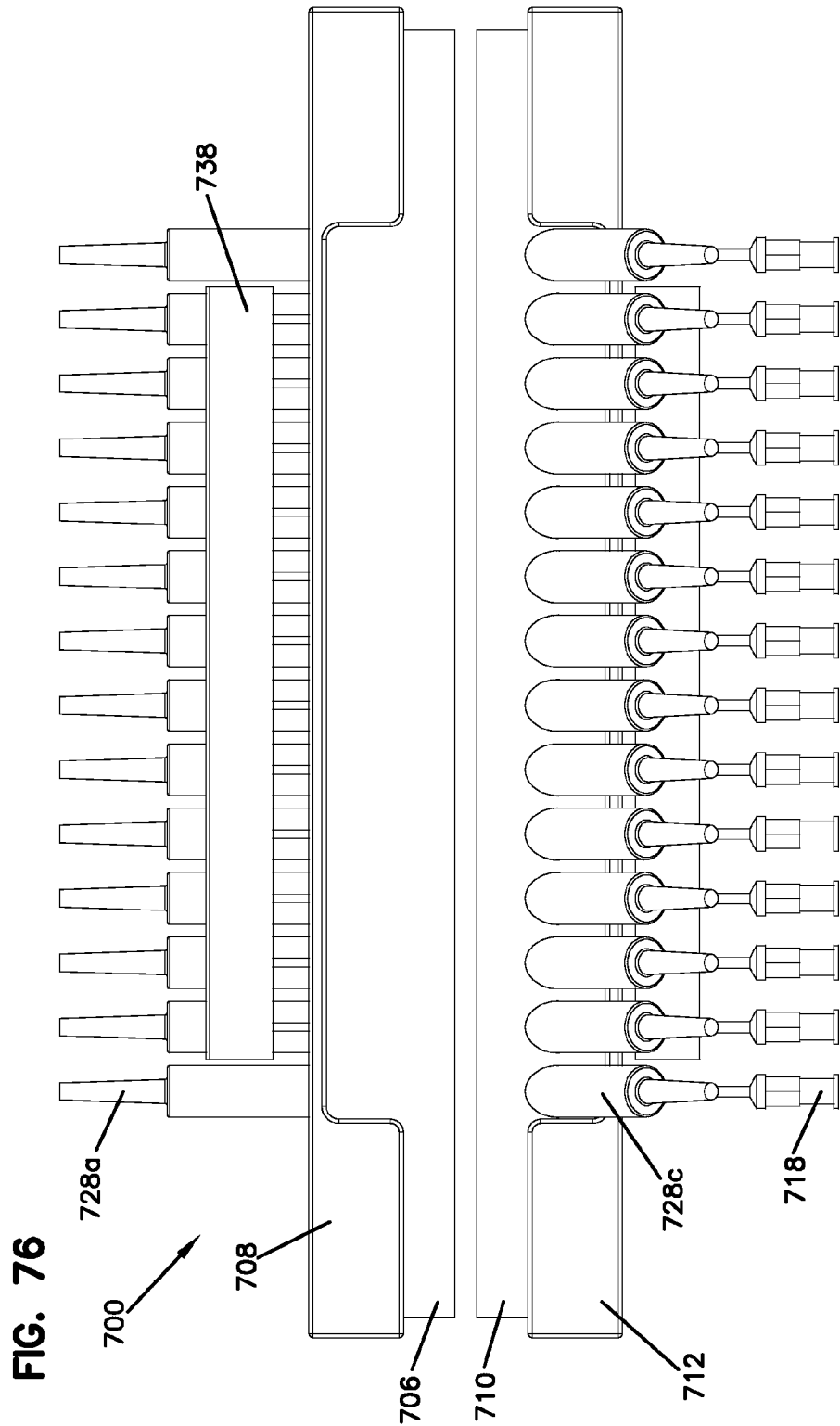
FIG. 76 is a side view of the mold assembly shown in FIG. 75
Figure 77:
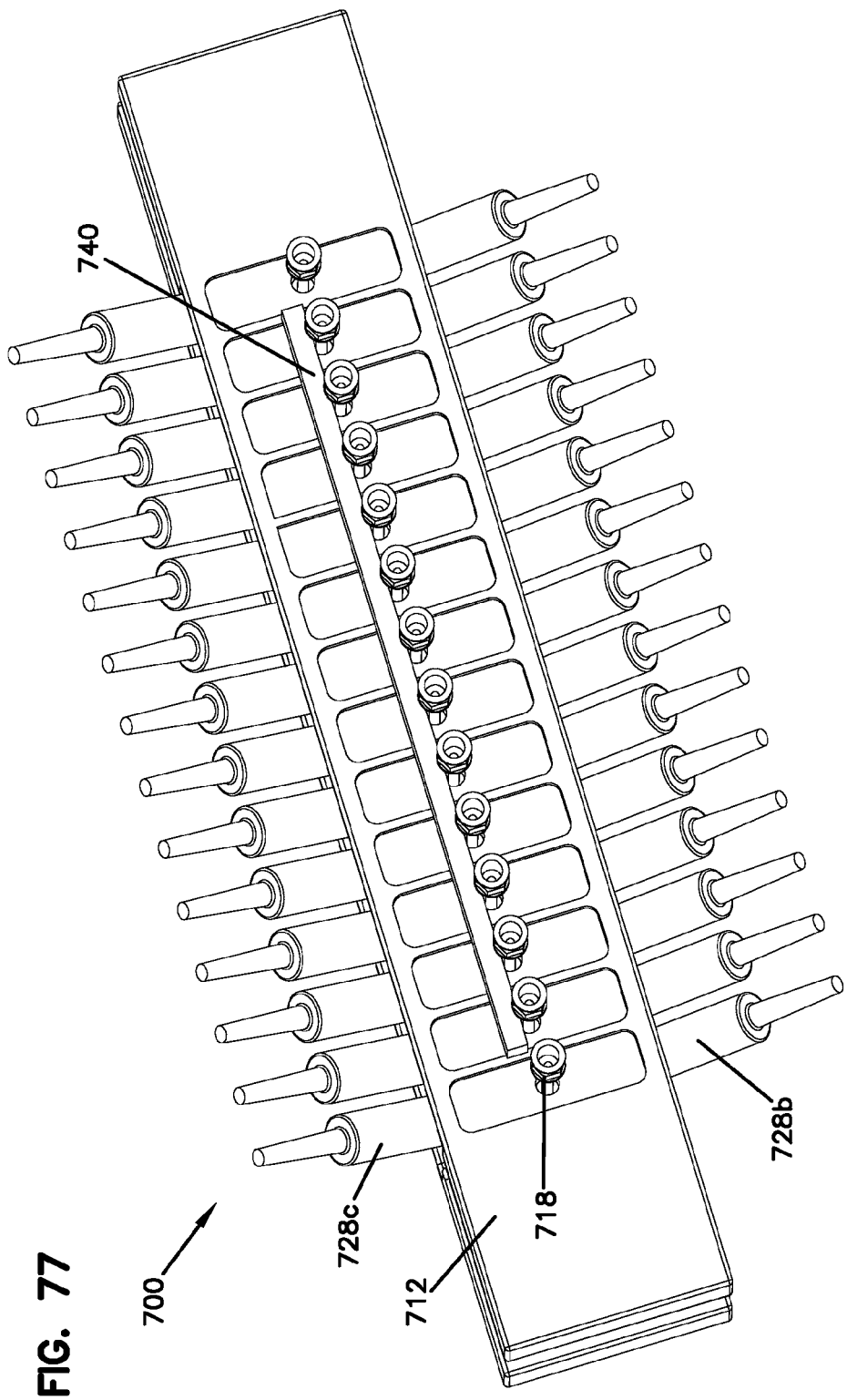
FIG. 77 is a bottom perspective view of the mold assembly shown in FIG. 75.

As shown, the mold assembly 700 further includes a plurality of UV light fixtures 728 (728a, 728b, 728c). The UV light fixtures 728 are for directing UV light towards the mold cavity portions 714b, 716b such that UV sensitive material within the cavities can be cured during the molding process. In the embodiment shown, three UV lights are arranged to direct UV light onto each mold cavity from various angles. It is noted that more or fewer UV lights could be used. In the embodiment shown, the UV light fixtures 728 include LED bulbs that emit 365 nanometer (nm) ultraviolet light at 3 watts per square centimeter. It is noted that other wavelengths and intensities may be used, and that the chosen wavelength and intensity of the lights is generally a function of the selected materials used for the mold blocks and the rear hub portion 504. Referring to FIG. 75, a total of 14 sets of UV light fixtures 728a, 728b, 728c are provided for the twelve mold cavities. While 12 sets directly expose light on a particular mold cavity, an additional set of UV light fixtures is provided at each end of the mold blocks 706, 708 to ensure that the outermost mold cavities are exposed to the same level of UV light as the inner mold cavities.

As most easily seen at FIG. 78, the upper mold block 708 has a plurality of cavities 730 for receiving UV lights 728a. The UV lights 728a are oriented to direct light downward onto the upper cavity portion 714b. The lower mold block 710 has recesses 732 and 734 for receiving UV lights 728b and 728c, respectively. The recesses 732 and 734 are disposed angles due to the presence of the injection needles 718, valves 720, and the ejector pins (discussed later). It is noted that since the valves 720 and injection needles 718 may not UV light transmissive, that UV lights 728b and 728c must be oriented to ensure the mold cavity is sufficiently exposed to UV light around these components. As mentioned above, because the mold blocks 706, 710 are UV light transmissive, the UV lights are able to cure the molded material within the mold cavities while the mold blocks 706, 710 are closed together.

Once the mold material has been sufficiently cured to form the rear hub portions 504, the vacuum that secures the ferrules may be discontinued and the mold blocks 706, 710 may be separated. In order to facilitate removal of the composite hub 230g from the mold blocks 706, 710, the mold assembly 700 may be provided with an ejector assembly 736. In one embodiment, the ejector assembly 736 includes an upper ejector assembly 738 located in the upper mold assembly 702 and a lower ejector assembly 740 in the lower mold assembly 704. As shown, each of the ejector assemblies 738, 740 includes a plurality of ejector pins 740, 742 connected to a common support rail 744, 746. The number of ejector pins 738 corresponds to the number of mold cavities. Accordingly, the upper mold block has a passageway 748 for the ejector pins 740 while the lower mold block has a passageway 750 for the ejector pins 742. To remove the hub 230g from the mold blocks 706, 710, the ejector pins 740, 742 are driven into the passageways 748, 742 until they contact and dislodge the ferrule portion 22g located within cavity portions 714b, 716b. The support rails 744, 746 that drive the pins 740, 742 may be either manually or automatically actuated. It is noted that the ejector pins 740, 742 may be manufactured from a UV light transmissive material so as to minimize interference with the curing process. Examples of UV light transmissive materials for the ejector pins 740, 742 are transparent glass and polycarbonate. It is also noted that the ejector pins can be removed or partially retracted away from the cavities in the mold blocks 706, 710 during the curing process to reduce interference with UV light transmission.

Figure 82:
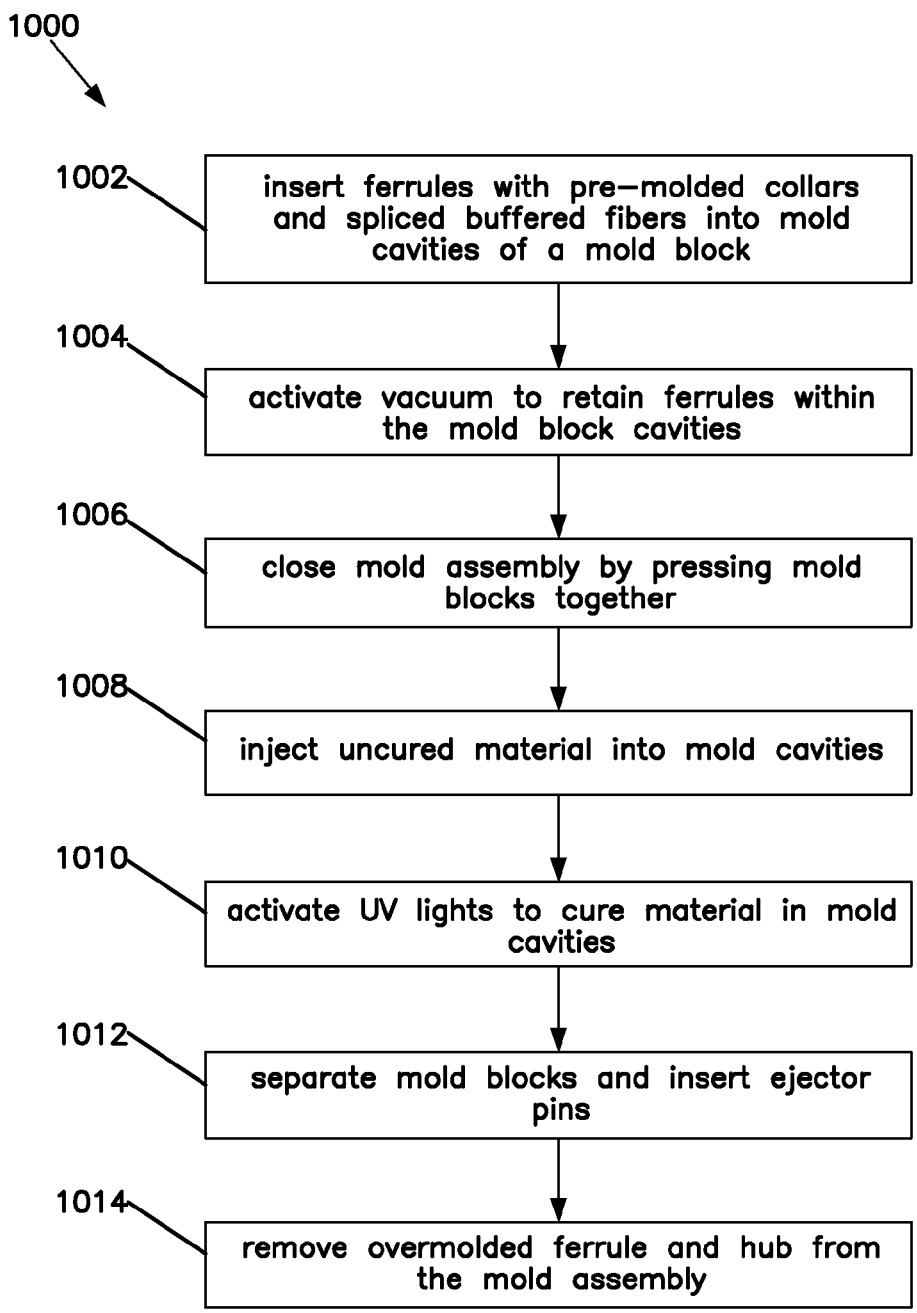
FIG. 82 is a flow chart of an injection molding process usable with the mold assembly shown in FIG. 75.

Referring to FIG. 82, an injection molding process 1000 is shown in which mold assembly 700 may be used to form an overmolded ferrule and composite hub. In a first step 1002, ferrules with pre-molded collars, which may be spliced to buffered fibers of cable assemblies, are positioned over the cavities in the mold assembly. In a second step 1004, a vacuum is turned on to hold the ferrules and prevent unwanted movement in either axial or rotational modes. It is noted that the vacuum may be active before the ferrules with pre-molded collars are positioned over the cavities. In a third step 1006, once all of the desired cavities in the mold are filled, the mold blocks of the mold assembly are closed together. In another step 1008, EFD or similar dispensing units are used to deliver UV material into the mold cavities under low pressure through the injection needles and associated valves. The amount of material injected may be calculated or empirically determined using trials to optimize the fill volume without causing unwanted flash or other protrusions. In another step 1010, the UV lights are activated and turned on at an intensity and duration optimized to fully cure the materials with a minimum cycle time. In one embodiment, the cycle time is about 10 seconds when using a 365 nm UV light at 3 watts per square centimeter. In one embodiment, the intensity of the UV light is initially low, for example for the first 5 seconds of a 10 second cycle, and is then raised to a higher value. Such an approach is beneficial where the material to be cured may be sensitive to volatilization if exposed to the higher intensity value initially. In another step 1012, the mold blocks are separated. Ejector pins may be also be used during separation at the location of the ferrule to dislodge the overmolded ferrule and hub. In another step 1014, the overmolded ferrule and hub is withdrawn from the mold assembly. It is noted that other injection molding applications may be used with the above described mold assembly and process, and that the disclosure is not limited to injection molding parts and components relating to optical fiber technology.

FIGS. 83 and 84 show another ferrule assembly 20h and hub 230h in accordance with the principles of the present disclosure. The ferrule assembly 20h includes a ferrule 22h supporting an optical fiber stub 24h. The optical fiber stub 24h is fusion spliced to an optical fiber 216h of a fiber optic cable 212h at a splice location 218h. The hub 230h mounts to the rear end of the ferrule 22h and covers the splice location 218h. The hub 230h includes a front hub portion 502h and a rear hub portion 504h. The rear hub portion 504h includes an outer hub shell 900 defining an interior cavity 902. The outer hub shell 900 includes an axial/longitudinal slot 904 that allows the outer hub shell 900 to be inserted laterally over the optical fiber stub 24h and the optical fiber 216h at the splice location 218h after the optical fiber stub 24h has been spliced to the optical fiber 216h. The outer hub shell 900 also includes a port 906 for allowing the outer hub shell 900 to be filled with an over mold material (e.g., a UV curable material, a hot melt material, a thermoplastic material, an epoxy material, a thermoset material, or other materials). The over mold material 908 is not shown at FIGS. 83 and 84, but is depicted at FIG. 93. The outer hub shell 900 can function as a mold for shaping the over mold material 908 around the splice location 218h and along the lengths of the optical fiber 216h and the optical fiber stub 24h. A temporary mold piece can be used to cover the axial slot 904 as the over mold material 908 is injected into the outer hub shell 900 through the port 906. The outer hub shell 900 remains a permanent part of the hub 230h after the over mold material 908 has been injected therein.

Figure 85:
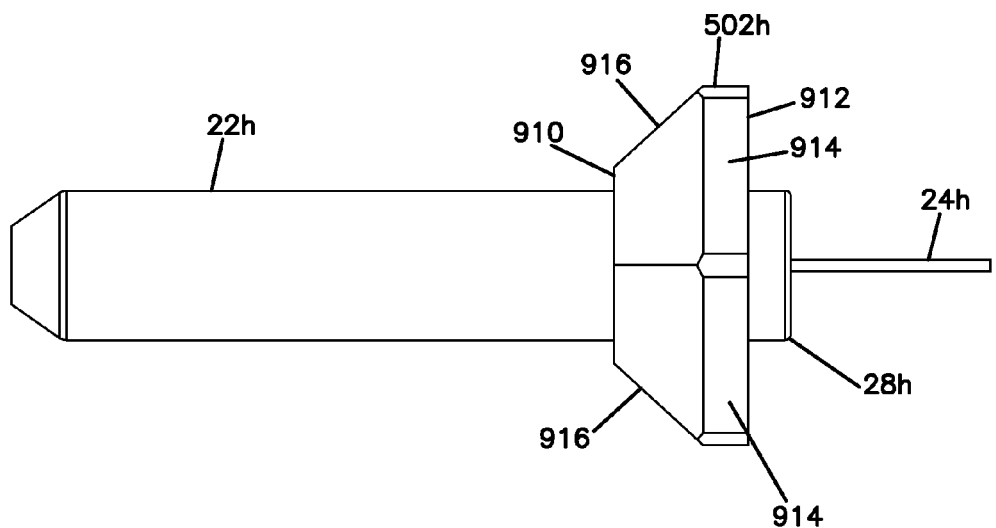
FIG. 85 is a side view of the ferrule assembly of FIG. 83 with a front hub portion over molded over the ferrule.
Figure 86:
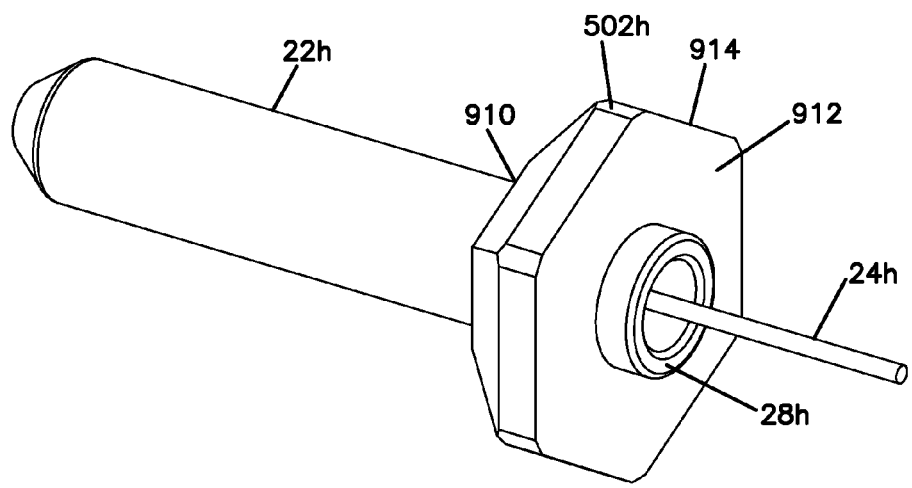
FIG. 86 is a rear, perspective view of the ferrule assembly and front hub portion of FIG. 85.

The front hub portion 502h can be over molded on the ferrule 22h or otherwise mounted on the ferrule 22h. Portions of the front hub portion 502h can interlock with corresponding slots or other openings in the side of the ferrule 22h to limit axial movement of the front hub portion 502h relative to the ferrule 22h. As shown at FIGS. 85 and 86, the front hub portion 502h includes a front end 910 and a rear end 912. The rear end 912 is forwardly offset from a rear end 28h of the hub 230h. In this way, the rear end 28h of the hub 230h projects rearwardly from the rear end 912 of the front hub portion 502h. In certain examples, the front hub portion 502h is made of a harder, more rugged material than the over mold material 908. In certain examples, the front hub portion 502h can be over molded on the ferrule 22h using a higher temperature and/or higher pressure molding process as compared to the molding process used to install the over mold material 908 in the outer hub shell 900. Still referring to FIGS. 85 and 86, the front hub portion 502h can include a series of flats 914 used for indexing or otherwise rotationally positioning the ferrule assembly 20h in a connector such as the LC connector 990 of FIGS. 92 and 93. The front hub portion 502h can also include front chamfered sections 916 for seating the hub 230h within the connector 990.

The front hub portion 502h can be over molded on the ferrule 22h prior to stripping, cleaning, cleaving, active alignment, and splicing operations. In this way, the front hub portion 502h can be used to facilitate handling of the ferrule assembly 20h during the various operations described above. During active alignment of the optical fiber stub 24h and the optical fiber 216h, the front end 910 of the front hub portion 502h can abut against a stop, side wall or other structure of the ferrule holder (e.g., see ferrule holder 240 of FIG. 19) to ensure the ferrule 22h is positioned at a precise axial position relative to the ferrule holder. Thus, the front hub portion 502h can be used as a positive stop for controlling axial positioning of the ferrule 22h during the various operations described above.

In certain embodiments, the outer hub shell 900 abuts against the rear end of the front hub portion 502h. As shown at FIG. 93, the outer hub shell 900 can include open regions 918 (internal cavities, internal slots, internal recesses, etc.) that axially overlap the rear end 28h of the ferrule 22h for allowing the over mold material 908 to fill this region and axially overlap the rear end 28h of the ferrule 22h. In certain examples, this type of configuration can provide better securement of the ferrule 22h. In certain examples, the outer hub shell 900 is a molded polymeric part such as an injection molded part. The outer hub shell 900 can be made of a material that is harder and more durable/robust than the over mold material 908 so as to reinforce the rear hub portion 504h and to protect and contain the over mold material 908. In the case where the over mold material 908 is UV curable, the outer hub shell 900 can be manufactured of a material that is transmissive with respect to UV light such that the over mold material 908 can be cured by transmitting UV light/radiation through the outer hub shell 900.

Figure 87:
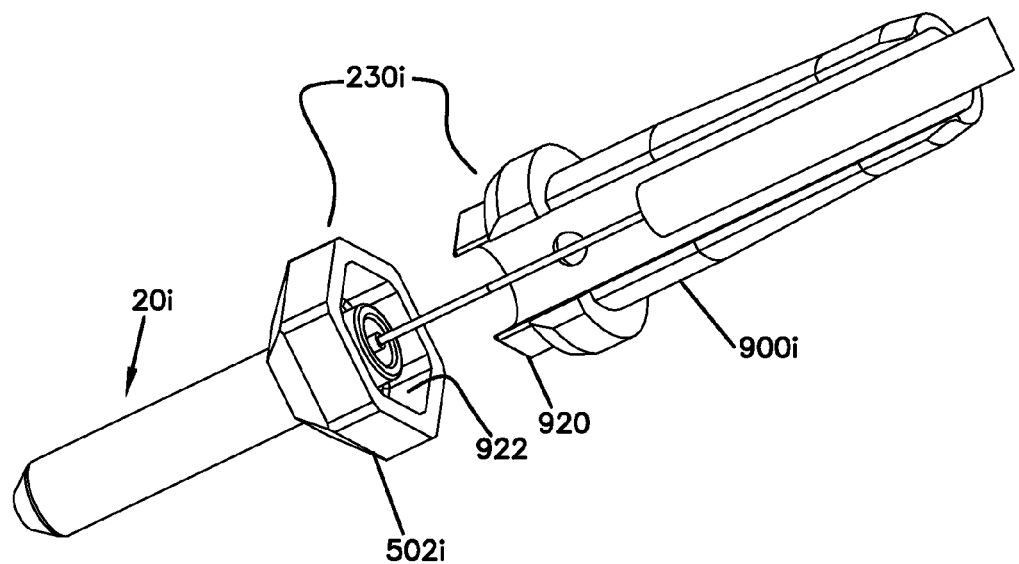
FIG. 87 is an exploded view of a further ferrule and hub assembly in accordance with the principles of the present disclosure.
Figure 88:
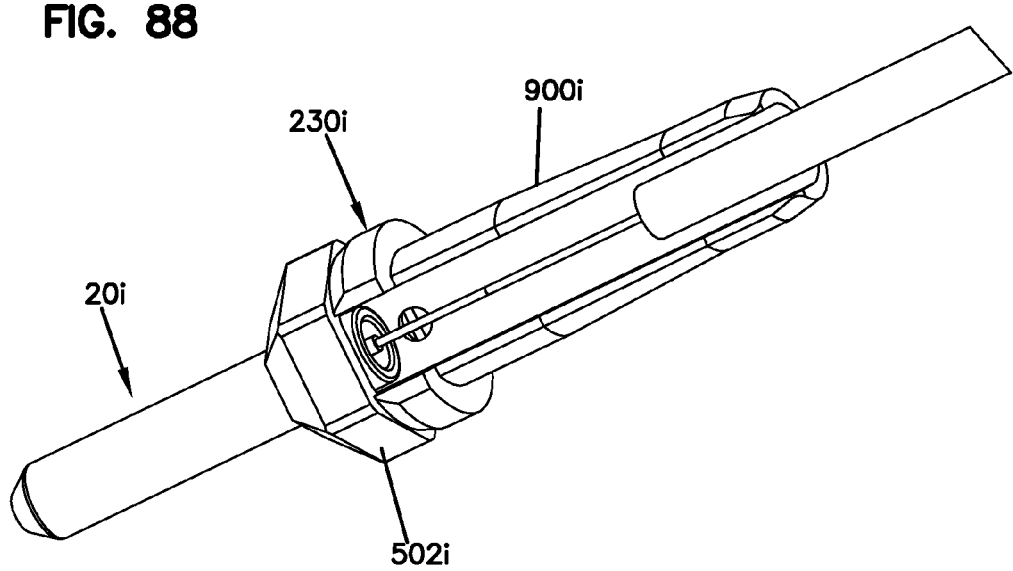
FIG. 88 shows the ferrule and hub assembly of FIG. 87 in a partially assembled configuration.
Figure 89:
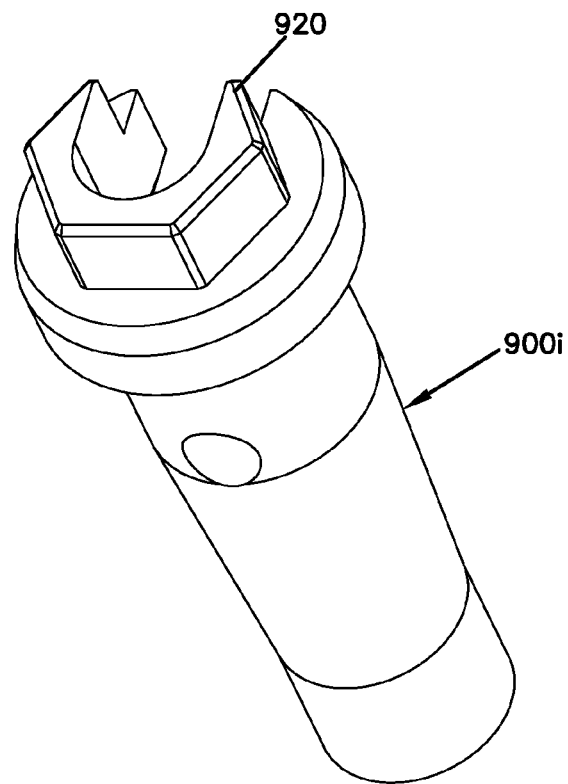
FIG. 89 is a perspective view of a shell of the ferrule and hub assembly of FIGS. 87 and 88.

FIGS. 87 and 88 show another ferrule assembly 20i and hub 230i in accordance with the principles of the present disclosure. The ferrule assembly 20i and hub 230i can have the same construction as the ferrule assembly 20h and hub 230h except the hub 230i includes an outer hub shell 900i having a male end 920 that fits within a female receptacle 922 defined at a back side of a front hub portion 502i. The male end 920 and the female receptacle 922 can have complementary shapes. As depicted, the male end 920 and the female receptacle 922 each include a series of flats that prevent relative rotation between the outer hub shell 900i and the front hub portion 502i. The male end 920 of the outer hub shell 900i is best shown at FIG. 89.

Figure 90:
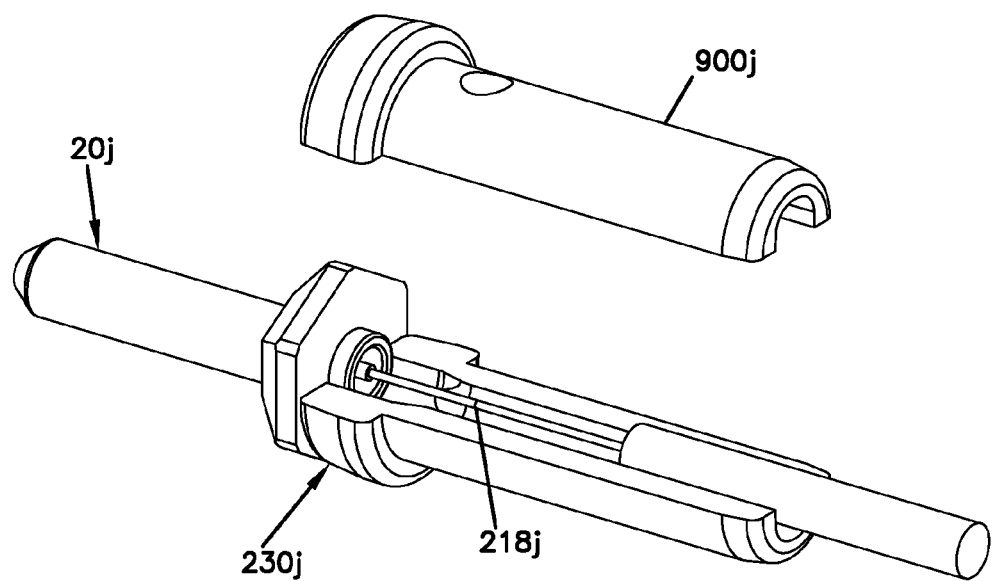
FIG. 90 is an exploded view of still another ferrule and hub assembly in accordance with the principles of the present disclosure.

FIG. 90 shows a further ferrule assembly 20j and hub 230j in accordance with the principles of the present disclosure. The ferrule assembly 20j and the hub 230j have the same basic configuration as the ferrule assembly 20h and hub 230h except the hub 230j includes an outer hub shell 900j having a two-piece construction. The two pieces of the outer hub shell 900j mate together with a splice location 218j captured thereinbetween to form the outer hub shell 900j.

Figure 91:
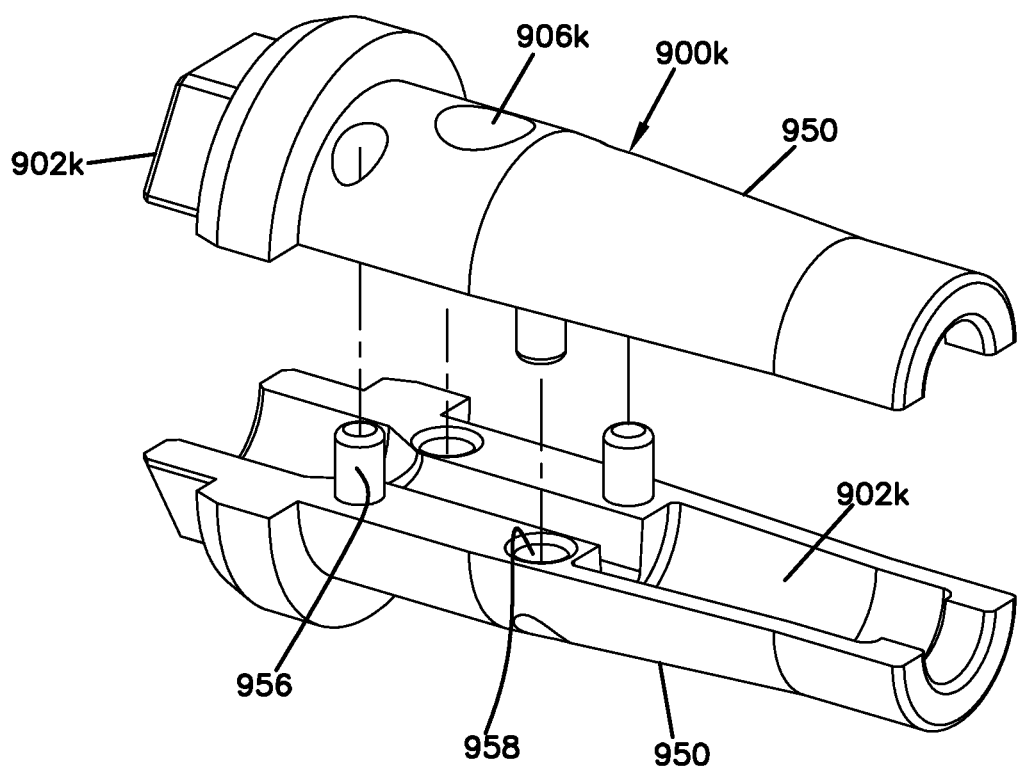
FIG. 91 shows an alternative hub shell that can be used with the ferrule and front hub portion of the embodiment of FIGS. 87 and 88.

FIG. 91 shows an alternative outer hub shell 900k that can be used with the ferrule assembly 20i and front hub portion 502i of FIGS. 87 and 88. The outer hub shell 900k includes two intermating half-pieces 950 that cooperate to define an internal chamber/cavity 902k for receiving overmold material. A port 906k for filling the chamber/cavity 902k with overmold material is defined by at least one of the half-pieces 950. The half-pieces 950 cooperate to define a male end 920k at the front end of the outer hub shell 900k. Alignment features such as posts 956 and corresponding openings 958 ensure proper alignment between the half-pieces 950 of the outer hub shell 900k during assembly.

Figure 92:
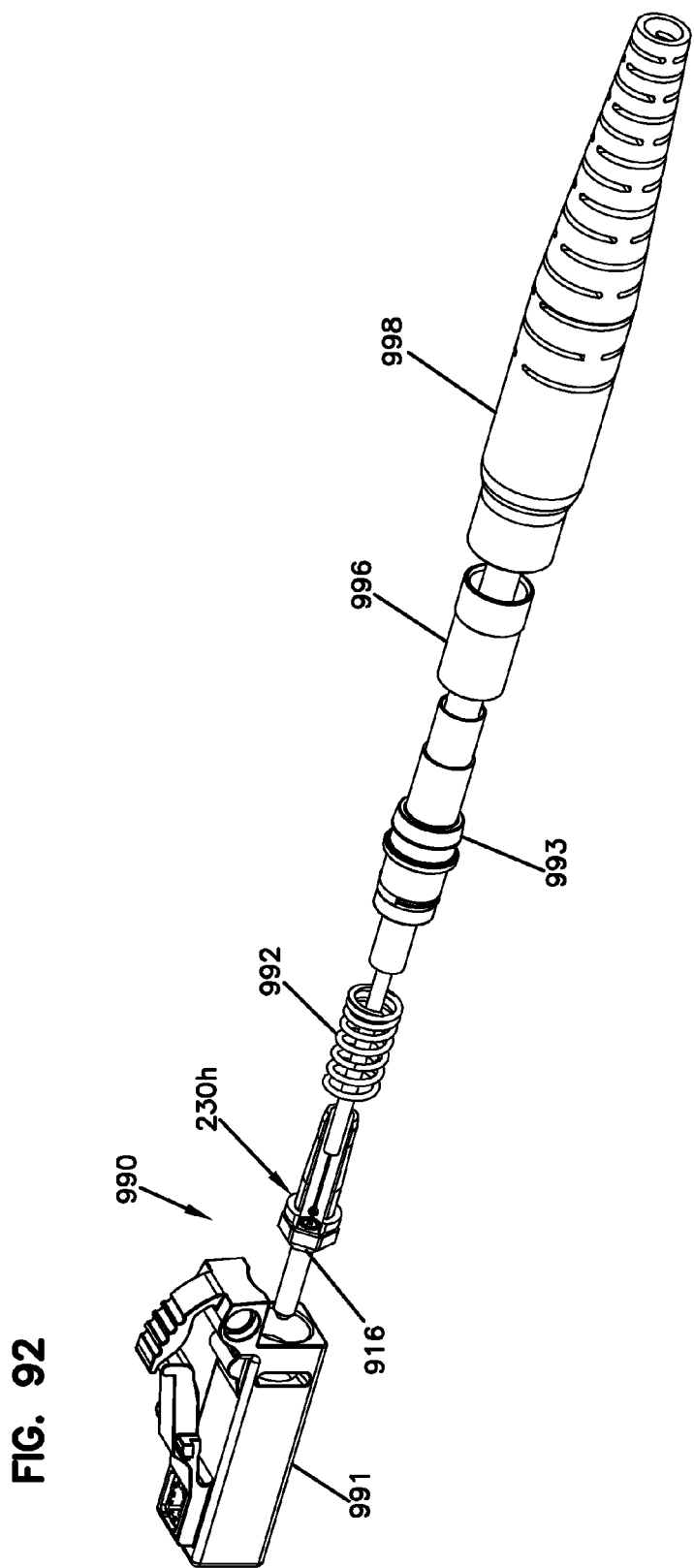
FIG. 92 is an exploded view illustrating an LC-style connector incorporating the ferrule and hub assembly of FIGS. 83 and 84.

FIGS. 92 and 93 show the connector 990 that includes the ferrule assembly 20h and the hub 230h. The connector 990 includes a main connector body 991 having a standard LC-style form factor and mechanical latching arrangement. The connector 990 also includes a spring 992 for biasing the ferrule assembly 20h and the hub 230h in a forward direction such that the chamfered section 916 of the hub 230h seats within the main connector body 991. The connector 990 further includes a rear housing 993 that retains the spring within the main connector body 991. The connector 990 further includes a crimp 996 for securing cable strength members to the rear housing 993, and a boot 998 for providing strain relief and fiber bend radius control at the cable-to-connector interface.

While it is preferred for both the ferrule assembly manufacturing process and the fiber optic cable and connector manufacturing process to be fully automated, it will be appreciated that certain steps of either of the processes can be performed manually. Additionally, while it is preferred for the splicing technology and processing disclosed herein to be used in a factory setting, such technology and processing can also be used away from the factory in the field for field splicing applications (e.g., at a customer location). In other words, the fusion splice, splice protection, over molding, strength member fixation and assembly of the connector part or parts can be performed outside a factory, for example, at a customer site. Also, while the processing was described with respect to patch cords, it will be appreciated that the same processing technology can be used to attach a connector to any type of fiber optic cable of cord. Moreover, while SC connectors are shown, it will be appreciated that the technology is applicable to any type of fiber optic connector.

Another aspect of the present disclosure relates to a method for mass producing and distributing fiber optic connector assemblies. A significant aspect of the method relates to the centralized manufacturing of large quantities of ferrule assemblies each having a ferrule supporting a stub fiber. In certain examples, the volume of ferrule assemblies manufactured at a given centralized manufacturing location can exceed a volume of 500,000; 1,000,000; 2,000,000; or 3,000,000 ferrule assemblies. By manufacturing such large volumes of ferrule assemblies at one centralized location, the ferrule assemblies can be made efficiently and considerable capital investment can be made in premium quality manufacturing equipment and processes. For example, the ferrule assemblies can be manufactured in a factory location using the highly precise polishing technology and equipment. Moreover, high quality and precisely toleranced ferrules and stub fibers can be effectively matched to provide the ferrule assemblies extremely high levels of optical performance. The large volumes of ferrule assemblies manufactured at a given centralized location provide the manufacturing efficiency for making this type of operation feasible. Examples of such high quality manufacturing operations and equipment are disclosed throughout the present disclosure. The centralized manufacturing also enables substantial investment in automation.

The method also relates to distributing ferrule assemblies manufactured at a centralized location to regional factories/mass production locations located closer to the intended point of sales. The relative small size of ferrule assemblies allows large volumes of such ferrule assemblies to be effectively shipped at relatively low costs. High costs associated with extensive shipment of cable can be significantly reduced. At the regional locations, connectorized fiber optic cable assemblies can be effectively and efficiently mass produced in a factory environment by splicing the ferrule assemblies to cables as described herein. The high level of precision provided in the ferrules, optical fibers, splicing techniques and manufacturing processes used at the central location effectively compensates for any losses associated with adding splices to the mass produced fiber optic connector assemblies. Once again, the high volumes of ferrule assemblies manufactured at the centralized locations provide the justification for making the capital expenditures necessary to provide the level of equipment quality, automation and manufacturing precision to make this manufacturing and distribution system feasible.

Aspects of the present disclosure allow ferrule assemblies to be manufactured in large volumes at manufacturing locations where process is most cost effective. The ferrule assemblies, which are small in size, can be efficiently shipped in bulk to factory/assembly locations closer to customer locations where the ferrule assemblies can be spliced to fiber optic cables and final connector assembly can take place. In this way, shipping of the cable itself (which tends to be larger in size and weight) can be minimized. Also, final assembly can be made closer to customer locations thereby decreasing lead times. Global supply chains can also be enhanced.

While various specific dimensions are provided above, it will be appreciated that the dimensions are applicable to some embodiments and that other embodiments within the scope of the present disclosure may use dimensions other than those specifically provided. Similarly, while various manufacturing tolerances are provided above, it will be appreciated that the manufacturing tolerances are applicable to some embodiments and that other embodiments within the scope of the present disclosure may use manufacturing tolerances other than those specifically provided. The above specification, examples and data provide a description of the inventive aspects of the disclosure. Many embodiments of the disclosure can be made without departing from the spirit and scope of the inventive aspects of the disclosure.

What is claimed is:

1. A fiber optic connector assembly comprising:
   a connector body having a front end and a back end;
   a ferrule positioned at least partially within the connector body adjacent the front end of the connector body;
   a first optical fiber that forms an optical fiber stub corresponding to the ferrule, the first optical fiber including a first portion secured within the ferrule and a second portion that extends rearwardly from the ferrule;
   a boot positioned adjacent the back end of the connector body; and
   a second optical fiber fusion spliced to the first optical fiber at a splice location positioned rearward of the ferrule within 5 millimeters of a rear end of the ferrule.

2. The fiber optic connector assembly of claim 1, further comprising a hub secured on the ferrule, the hub being movable unitarily with the ferrule.

3. The fiber optic connector assembly of claim 2, further comprising a spring biasing the ferrule and hub towards the front end of the connector body.

4. The fiber optic connector assembly of claim 3, wherein the splice location is provided between the ferrule and a rear end of the spring.

5. The fiber optic connector assembly of claim 2, wherein the hub is of injection molded construction.

6. The fiber optic connector assembly of claim 2, wherein the hub includes keying structure to mount the ferrule at a desired rotational position relative to the connector body.

7. The fiber optic connector assembly of claim 1, wherein the second optical fiber is fusion spliced to the first optical fiber at a factory.

8. The fiber optic connector assembly of claim 1, wherein the first optical fiber has better core concentricity as compared to the second optical fiber.

9. The fiber optic connector assembly of claim 1, wherein the first optical fiber is offset relative to the ferrule in a core offset direction; and wherein the ferrule is marked to indicate the core offset direction.

10. The fiber optic connector assembly of claim 9, wherein a core offset direction mark is printed on the ferrule.

11. The fiber optic connector assembly of claim 9, wherein a core offset direction mark is etched on the ferrule.

12. The fiber optic connector assembly of claim 9, further comprising a hub secured on the ferrule, the hub being rotationally positioned on the ferrule based on the core offset direction marked on the ferrule.

13. The fiber optic connector assembly of claim 12, wherein the hub includes keying structure to mount the ferrule at a desired rotational position relative to the connector body.

14. The fiber optic connector assembly of claim 1, wherein the ferrule includes a multi-fiber ferrule; and wherein a plurality of optical fibers including the first optical fiber having front portions secured within the multi-fiber ferrule and rear portions that project rearwardly from the rear end of the ferrule.

15. The fiber optic connector assembly of claim 14, wherein a plurality of second optical fibers including the second optical fiber are spliced to the first optical fibers at splice locations positioned within 5 millimeters of the rear end of the ferrule.

16. The fiber optic connector assembly of claim 1, wherein the first optical fiber has properties that are different than the second optical fiber.

17. The fiber optic connector assembly of claim 1, wherein the fiber optic connector assembly has a total length less than or equal to 57 millimeters, the total length being measured from the front end of the connector body to a rear end of the boot.

18. The fiber optic connector assembly of claim 1, wherein the second optical fiber is part of a fiber optic cable having a tensile strength structure that anchors to the connector body.

19. The fiber optic connector assembly of claim 1, wherein a spring biases the ferrule towards the front end of the connector body.

20. The fiber optic connector assembly of claim 19, wherein the splice location is positioned between forward and rearward ends of the spring.

* * * * *